US011017470B2

(12) United States Patent
Weisz

(10) Patent No.: US 11,017,470 B2
(45) Date of Patent: May 25, 2021

(54) COMPUTER-IMPLEMENTED TRADING SYSTEM FOR DYNAMIC MARKET IN RESTRICTED SECURITIES

(71) Applicant: Jason Weisz, Parkland, FL (US)

(72) Inventor: Jason Weisz, Parkland, FL (US)

(73) Assignee: Four Deuces IP LLC, Parkland, FL (US)

( * ) Notice: Subject to any disclaimer, the term of this patent is extended or adjusted under 35 U.S.C. 154(b) by 291 days.

(21) Appl. No.: 15/797,546

(22) Filed: Oct. 30, 2017

(65) Prior Publication Data

US 2018/0068387 A1   Mar. 8, 2018

Related U.S. Application Data

(63) Continuation of application No. 14/682,886, filed on Apr. 9, 2015, now Pat. No. 9,805,419, which is a continuation-in-part of application No. 14/590,586, filed on Jan. 6, 2015, now abandoned, which is a continuation-in-part of application No. 14/515,063, filed on Oct. 15, 2014, now abandoned.

(60) Provisional application No. 61/891,532, filed on Oct. 16, 2013.

(51) Int. Cl.
*G06Q 40/04* (2012.01)

(52) U.S. Cl.
CPC .................................. *G06Q 40/04* (2013.01)

(58) Field of Classification Search
CPC ..................................................... G06Q 40/04
USPC ......................................................... 705/37
See application file for complete search history.

(56) References Cited

U.S. PATENT DOCUMENTS

| 4,674,044 | A  | 6/1987  | Kalmus et al. |
| 7,376,615 | B2 | 5/2008  | Brixius |
| 7,428,501 | B2 | 9/2008  | Dinwoodie |
| 7,472,098 | B2 | 12/2008 | Shields et al. |
| 7,523,063 | B2 | 4/2009  | Harrington et al. |

(Continued)

OTHER PUBLICATIONS

Anderson, Jenny; "Seeking Unlimited Sucess From Providing a Market for Restricted Stock", Market Place, New York Times; Sep. 28, 2005.*

(Continued)

*Primary Examiner* — Jessica Lemieux
(74) *Attorney, Agent, or Firm* — Howard IP Law Group, PC

(57) ABSTRACT

A computer-implemented method is provided for enabling and facilitating automated real-time dynamic valuation and trading in restricted securities of publically-traded companies via a centralized computer network system. The method includes steps of: defining a set of restricted securities transaction qualification factors and storing them on computer memory storage; defining a set of regulatory compliance standards and storing them on computer memory storage; qualifying parties using the system in accordance with the qualification factors; establishing an initial online bidding and offering procedure, which functions as an auction for facilitating a primary placement of restricted securities; monitoring respective transactions to ensure compliance standards are maintained; and effecting the transfer of restricted securities in a manner that ensures that parties to a transaction are legally qualifies and the transfer is accomplished in accordance with the regulatory compliance standards.

78 Claims, 88 Drawing Sheets

(56) References Cited

U.S. PATENT DOCUMENTS

| | | | |
|---|---|---|---|
| 7,873,560 B2 | 1/2011 | Reich et al. | |
| 7,925,567 B2 | 4/2011 | McRedmond | |
| 7,962,397 B2 | 6/2011 | Hemingway et al. | |
| 8,180,700 B1 | 5/2012 | Arnold et al. | |
| RE43,769 E | 10/2012 | Hemingway et al. | |
| 8,352,340 B2 | 1/2013 | White et al. | |
| 2002/0007335 A1* | 1/2002 | Millard | G06Q 20/10 705/37 |
| 2002/0059107 A1 | 5/2002 | Reich et al. | |
| 2003/0023546 A1* | 1/2003 | Shepherd | G06Q 40/04 705/38 |
| 2004/0058731 A1 | 3/2004 | Rossides | |
| 2004/0059646 A1 | 3/2004 | Harrington et al. | |
| 2005/0222941 A1* | 10/2005 | Tull, Jr. | G06Q 40/04 705/37 |
| 2006/0184446 A1 | 8/2006 | Ross | |
| 2007/0130053 A1* | 6/2007 | Avery | G06Q 30/00 705/37 |
| 2007/0136181 A1 | 6/2007 | Miller | |
| 2007/0174066 A1 | 7/2007 | Chang | |
| 2011/0191230 A1 | 8/2011 | Avery | |
| 2011/0307345 A1 | 12/2011 | Kemper et al. | |
| 2011/0313908 A1 | 12/2011 | Schluetter et al. | |
| 2012/0233073 A1 | 9/2012 | Salmon et al. | |
| 2012/0310796 A1 | 12/2012 | Carter | |
| 2014/0006201 A1 | 1/2014 | Judd | |
| 2014/0108184 A1 | 4/2014 | Herbette et al. | |
| 2014/0297496 A1* | 10/2014 | Vianello | G06Q 40/04 705/37 |

OTHER PUBLICATIONS

Robbins and Hallinan; "Private Trading Platforms for Restricted Securities", Pillsbury; Mar. 14-16, 2013.*

Anderson, Jenny; "Seeking Unlimited Success From Providing a Market for Restricted Stock", Market Place, New York Times; Sep. 28, 2005; 3 pages.

* cited by examiner

ISSUER 'A' OFFER MENU (LIQUID STOCK EXAMPLE)

| SYMBOL | ACTION | SHARES (MAX) | MIN SHARES | STREAMING DISCOUNT | MIN PRICE | DURATION |
|--------|--------|--------------|------------|--------------------|-----------|----------|
| WXYZ.R | SELL   |              |            | 5%  FTS            | NO MIN    | DAY      |

ACCEPT COUNTER BIDS? ☑YES ☐NO RECOMMENDED

ACCEPT PRIVATE COUNTER OFFER? ☑YES ☐NO RECOMMENDED

[SUBMIT]

FREE TRADING QUOTE

| SYMBOL | LAST  | CHANGE       | BID   | ASK   | HIGH  | LOW   | VOLUME    |
|--------|-------|--------------|-------|-------|-------|-------|-----------|
| WXYZ.R | 38.11 | -.21 (0.06%) | 38.10 | 38.11 | 38.13 | 38.06 | 5,343,567 |

FIG. 4

ISSUER 'A' OFFER MENU (LIQUID STOCK EXAMPLE)

☒ THE MAX SHARES CURRENTLY ISSUABLE FOR THIS SECURITY IS 5,026,576

| SYMBOL | ACTION | SHARES (MAX) | MIN SHARES | STREAMING DISCOUNT | MIN PRICE | DURATION |
|---|---|---|---|---|---|---|
| WXYZ.R | SELL | | | 5% FTS | NO MIN | DAY |

ACCEPT COUNTER BIDS?  ☑YES ☐NO RECOMMENDED

ACCEPT PRIVATE COUNTER OFFER?  ☑YES ☐NO RECOMMENDED

SUBMIT

FREE TRADING QUOTE

| SYMBOL | LAST | CHANGE | BID | ASK | HIGH | LOW | VOLUME |
|---|---|---|---|---|---|---|---|
| WXYZ.R | 38.11 | -.21 (0.06%) | 38.10 | 38.11 | 38.13 | 38.06 | 5,343,567 |

FIG. 5

ISSUER 'A' OFFER MENU (LIQUID STOCK EXAMPLE)

| SYMBOL | ACTION | SHARES (MAX) | MIN SHARES | STREAMING DISCOUNT | MIN PRICE | DURATION |
|---|---|---|---|---|---|---|
| WXYZ.R | SELL | 10000 | 5000 | 6% | NO MIN | DAY |

ACCEPT COUNTER BIDS? ☑YES ☐NO RECOMMENDED

ACCEPT PRIVATE COUNTER OFFER? ☑YES ☐NO RECOMMENDED

SUBMIT

FREE TRADING QUOTE

| SYMBOL | LAST | CHANGE | BID | ASK | HIGH | LOW | VOLUME |
|---|---|---|---|---|---|---|---|
| WXYZ.R | 38.11 | -.21 (0.06%) | 38.10 | 38.11 | 38.13 | 38.06 | 5,343,567 |

ISSUER 'B' OFFER MENU (ILLIQUID STOCK EXAMPLE)

| SYMBOL | ACTION | SHARES (MAX) | MIN SHARES | STREAMING DISCOUNT | MIN PRICE | DURATION |
|---|---|---|---|---|---|---|
| AMDA.R | SELL | | | 5% [FTS] | NO MIN | DAY |

☒ IMPORTANT: OFFER IN TERMS OF DISC TO MVG AVG RECOMMENDED FOR THIS SECURITY (WHY?)

☒ IMPORTANT: MINIMUM PRICE RECOMMENDED FOR THIS SECURITY (WHY?)

[SUBMIT]

ACCEPT COUNTER BIDS? ☑ YES ☐

ACCEPT PRIVATE COUNTER OFFER? ☑ YES ☐

FREE TRADING QUOTE

| SYMBOL | LAST | CHANGE | BID | ASK | HIGH | LOW | VOLUME |
|---|---|---|---|---|---|---|---|
| AMDA | 7.31 | .03 (0.4%) | 7.30 | 7.31 | 7.43 | 7.26 | 76.634 |

FIG. 8

THE MAX SHARES CURRENTLY
ISSUABLE FOR THIS SECURITY
486,782

ISSUER 'B' OFFER MENU (ILLIQUID STOCK EXAMPLE)

SYMBOL   ACTION   SHARES (MAX)   MIN SHARES   STREAMING DISCOUNT   MIN PRICE   DURATION

AMDA.R   SELL                                 5%  FTS                NO MIN     DAY

☑ IMPORTANT: OFFER IN TERMS OF DISC TO MVG AVG RECOMMENDED FOR THIS SECURITY (WHY?)

THIS SECURITY IS CONSIDERED ILLIQUID AND MAY BE SUBJECT TO PRE-TRADE MANIPULATION. OFFERING SHARES IN TERMS OF A STREAMING DISC TO MOVING AVG RATHER THAN AS A STREAMING DISC TO FREE TRADING SHARES MAY MITIGATE THIS PRACTICE

☑ IMPORTANT: MINIMUM PRICE RECOMMENDED FOR THIS SECURITY (WHY?)

THIS SECURITY IS CONSIDERED ILLIQUID AND MAY BE SUBJECTED TO PRE-TRADE MANIPULATION STATING A MIN PRICE MAY MITIGATE THIS PRACTICE

ACCEPT COUNTER BIDS?   ☑ YES

ACCEPT PRIVATE COUNTER OFFER?   ☑ YES

SUBMIT

FREE TRADING QUOTE

| SYMBOL | LAST | CHANGE | BID | ASK | HIGH | LOW | VOLUME |
|---|---|---|---|---|---|---|---|
| AMDA | 7.31 | .03 (0.4%) | 7.30 | 7.31 | 7.43 | 7.26 | 76.634 |

FIG. 9

ISSUER 'B' OFFER MENU (ILLIQUID STOCK EXAMPLE)

| SYMBOL | ACTION | SHARES (MAX) | MIN SHARES | STREAMING DISCOUNT | MIN PRICE | DURATION |
|--------|--------|--------------|------------|--------------------|-----------|----------|
| AMDA.R | SELL | 50000 | 20000 | 5%<br>6%<br>7%<br>8%<br>9%<br>10%<br>11%<br>12%<br>13%<br>FTS / MA / 10D / 20D | NO MIN / 5.50 | DAY / GTC |

SUBMIT

ACCEPT COUNTER BIDS? ☑ YES

ACCEPT PRIVATE COUNTER OFFER? ☑ YES

FREE TRADING QUOTE

| SYMBOL | LAST | CHANGE | BID | ASK | HIGH | LOW | VOLUME |
|--------|------|--------|-----|-----|------|-----|--------|
| AMDA | 7.31 | .03 (0.4%) | 7.30 | 7.31 | 7.43 | 7.26 | 76,634 |

FIG. 10

ISSUER 'B' OFFER MENU (ILLIQUID STOCK EXAMPLE)

| SYMBOL | ACTION | SHARES (MAX) | MIN SHARES | STREAMING DISCOUNT | MIN PRICE | DURATION |
|---|---|---|---|---|---|---|
| AMDA.R | SELL | 50000 | 20000 | 13% 10D MA | 5.50 | GTC |

ACCEPT COUNTER BIDS? ☑ YES ☐ NO  RECOMMENDED

ACCEPT PRIVATE COUNTER OFFER? ☑ YES ☐ NO  RECOMMENDED

SUBMIT

FREE TRADING QUOTE

| SYMBOL | LAST | CHANGE | BID | ASK | HIGH | LOW | VOLUME |
|---|---|---|---|---|---|---|---|
| AMDA | 7.31 | .03 (0.4%) | 7.30 | 7.31 | 7.43 | 7.26 | 76.634 |

RSTS REGISTERED COMPANIES

| | SYMBOL.R | FT PRICE | NET CHANGE | | SYMBOL.R | FT PRICE | NET CHANGE |
|---|---|---|---|---|---|---|---|
| U BID | AAME | 3.58 | -0.12 (3.24%) | C BID | MVIS | 2.23 | 0.02 (0.90%) |
| C BID | AFFX | 7.48 | -0.34 (-4.35%) | U BID | NLY | 10.96 | -0.25 (-2.23%) |
| C BID | AMDA | 7.31 | -0.09 (-1.22%) | U BID | NYMT | 7.57 | -0.21 (-2.70%) |
| U BID | ANF | 4.89 | -0.56 (-10.22%) | U BID | PBR | 10.90 | -0.28 (2.50%) |
| U BID | ARIA | 8.11 | -0.18 (-2.15%) | C BID | PDO | 6.57 | -0.12 (-1.76%) |
| C BID | ASRV | 3.27 | 0.03 (0.99%) | U BID | PLBC | 6.35 | 0.00 (0.00%) |
| U BID | ASUR | 6.67 | -0.03 (-0.45%) | | PLUG | 8.27 | 1.91 (30.03%) |
| C BID | BABB | 0.80 | 0.03 (3.75%) | U BID | POZN | 8.23 | 0.02 (0.24%) |
| U BID | BLDP | 5.39 | 0.21 (4.13%) | C BID | PPHM | 2.4 | -0.21 (-8.05%) |
| C BID | CFBK | 1.51 | -0.1099 (-7.07%) | U BID | PWX | 17.91 | -0.11 (-0.85%) |
| U BID | CMSB | 9.17 | 0.22 (5.11%) | U BID | PXLW | 6.68 | -0.22 (-23.89%) |
| U BID | EDGW | 6.98 | 0.14 (2.04%) | | RF | 11.50 | 0.22 (2.03%) |
| | ERII | 6.04 | -0.49 (-7.55%) | U BID | RIGL | 4.52 | 0.00 (0.00%) |
| U BID | F | 15.61 | -0.11 (-0.70%) | | S | 8.63 | -0.25 (-2.38%) |
| U BID | FCEL | 3.35 | 0.360 (12.34%) | U BID | SBCF | 11.38 | 0.11 (0.88%) |
| U BID | FULL | 8.81 | -0.12 (-1.34%) | U BID | SPLS | 11.48 | 0.13 (1.14%) |
| | HBAN | 0.81 | 0.11 (1.83%) | C BID | SIRI | 3.51 | -0.05 (-1.20%) |
| U BID | HMNF | 12.89 | 0.329 (2.62%) | U BID | SKUL | 9.23 | 1.80 (24.33%) |
| U BID | JBLU | 8.98 | -0.039 (-0.43%) | C BID | TSBK | 11.20 | 0.18 (1.45%) |
| C BID | JCP | 7.28 | -1.36 (-15.11%) | U BID | VALE | 13.04 | -0.70 (-5.09%) |
| C BID | JFBI | 7.77 | 0.11 (5.02%) | U BID | VVTV | 5.77 | -0.24 (-3.99%) |
| C BID | KEY | 13.89 | 0.25 (1.83%) | | WFT | 4.61 | 0.10 (2.22%) |
| U BID | MOBI | 9.56 | 0.17 (1.85%) | C BID | WX | 38.11 | 0.00 (0.00%) |
| C BID | MSTX | 0.8368 | -0.0086 (-1.01%) | C BID | XOMA | 6.33 | -0.22 (-3.35%) |

FIG. 15

| ACCOUNT ▼ | MY STOCKS | ANALYZE | ORDER STATUS | STOCKS OFFERED ▼ | MARKET WATCH |

| VVTV | RS QUOTE |

| | SHARES | MIN | STREAMING DISCOUNT | MIN/MAX PRICE |
|---|---|---|---|---|
| BID | ... | ... | | |
| ASK | ... | ... | | |

FT/RS CHART

MARKET DEPTH (?)

PCO (?)

[TRADE]

| VVTV | FT QUOTE |

| SYMBOL | LAST | CHANGE | BID | ASK | HIGH | LOW | VOL |
|---|---|---|---|---|---|---|---|
| VVTV | 5.77 | -.24 | 5.78 | 5.77 | 6.04 | 5.71 | 124,870 |

NEWS
FT TRADE
RS QUOTE

FIG. 17

| ACCOUNT ▼ | MY STOCKS | ANALYZE | ORDER STATUS | STOCKS OFFERED ▼ | MARKET WATCH |

SYMBOL    ACTION    SHARES    MIN    STREAMING DISC.    MIN/MAX PRICE    DURATION

WTV.R     BUY       [ ]       [ ]    [ ]                [ ]              [ ]

COUNTER OFFER ACCEPTED?
☑ YES  ☐ NO
RECOMMENDED

| WTV | R | RS QUOTE |

SHARES    MIN    STREAMING DISCOUNT    MIN/MAX PRICE
BID         ⋮         ⋮      ⋮                     ⋮
ASK         ⋮         ⋮      ⋮                     ⋮

FT/RS CHART

MARKET DEPTH (?)

| TRADE |
| BUY |
| SELL |

PCO (?)

| WTV | FT QUOTE |

| SYMBOL | LAST | CHANGE | BID | ASK | HIGH | LOW | VOL |
| WTV | 5.77 | -.24 | 5.76 | 5.77 | 6.04 | 5.71 | 124,870 |

NEWS      RS
FT        QUOTE
TRADE

FIG. 20

WXYZ.R MARKET DEPTH

| BIDDER | BID | SIZE | ELIG | MAX PRICE | SELLER | ASK | SIZE | ELIG | MIN PRICE |
|--------|-----|------|------|-----------|--------|-----|------|------|-----------|
| ME | 10% DET | 50000/AON | ISS; QIB | — | | — | — | ANY | — |

FIG. 23

| ACCOUNT ▼ | MY STOCKS | ANALYZE | ORDER STATUS | STOCKS OFFERED ▼ | MARKET WATCH |

WXYZ | R | RSQUOTE

| | SHARES | MIN | STREAMING DISCOUNT | MIN/MAX PRICE |
|---|---|---|---|---|
| BID 34.68 | 10000 | AON | 9% FTS | 33.50 |
| ASK 35.82 | 10000 | 5000 | 6% FTS | NO MAX |

FT/RS CHART

MARKET DEPTH (?)

[ TRADE ]   PCO (?)

WXYZ | FTQUOTE

| SYMBOL | LAST | CHANGE | BID | ASK | HIGH | LOW | VOL |
|---|---|---|---|---|---|---|---|
| WXYZ | 38.11 | -0.21 (0.06%) | 38.10 | 38.11 | 38.13 | 38.06 | 5,343,567 |

NEWS
FT TRADE

RSS QUOTE

FIG. 24

| ACCOUNT ▼ | MY STOCKS | ANALYZE | ORDER STATUS ▼ | STOCKS OFFERED ▼ | MARKET WATCH |

WXYZ RSQUOTE

| | SHARES | MIN | STREAMING DISCOUNT | | MIN/MAX PRICE |
|---|---|---|---|---|---|
| BID 34.68 | 10000 | AON | 9% | FTS | 33.50 |
| ASK 35.82 | 10000 | 5000 | 6% | FTS | NO MAX |

FT/RS CHART

[TRADE]

MARKET DEPTH (2) ☞ ③

PCO (2)

WXYZ FTQUOTE ☞ ①

| SYMBOL | LAST | CHANGE | BID | ASK | HIGH | LOW | VOL |
|---|---|---|---|---|---|---|---|
| WXYZ | 38.11 | -0.21 (0.06%) | 38.10 | 38.11 | 38.13 | 38.06 | 5,343,567 |

NEWS
FT TRADE

RS QUOTE ☞ ②

FIG. 25

WXYZ.R MARKET DEPTH

| BIDDER | BID | SIZE | ELIG | MAX PRICE | SELLER | ASK | SIZE | ELIG | MIN PRICE |
|---|---|---|---|---|---|---|---|---|---|
| INV | 9% DFT | 1000/AON | QIB;ISS | $33.50 | ISS | 6% DFT | 10000/5000MIN | ANY | — |
| INV | 15% DFT | 100000/25000MIN | QIB;ISS | — | QIB | 3% DFT | 50000/NO MIN | QIB;ISS | — |
| INV | 40% DFT | 250000/50000MIN | QIB;ISS | — | | | | | |

| ACCOUNT ▼ | MY STOCKS | ANALYZE | ORDER STATUS | STOCKS OFFERED ▼ | MARKET WATCH |

SYMBOL        ACTION    SHARES    MIN         STREAMING DISC.    MIN/MAX PRICE    DURATION

WXYZ.R        BUY       50000     NO MIN      8%    FTS          NO MAX           DAY
                                  AON                                             GTC
                                  10000

ARE YOU:
AN AFFILIATE,
A DIRECTOR,
OR, WILL THIS
RESULT IN YOU
BECOMING <10%
SHARE HOLDER IN
THIS SECURITY?

YES    NO

SUBMIT

---

WXYZ.R  RS QUOTE

SHARES    MIN      STREAMING DISCOUNT    MIN/MAX PRICE

BID 34.68  10000    AON      9%      FTS            33.50
ASK 35.82  10000    5000     6%      FTS            NO MAX

PLEASE CONTACT
REPRESENTATIVE
1-800-555-3056

FT/RS CHART
MARKET DEPTH (2)
PCO (2)

TRADE
BUY
SELL

---

WXYZ.FTQUOTE

SYMBOL   LAST    CHANGE         BID     ASK     HIGH    LOW     VOL         NEWS
WXYZ     38.11   -0.21 (0.06%)  38.10   38.11   38.13   38.06   5,343,567   ET
                                                                            TRADE

RS
QUOTE

WXYZ.R MARKET DEPTH

| BIDDER | BID | SIZE | ELIG | MAX PRICE | SELLER | ASK | SIZE | ELIG | MIN PRICE |
|---|---|---|---|---|---|---|---|---|---|
| ME | 8% DFT | 50000/AON | ISS; QIB | NO MAX | ISS | 6% DFT | 10000/5000MIN | ANY | — |
| INV | 9% DFT | 10000/AON | ISS; QIB | $33.50 | QIB | 3% DFT | 50000/NO MIN | ISS; QIB | — |
| INV | 15% DFT | 100000/25000MIN | ISS; QIB | — | | | | | |
| INV | 40% DFT | 250000/50000MIN | ISS; QIB | — | | | | | |

RSTS REGISTERED COMPANIES

| SYMBOL.R | | FT PRICE | NET CHANGE | SYMBOL.R | | FT PRICE | NET CHANGE |
|---|---|---|---|---|---|---|---|
| U BID | AAME | 3.58 | -0.12 (3.24%) | C BID | MVIS | 2.23 | 0.02 (0.90%) |
| C BID | AFFX | 7.48 | -0.34 (-4.35%) | U BID | NLY | 10.96 | -0.25 (-2.23%) |
| C BID | AMDA | 7.31 | -0.09 (-1.22%) | U BID | NYMT | 7.57 | -0.21 (-2.70%) |
| U BID | ANF | 4.89 | -0.56 (-10.22%) | U BID | PBR | 10.90 | -0.28 (2.50%) |
| U BID | ARIA | 8.11 | -0.18 (-2.15%) | C BID | PDO | 6.57 | -0.12 (-1.76%) |
| C BID | ASRV | 3.27 | 0.03 (0.99%) | U BID | PLBC | 6.35 | 0.00 (0.00%) |
| U BID | ASUR | 6.67 | -0.03 (-0.45%) |  | PLUG | 8.27 | 1.91 (30.03%) |
| C BID | BABB | 0.80 | 0.03 (3.75%) | U BID | POZN | 8.23 | 0.02 (0.24%) |
| U BID | BLDP | 5.39 | 0.21 (4.13%) | C BID | PPHM | 2.4 | -0.21 (-8.05%) |
| C BID | CFBK | 1.51 | -0.1099 (-7.07%) | U BID | PWX | 17.91 | -0.11 (-0.85%) |
| U BID | CMSB | 9.17 | 0.22 (5.11%) | U BID | PXLW | 6.68 | -0.22 (-23.89%) |
| U BID | EDGW | 6.98 | 0.14 (2.04%) |  | RF | 11.50 | 0.22 (2.03%) |
|  | ERII | 6.04 | -0.49 (-7.55%) | U BID | RIGL | 4.52 | 0.00 (0.00%) |
| U BID | F | 15.61 | -0.11 (-0.70%) |  | S | 8.63 | -0.25 (-2.38%) |
| U BID | FCEL | 3.35 | 0.360 (12.34%) | U BID | SBCF | 11.38 | 0.11 (0.88%) |
| U BID | FULL | 8.81 | -0.12 (-1.34%) | U BID | SPLS | 11.48 | 0.13 (1.14%) |
|  | HBAN | 0.81 | 0.11 (1.83%) | C BID | SIRI | 3.51 | -0.05 (-1.20%) |
| U BID | HMNF | 12.89 | 0.329 (2.62%) | U BID | SKUL | 9.23 | 1.80 (24.33%) |
| U BID | JBLU | 8.98 | -0.039 (-0.43%) | C BID | TSBK | 11.20 | 0.18 (1.45%) |
| U BID | JCP | 7.28 | -1.36 (-15.11%) | U BID | VALE | 13.04 | -0.70 (-5.09%) |
| U BID | JFBI | 7.77 | 0.11 (5.02%) | U BID | VVTV | 5.77 | -0.24 (-3.99%) |
| C BID | KEY | 13.89 | 0.25 (1.83%) |  | WRES | 4.61 | 0.10 (2.22%) |
| U BID | MOBI | 9.56 | 0.17 (1.85%) | C BID | WXYZ | 38.11 | 0.00 (0.00%) |
| C BID | MSTX | 0.8368 | -0.0086 (-1.01%) | C BID | XOMA | 6.33 | -0.22 (-3.35%) |

| SYMBOL | FT PRICE | MKT CAP | | SYMBOL | FT PRICE | MKT CAP | |
|---|---|---|---|---|---|---|---|
| F | 15.61 | 65.3B | MKT DEPTH | PPHM | 2.40 | 2.40 | MKT DEPTH |
| PBR | 10.9 | 58.9B | MKT DEPTH | VVTV | 5.77 | 5.77 | MKT DEPTH |
| VALE | 13.04 | 42.8B | MKT DEPTH | SBCF | 11.38 | 11.38 | MKT DEPTH |
| WXYZ | 38.11 | 35B | MKT DEPTH | POZN | 8.23 | 8.23 | MKT DEPTH |
| S | 8.63 | 29.4B | MKT DEPTH | IFBI | 7.77 | 7.77 | MKT DEPTH |
| SIRI | 3.51 | 17B | MKT DEPTH | ERII | 6.04 | 6.04 | MKT DEPTH |
| NLY | 10.96 | 11.9B | MKT DEPTH | SKUL | 9.23 | 9.23 | MKT DEPTH |
| KEY | 13.89 | 11.8B | MKT DEPTH | MOBI | 9.56 | 9.56 | MKT DEPTH |
| SPLS | 11.48 | 7.4B | MKT DEPTH | PXLW | 6.85 | 6.85 | MKT DEPTH |
| JBLU | 9.98 | 3.2B | MKT DEPTH | MVIS | 2.23 | 2.23 | MKT DEPTH |
| ICP | 7.28 | 2.2B | MKT DEPTH | PWX | 17.91 | 17.91 | MKT DEPTH |
| RF | 11.05 | 1.4B | MKT DEPTH | AAME | 3.58 | 3.58 | MKT DEPTH |
| ARIA | 8.11 | 1.3B | MKT DEPTH | AMDA | 7.31 | 7.31 | MKT DEPTH |
| PLUG | 8.27 | 906MM | MKT DEPTH | TSBK | 11.20 | 11.20 | MKT DEPTH |
| FUEL | 3.35 | 902MM | MKT DEPTH | EDGW | 6.98 | 6.98 | MKT DEPTH |
| FCEL | 8.81 | 850MM | MKT DEPTH | ASRV | 3.27 | 3.27 | MKT DEPTH |
| HBAN | 9.81 | 817MM | MKT DEPTH | HMNF | 12.89 | 12.89 | MKT DEPTH |
| ANR | 4.89 | 746MM | MKT DEPTH | MSTX | 0.83 | 0.83 | MKT DEPTH |
| NYMT | 7.57 | 625MM | MKT DEPTH | PLBC | 6.35 | 6.35 | MKT DEPTH |
| AFFX | 7.47 | 610MM | MKT DEPTH | ASUR | 6.67 | 6.67 | MKT DEPTH |
| WRES | 4.61 | 604MM | MKT DEPTH | CFBK | 1.51 | 1.51 | MKT DEPTH |
| XOMA | 6.33 | 553MM | MKT DEPTH | CMSB | 9.17 | 9.17 | MKT DEPTH |
| BLDP | 5.39 | 528MM | MKT DEPTH | PDQ | 6.57 | 6.57 | MKT DEPTH |
| RIGL | 4.52 | 289MM | MKT DEPTH | BABB | 0.8 | 0.80 | MKT DEPTH |

OFFERINGS BY PCT DISCOUNT

| CURRENT | H/L DISC | SYMBOL R | FT PRICE | RS PRICE | |
|---|---|---|---|---|---|
| 30% | DMA | BABB | 0.83 | 0.58 | MKT DEPTH |
| 30% | DMA | MSTX | 0.8363 | 0.58 | MKT DEPTH |
| 25% | DFT | CFBK | 1.51 | 1.13 | MKT DEPTH |
| 22% | DMA | MVIS | 2.23 | 1.74 | MKT DEPTH |
| 20% | DFT | ASRV | 3.27 | 2.62 | MKT DEPTH |
| 15% | DMA | PPHM | 2.4 | 2.04 | MKT DEPTH |
| 14% | DFT | AAME | 3.58 | 3.08 | MKT DEPTH |
| 13% | DFT | AMDA | 7.31 | 6.36 | MKT DEPTH |
| 13% | DFT | SIRI | 3.51 | 3.05 | MKT DEPTH |
| 13% | DFT | WRES | 4.61 | 4.01 | MKT DEPTH |
| 10% | DMA | ERII | 6.04 | 5.47 | MKT DEPTH |
| 8% | DFT | PDO | 6.57 | 6.04 | MKT DEPTH |
| 8% | DFT | XOMA | 6.33 | 5.82 | MKT DEPTH |
| 8% | DFT | ICP | 7.28 | 6.70 | MKT DEPTH |
| 8% | DFT | S | 8.63 | 7.94 | MKT DEPTH |
| 7% | DFT | HBAN | 9.81 | 9.12 | MKT DEPTH |
| 7% | DFT | RF | 11.05 | 10.28 | MKT DEPTH |
| 6% | DFT | TSBK | 11.20 | 10.53 | MKT DEPTH |
| 6% | DFT | WXYZ | 38.11 | 35.82 | MKT DEPTH |
| 5% | DFT | PLUG | 8.27 | 7.86 | MKT DEPTH |
| 5% | DFT | KEY | 13.89 | 13.20 | MKT DEPTH |

FIG. 44

OFFERINGS WITH CURRENT BIDS

| SYMBOL.R | FT PRICE | RS BID (%DISC) | RS OFFER (%DISC) | |
|---|---|---|---|---|
| AAME | 3.52 | 1.97 (45%) | 2.51 (30%) | MKT DEPTH |
| AMDA | 7.31 | 5.84 (20%) | 6.36 (13%) | MKT DEPTH |
| ASRV | 3.27 | 2.29 (30%) | 2.62 (20%) | MKT DEPTH |
| BABB | 0.80 | 0.44 (45%) | 0.56 (30%) | MKT DEPTH |
| CFBK | 1.51 | 0.91 (40%) | 1.13 (25%) | MKT DEPTH |
| ICP | 7.28 | 5.97 (18%) | 6.70 (8%) | MKT DEPTH |
| KEY | 13.89 | 13.33 (4%) XM (2) | 13.20 (5%) XM (2) | MKT DEPTH |
| MSTX | 0.8368 | 0.50 (40%) | 0.59 (30%) | MKT DEPTH |
| MVIS | 2.23 | 1.74 (22%) LM (2) | 1.74 (22%) LM (2) | MKT DEPTH |
| PDO | 6.57 | 5.39 (18%) | 6.04 (8%) | MKT DEPTH |
| PPHM | 2.40 | 1.68 (30%) | 2.04 (15%) | MKT DEPTH |
| SIRI | 3.51 | 2.81 (20%) | 3.05 (13%) | MKT DEPTH |
| TSBK | 11.20 | 9.97 (11%) | 10.53 (6%) | MKT DEPTH |
| WYYZ | 38.11 | 34.68 (9%) | 35.82 (6%) | MKT DEPTH |
| XOMA | 6.33 | 5.95 (6%) XM (2) | 5.82 (8%) XM (2) | MKT DEPTH |

RSTS STOCKS WITH BIDS ONLY

| SYMBOL.R | FT PRICE | HIGH RS BID | TERMS | COMMENTS | HIGH BID COUNTERPARTY |
|---|---|---|---|---|---|
| ASUR | 6.67 | 4.14 | 38% DFT/4.50 MAX BID | 100000/50000 MIN SH | INV MKT DEPTH |
| BLDP | 5.39 | 4.75 | 15% DFT/4.75 MAX BID | 1000000 AON | QIB MKT DEPTH |
| EDGW | 6.98 | 4.89 | 30% DFT/ NO MAX BID | 200000/50000 MIN | INV MKT DEPTH |
| E | 15.61 | 14.05 | 10% DFT/ NO MAX BID | 200000/500000 MIN | QIB MKT DEPTH |
| FUEL | 8.81 | 7.00 | 18% DFT/ NO MAX BID | 500000 MIN | MM MKT DEPTH |
| HMNF | 12.89 | 9.67 | 25% DFT/ 7.00 MAX BID | 100000/NO MIN SH | QIB MKT DEPTH |
| JBI | 7.77 | 5.05 | 35% DFT/6.00 MAX BID | 200000/100000 MIN | QIB MKT DEPTH |
| PBR | 10.90 | 10.25 | 6% DFT/10.50 MAX BID | 1000000 AON | QIB MKT DEPTH |
| PLBC | 6.35 | 3.81 | 40% DFT/NO MAX BID | NO MIN SH | INV MKT DEPTH |
| PWX | 17.91 | 14.33 | 20% DFT/15.00 MAX BID | 20000/10000 MIN SH | INV MKT DEPTH |
| SPLS | 11.48 | 10.91 | 5% DFT/11.00 MAX BID | 5000000 AON | QIB MKT DEPTH |

RSTS STOCKS WITH OFFERS ONLY

| SYMBOL R | FT PRICE | LOW RS OFFER | TERMS | COMMENTS | COUNTER BID ACCEPTED? | LOW OFFER COUNTER PARTY |
|---|---|---|---|---|---|---|
| FRII | 6.04 | 5.47 | 10% DFT/ NO MIN PR | 100000/20000 MIN SH | Y | ISS (REGD) (2) MKT DEPTH |
| HBAN | 9.81 | 9.12 | 7% DFT/ 9.00 MIN PR | 750000/AON QIB ONLY | Y | ISS (REGD) (2) MKT DEPTH |
| PLUG | 8.27 | 7.86 | 5% DFT/ NO MIN PR | MIN QIB ONLY | N | AFF (144) (2) MKT DEPTH |
| RE | 11.05 | 10.28 | 7% DFT/ NO MIN PR | AON | N | BD (144A) (2) MKT DEPTH |
| S | 8.63 | 7.94 | 8% DFT/ NO MIN PR | MIN SH QIB ONLY | N | INV (144A) (2) MKT DEPTH |
| WRES | 4.61 | 4.01 | 13% DFT 3.75 MIN PR. | MIN SH | N | ISS (REGD)(2) MKT DEPTH |

RSTS STOCKS BY LIQUIDITY (2)

| FT STOCK | MKT CAP | AVG VOL(10D) | LIQUIDITY COEFFICIENT | FT STOCK | MKT CAP | AVG VOL (10D) | LIQUIDITY COEFFICIENT |
|---|---|---|---|---|---|---|---|
| SIRI | 17.0 B | 28.5 MM | 2.54 | NYMT | 625 MM | 1.0 MM | 1.24 |
| PBR | 58.9 B | 41.1 MM | 2.49 | AFFX | 610 MM | 452 K | 1.21 |
| VALE | 42.8 B | 38.8 MM | 2.43 | PPHM | 280 MM | 226 K | 1.17 |
| RF | 1.4 B | 18.7 MM | 2.41 | YY | 250 MM | 185 K | 1.13 |
| WXYZ | 35.0 B | 36.2 MM | 2.40 | ERII | 218 MM | 221 K | 1.10 |
| S | 29.4 B | 31.4 MM | 2.36 | RIGL | 289 MM | 197 K | 1.06 |
| NLY | 11.9 B | 18.2 MM | 2.26 | MVIS | 95 MM | 224 K | 1.04 |
| F | 65.2 B | 18.7 MM | 2.11 | POZN | 228 MM | 158 K | 1.03 |
| ECEL | 850 MM | 9.7 MM | 2.02 | (!)SKULL | 207 MM | 323 K | .99 |
| ANR | 746 MM | 8.5 MM | 1.93 | (!)AMDA | 73 MM | 123 K | .98 |
| WRES | 604 MM | 914 K | 1.88 | (!)CMSB | 22 MM | 62 K | .96 |
| PXLW | 98 MM | 1.8 MM | 1.82 | (!)SBCF | 248 MM | 51 K | .95 |
| HBAN | 817 MM | 7.1 MM | 1.78 | (!)EDGW | 68 MM | 89 K | .95 |
| ICP | 2.2 B | 10.6 MM | 1.73 | (!)PLBC | 36 MM | 27 K | .79 |
| ARIA | 1.3 B | 5.7 MM | 1.64 | (!)HMNF | 51 MM | 7 K | .68 |
| PLUG | 906 MM | 7.9 MM | 1.58 | (!)ASRV | 61 MM | 11 K | .68 |
| SPLS | 7.4 B | 7.6 MM | 1.47 | (!)CBBK | 23 MM | 8 K | .63 |
| XOMA | 553 MM | 2.2 MM | 1.39 | (!)PWX | 89 MM | 9 K | .57 |
| JBLU | 3.2 B | 6.1 MM | 1.38 | (!)TSKB | 70 MM | 4 K | .53 |
| FUEL | 902 MM | 6.7 MM | 1.36 | (!)ASUR | 30 MM | 4 K | .51 |
| JFBI | 223 MM | 936 K | 1.33 | (!)AAME | 15 MM | 4 K | .49 |
| MOBI | 178 MM | 1.0 MM | 1.31 | (!)PDO | 19 MM | 3 K | .48 |
| KEY | 11.8 B | 3.9 MM | 1.31 | (!)BABB | 6 MM | 4 K | .45 |
| MSTX | 48 MM | 1.2 MM | 1.26 | | | | |
| BLDP | 528 MM | 1.7 MM | 1.26 | | | | |

LIQUIDITY IS DETERMINED BY DIVIDING AVG DAILY VOLUME BY NUMBER OF SHARES ON A SLIDING SCALE HIGH TO LOW MARKET CAP

INDICATES ILLIQUID STOCK

DISCOUNT INCREASE / DECREASE

DISCOUNT INCREASE

| SYMBOL | PRICE | PCT DISCOUNT | PREVIOUS DISCOUNT | DATE R/L |
|---|---|---|---|---|
| MVIS | 2.23 | 22% DMA | 20% DFT | 1/2/2014 |
| WXYZ | 38.11 | 6% DFT | 4% DFT | 1/12/2014 |
| KEY | 13.89 | 5% DFT | 3% DFT | 1/19/2014 |
| AMDA | 7.40 | 13% DFT | 7% DFT | 2/2/2014 |
| PDO | 0.80 | 5% DMA | 7% DMA | 2/9/14 |

DISCOUNT DECREASE

| SYMBOL | PRICE | PCT DISCOUNT | PREVIOUS DISCOUNT | DATE R/L |
|---|---|---|---|---|
| PPHM | 2.40 | 15% DFT | 20% DFT | 1/7/2014 |
| ICP | 7.28 | 8% DFT | 9% DFT | 1/26/2014 |
| TSBK | 3.70 | 6% DFT | 7% DFT | 2/16/2014 |

| SYMBOL | FT PRICE | RS BID (DISCOUNT) | RS OFFER (DISCOUNT) | MKT DEPTH |
|---|---|---|---|---|
| XOMA | 6.33 | 5.95 (6% DFT) | 5.88 (8% DFT) | MKT DEPTH |
| KEY | 13.89 | 13.33 (4% DFT) | 13.20 (5% DFT) | MKT DEPTH |

CROSSED MARKETS (2)

CROSSED MARKET
BID PRICE AND OFFER PRICE ARE CROSSED AS RESULT OF SHARE QUANTITIES, COUNTER PARTIES, OR OTHER ASPECT(S) OF THE BID OR OFFER BEING INCONGRUENT

FIG. 56

CROSSED MARKETS (2)

| SYMBOL | FT PRICE | RS BID (DISCOUNT) | RS OFFER (DISCOUNT) | |
|---|---|---|---|---|
| XOMA | 6.33 | 5.95 (6% DFT) | 5.88 (8% DFT) | MKT DEPTH |
| KEY | 13.89 | 13.33 (4% DFT) | 13.20 (5% DFT) | MKT DEPTH |

FIG. 57

KEY .R MARKET DEPTH

| BIDDER | BID | SIZE | ELIG | MAX PRICE | SELLER | ASK | SIZE | ELIG | MIN PRICE |
|---|---|---|---|---|---|---|---|---|---|
| INV | 4% DFT | 20000/AON | ISS | 13.80 | ISS | 5% DFT | 500000/50000MIN | ANY | — |
| QIB | 7% DFT | 500000/10000MIN | ANY | — | | | | | |
| QIB | 7% DFT | 1000000 AON | ANY | 14.00 | | | | | |
| INV | 10% DFT | 10000/5000 MIN | ISS | — | | | | | |

| SYMBOL | FT PRICE | RS BID (DISCOUNT) | RS OFFER (DISCOUNT) | MKT DEPTH |
|---|---|---|---|---|
| MVIS | 2.23 | 1.74 (22% DMA) | 1.74 (22% DMA) | |

LOCKED MARKET (?)

BID PRICE AND OFFER PRICE ARE LOCKED AS RESULT OF SHARE QUANTITIES, COUNTER PARTIES, OR OTHER ASPECT(S) OF THE BID OR OFFER BEING INCONGRUENT

FIG. 60

| SYMBOL | FT PRICE | LOCKED MARKET (2) | | MKT DEPTH  |
| --- | --- | --- | --- | --- |
| | | RS BID (DISCOUNT) | RS OFFER (DISCOUNT) | |
| MVIS | 2.23 | 1.74 (22% DMA) | 1.74 (22% DMA) | |

MVIS.R MARKET DEPTH

| BIDDER | BID | SIZE | ELIG | MAX PRICE | SELLER | ASK | SIZE | ELIG | MIN PRICE |
|---|---|---|---|---|---|---|---|---|---|
| INV | 22% DMA | 10000/5000MIN | ISS | — | INV | 22% DMA | 50000 AON | QIB | — |
| INV | 40% FTS | 50000/20000MIN | ISS | 1.75 | ISS | 20% DMA | 100000/20000MIN | ANY | 1.50 |

IN THIS EXAMPLE, COUNTER PARTY CHOOSES TO PURCHASE RS AT A LOWER DISCOUNT TO COMPLY WITH REGULATORY OR OTHER CRITERIA

RSTS NO MARKET TRADABLE

| SYMBOL.R | FT PRICE | MARKET CAP | LIQUIDITY |
|---|---|---|---|
| AFFX | 7.48 | 623 MM | M |
| ANR | 4.89 | 719 MM | H |
| ARIA | 8.11 | 1.3 B | M |
| ASUR | 6.67 | 32 MM | L |
| BLDP | 5.39 | 504 MM | H |
| CMSB | 9.17 | 22 MM | L |
| EDGW | 6.98 | 80 MM | M |
| E | 15.61 | 68 B | H |
| FCEL | 3.35 | 850 MM | H |
| FULL | 8.81 | 35 MM | L |
| HMNF | 12.89 | 50 MM | L |
| JBLU | 8.98 | 3.3 B | H |
| JFBI | 7.77 | 45 MM | M |
| MOBI | 9.56 | 207 MM | L |
| NLY | 10.96 | 10.7 B | H |
| NYMT | 7.57 | 625 MM | M |
| PBR | 10.90 | 134 B | H |
| PLBC | 6.35 | 35 MM | M |
| PXLW | 6.85 | 98 MM | L |
| PWX | 17.91 | 85 MM | M |
| RIGL | 4.52 | 289 MM | M |
| SBCF | 11.38 | 248 MM | L |
| SKUL | 9.23 | 202 MM | H |
| SPLS | 11.48 | 8 B | L |
| VALE | 13.04 | 42.8 B | H |
| VVTV | 5.77 | 252 MM | M |

STREAMING PERCENTAGE DISCOUNT TO FT SHARES

| SYMBOL.R | CURRENT DISC | FT PRICE | RS PRICE | |
|---|---|---|---|---|
| CFBK | 25% | 1.51 | 1.13 | MARKET DEPTH |
| ASRV | 20% | 3.27 | 2.62 | MARKET DEPTH |
| PPHM | 15% | 2.40 | 2.04 | MARKET DEPTH |
| AMDA | 13% | 7.31 | 6.36 | MARKET DEPTH |
| SIRI | 13% | 3.51 | 3.05 | MARKET DEPTH |
| WRES | 13% | 4.61 | 4.01 | MARKET DEPTH |
| ERII | 10% | 6.04 | 5.47 | MARKET DEPTH |
| XOMA | 8% | 6.33 | 5.82 | MARKET DEPTH |
| ICP | 8% | 7.28 | 6.70 | MARKET DEPTH |
| S | 8% | 8.63 | 7.94 | MARKET DEPTH |
| HBAN | 7% | 9.81 | 9.12 | MARKET DEPTH |
| RF | 7% | 11.05 | 10.28 | MARKET DEPTH |
| TSBK | 6% | 11.20 | 10.53 | MARKET DEPTH |
| WXYZ | 6% | 38.11 | 35.82 | MARKET DEPTH |
| PLUG | 5% | 8.27 | 7.86 | MARKET DEPTH |
| KEY | 5% | 13.89 | 13.2 | MARKET DEPTH |

STREAMING PERCENTAGE DISCOUNT TO MOVING AVERAGE

| SYMBOL.R | CURRENT DISC | FT PRICE | RS PRICE | |
|---|---|---|---|---|
| BABB | 30% 30D | 0.83 | 0.58 | MARKET DEPTH |
| MSTX | 30% 30D | 0.8368 | 0.58 | MARKET DEPTH |
| MVIS | 22% 10D | 2.23 | 1.74 | MARKET DEPTH |
| AAME | 14% 10D | 3.58 | 3.08 | MARKET DEPTH |
| PDO | 8% 10D | 6.57 | 6.04 | MARKET DEPTH |

RSTS STOCKS BY MARKET DEPTH

| SYMBOL.R | FT PRICE | BIDS | OFFERS | | SYMBOL.R | FT PRICE | BIDS | OFFERS | |
|---|---|---|---|---|---|---|---|---|---|
| XOMA | 6.33 | 5 | 2 | MARKET DEPTH | ERII | 6.04 | 0 | 1 | MARKET DEPTH |
| WXYZ | 38.11 | 5 | 2 | MARKET DEPTH | ASUR | 6.67 | 1 | 0 | MARKET DEPTH |
| SIRI | 3.51 | 4 | 2 | MARKET DEPTH | EDGW | 6.98 | 1 | 0 | MARKET DEPTH |
| PBR | 10.90 | 6 | 0 | MARKET DEPTH | FUEL | 8.81 | 1 | 0 | MARKET DEPTH |
| E | 15.61 | 5 | 0 | MARKET DEPTH | WRES | 4.61 | 0 | 1 | MARKET DEPTH |
| KEY | 13.89 | 4 | 1 | MARKET DEPTH | HMNF | 12.89 | 1 | 0 | MARKET DEPTH |
| SPLS | 11.48 | 5 | 0 | MARKET DEPTH | JFBI | 7.77 | 1 | 0 | MARKET DEPTH |
| TSKB | 11.20 | 2 | 2 | MARKET DEPTH | PLBC | 6.35 | 1 | 0 | MARKET DEPTH |
| ASRV | 3.27 | 3 | 1 | MARKET DEPTH | IBLU | 8.98 | 0 | 0 | MARKET DEPTH |
| MVIS | 2.23 | 2 | 2 | MARKET DEPTH | MOBI | 9.56 | 0 | 0 | MARKET DEPTH |
| BLDP | 5.39 | 3 | 0 | MARKET DEPTH | ARIA | 8.11 | 0 | 0 | MARKET DEPTH |
| PDQ | 6.57 | 2 | 1 | MARKET DEPTH | SKUL | 9.23 | 0 | 0 | MARKET DEPTH |
| AMDA | 7.31 | 2 | 1 | MARKET DEPTH | NLY | 10.96 | 0 | 0 | MARKET DEPTH |
| PHM | 2.40 | 2 | 1 | MARKET DEPTH | VVTV | 5.77 | 0 | 0 | MARKET DEPTH |
| ICP | 7.28 | 2 | 2 | MARKET DEPTH | ANR | 4.89 | 0 | 0 | MARKET DEPTH |
| PLUG | 8.27 | 0 | 1 | MARKET DEPTH | CMSB | 9.17 | 0 | 0 | MARKET DEPTH |
| CFBK | 1.51 | 1 | 1 | MARKET DEPTH | PXLW | 6.85 | 0 | 0 | MARKET DEPTH |
| PWX | 17.91 | 2 | 0 | MARKET DEPTH | SRCF | 11.38 | 0 | 0 | MARKET DEPTH |
| MSTX | 0.83 | 1 | 1 | MARKET DEPTH | NYMT | 7.57 | 0 | 0 | MARKET DEPTH |
| RF | 11.05 | 0 | 2 | MARKET DEPTH | RIGL | 4.52 | 0 | 0 | MARKET DEPTH |
| S | 8.63 | 0 | 2 | MARKET DEPTH | VALE | 13.04 | 0 | 0 | MARKET DEPTH |
| AAME | 3.58 | 1 | 1 | MARKET DEPTH | POZN | 8.23 | 0 | 0 | MARKET DEPTH |
| BABB | 0.8 | 1 | 1 | MARKET DEPTH | AFFX | 7.47 | 0 | 0 | MARKET DEPTH |
| HABN | 0.81 | 0 | 1 | MARKET DEPTH | FCEL | 3.35 | 0 | 0 | MARKET DEPTH |

FIG. 71

RSTS REGISTERED COMPANIES

| SYMBOL.R | | FT PRICE | NET CHANGE | | SYMBOL.R | | FT PRICE | NET CHANGE |
|---|---|---|---|---|---|---|---|---|
| U BID | AAME | 3.58 | -0.12 (3.24%) | C BID | MVIS | 2.23 | 0.02 (0.90%) |
| C BID | AFFX | 7.48 | -0.34 (-4.35%) | U BID | NLY | 10.96 | -0.25 (-2.23%) |
| C BID | AMDA | 7.31 | -0.09 (-1.22%) | U BID | NYMT | 7.57 | -0.21 (-2.70%) |
| U BID | ANF | 4.89 | -0.56 (-10.22%) | U BID | PBR | 10.90 | -0.28 (2.50%) |
| U BID | ARIA | 8.11 | -0.18 (-2.15%) | C BID | PDO | 6.57 | -0.12 (-1.76%) |
| C BID | ASPV | 3.27 | 0.03 (0.99%) | U BID | PLBC | 6.35 | 0.00 (0.00%) |
| U BID | ASUR | 6.67 | -0.03 (-0.45%) | | PLUG | 8.27 | 1.91 (30.03%) |
| C BID | BABB | 0.80 | 0.03 (3.75%) | U BID | POZN | 8.23 | 0.02 (0.24%) |
| U BID | BLDP | 5.39 | 0.21 (4.13%) | C BID | PPHM | 2.4 | -0.21 (-8.05%) |
| C BID | CFBK | 1.51 | -0.1099 (-7.07%) | U BID | PW | 17.91 | -0.11 (-0.85%) |
| U BID | CMSB | 9.17 | 0.22 (5.11%) | U BID | PXLW | 6.68 | -0.22 (-23.89%) |
| U BID | EDGW | 6.98 | 0.14 (2.04%) | | RF | 11.50 | 0.22 (2.03%) |
| | ERII | 6.04 | -0.49 (-7.55%) | U BID | RIGL | 4.52 | 0.00 (0.00%) |
| U BID | F | 15.61 | -0.11 (-0.70%) | | S | 8.63 | -0.25 (-2.38%) |
| U BID | FCEL | 3.35 | 0.360 (12.34%) | U BID | SBCF | 11.38 | 0.11 (0.88%) |
| U BID | FULL | 8.81 | -0.12 (-1.34%) | U BID | SPLS | 11.48 | 0.13 (1.14%) |
| | HBAN | 0.81 | 0.11 (1.83%) | C BID | SIRI | 3.51 | -0.05 (-1.20%) |
| U BID | HMNF | 12.89 | 0.329 (2.62%) | U BID | SKUL | 9.23 | 1.80 (24.33%) |
| U BID | JBLU | 8.98 | -0.039 (-0.43%) | C BID | TSBK | 11.20 | 0.18 (1.45%) |
| U BID | JCP | 7.28 | -1.36 (-15.11%) | U BID | VALE | 13.04 | -0.70 (-5.09%) |
| C BID | JFBI | 7.77 | 0.11 (5.02%) | U BID | VVTV | 5.77 | -0.24 (-3.99%) |
| U BID | KEY | 13.89 | 0.25 (1.83%) | | WRES | 4.61 | 0.10 (2.22%) |
| C BID | MOBI | 9.56 | 0.17 (1.85%) | C BID | WXYZ | 38.11 | 0.00 (0.00%) |
| C BID | MSTX | 0.8368 | -0.0086 (-1.01%) | C BID | XOMA | 6.33 | -0.22 (-3.35%) |

FIG. 72

RSTS REGISTERED COMPANIES

| | SYMBOL.R | FT PRICE | NET CHANGE | | SYMBOL.R | FT PRICE | NET CHANGE |
|---|---|---|---|---|---|---|---|
| U BID | AAME | 3.58 | -0.12 (3.24%) | C BID | MVIS | 2.23 | 0.02 (0.90%) |
| C BID | AFFX | 7.48 | -0.34 (-4.35%) | U BID | NLY | 10.96 | -0.25 (-2.23%) |
| C BID | AMDA | 7.31 | -0.09 (-1.22%) | U BID | NYMT | 7.57 | -0.21 (-2.70%) |
| U BID | ANF | 4.89 | -0.56 (-10.22%) | U BID | PBR | 10.90 | -0.28 (2.50%) |
| U BID | ARIA | 8.11 | -0.18 (-2.15%) | C BID | PDO | 6.57 | -0.12 (-1.76%) |
| C BID | ASPV | 3.27 | 0.03 (0.99%) | U BID | PLBC | 6.35 | 0.00 (0.00%) |
| U BID | ASUR | 6.67 | -0.03 (-0.45%) | | PLUG | 8.27 | 1.91 (30.03%) |
| C BID | BABB | 0.80 | 0.03 (3.75%) | U BID | PQ | 8.23 | 0.02 (0.24%) |
| U BID | BLDP | 5.39 | 0.21 (4.13%) | C BID | PPHM | 2.4 | -0.21 (-8.05%) |
| C BID | CFBK | 1.51 | -0.1099 (-7.07%) | U BID | PWX | 17.91 | -0.11 (-0.85%) |
| U BID | CMSB | 9.17 | 0.22 (5.11%) | U BID | PXLW | 6.68 | -0.22 (-23.89%) |
| U BID | EDGW | 6.98 | 0.14 (2.04%) | | RF | 11.50 | 0.22 (2.03%) |
| | ERII | 6.04 | -0.49 (-7.55%) | U BID | RIGL | 4.52 | 0.00 (0.00%) |
| U BID | F | 15.61 | -0.11 (-0.70%) | | S | 8.63 | -0.25 (-2.38%) |
| U BID | FCEL | 3.35 | 0.360 (12.34%) | U BID | SBCF | 11.38 | 0.11 (0.88%) |
| U BID | FULL | 8.81 | -0.12 (-1.34%) | U BID | SPLS | 11.48 | 0.13 (1.14%) |
| | HBAN | 0.81 | 0.11 (1.83%) | C BID | SIRI | 3.51 | -0.05 (-1.20%) |
| U BID | HMNF | 12.89 | 0.329 (2.62%) | U BID | SKUL | 9.23 | 1.80 (24.33%) |
| U BID | JBLU | 8.98 | -0.039 (-0.43%) | C BID | TSBK | 11.20 | 0.18 (1.45%) |
| C BID | JCP | 7.28 | -1.36 (-15.11%) | U BID | VALE | 13.04 | -0.70 (-5.09%) |
| U BID | JFBI | 7.77 | 0.11 (5.02%) | U BID | VVTV | 5.77 | -0.24 (-3.99%) |
| C BID | KEY | 13.89 | 0.25 (1.83%) | | WRES | 4.61 | 0.10 (2.22%) |
| U BID | MOBI | 9.56 | 0.17 (1.85%) | C BID | WXYZ | 38.11 | 0.00 (0.00%) |
| C BID | MSTX | 0.8368 | -0.0086 (-1.01%) | C BID | XOMA | 6.33 | -0.22 (-3.35%) |

FIG. 73

RSTS REGISTERED COMPANIES

| | SYMBOL.R | FT PRICE | NET CHANGE | | SYMBOL.R | FT PRICE | NET CHANGE |
|---|---|---|---|---|---|---|---|
| U BID | AAME | 3.58 | -0.12 (3.24%) | C BID | MVIS | 2.23 | 0.02 (0.90%) |
| C BID | AFFX | 7.48 | -0.34 (-4.35%) | U BID | NLY | 10.96 | -0.25 (-2.23%) |
| C BID | AMDA | 7.31 | -0.09 (-1.22%) | U BID | NYMT | 7.57 | -0.21 (-2.70%) |
| U BID | ANF | 4.89 | -0.56 (-10.22%) | U BID | PBR | 10.90 | -0.28 (2.50%) |
| U BID | ARIA | 8.11 | -0.18 (-2.15%) | C BID | PDO | 6.57 | -0.12 (-1.76%) |
| C BID | ASPV | 3.27 | 0.03 (0.99%) | U BID | PLBC | 6.35 | 0.00 (0.00%) |
| U BID | ASUR | 6.67 | -0.03 (-0.45%) | | PLUG | 8.27 | 1.91 (30.03%) |
| C BID | BAP | 0.80 | 0.03 (3.75%) | U BID | POZN | 8.23 | 0.02 (0.24%) |
| U BID | BLDP | 5.39 | 0.21 (4.13%) | C BID | PPHM | 2.4 | -0.21 (-8.05%) |
| C BID | CFBK | 1.51 | -0.1099 (-7.07%) | U BID | PWX | 17.91 | -0.11 (-0.85%) |
| U BID | CMSB | 9.17 | 0.22 (5.11%) | U BID | PXLW | 6.68 | -0.22 (-23.89%) |
| U BID | EDGW | 6.98 | 0.14 (2.04%) | | RF | 11.50 | 0.22 (2.03%) |
| | ERII | 6.04 | -0.49 (-7.55%) | U BID | RIGL | 4.52 | 0.00 (0.00%) |
| U BID | F | 15.61 | -0.11 (-0.70%) | | S | 8.63 | -0.25 (-2.38%) |
| U BID | FCEL | 3.35 | 0.360 (12.34%) | U BID | SBCF | 11.38 | 0.11 (0.88%) |
| U BID | FULL | 8.81 | -0.12 (-1.34%) | U BID | SPLS | 11.48 | 0.13 (1.14%) |
| | HBAN | 0.81 | 0.11 (1.83%) | C BID | SIRI | 3.51 | -0.05 (-1.20%) |
| U BID | HMNF | 12.89 | 0.329 (2.62%) | U BID | SKUL | 9.23 | 1.80 (24.33%) |
| U BID | JBLU | 8.98 | -0.039 (-0.43%) | C BID | TSBK | 11.20 | 0.18 (1.45%) |
| U BID | JCP | 7.28 | -1.36 (-15.11%) | U BID | VALE | 13.04 | -0.70 (-5.09%) |
| C BID | JFBI | 7.77 | 0.11 (5.02%) | U BID | VVTV | 5.77 | -0.24 (-3.99%) |
| C BID | KEY | 13.89 | 0.25 (1.83%) | | WRES | 4.61 | 0.10 (2.22%) |
| U BID | MOBI | 9.56 | 0.17 (1.85%) | C BID | WXYZ | 38.11 | 0.00 (0.00%) |
| C BID | MSTX | 0.8368 | -0.0086 (-1.01%) | C BID | XOMA | 6.33 | -0.22 (-3.35%) |

FIG. 74

RSTS INVESTOR ACCOUNT SCREEN

| TOTAL CASH | | FREE CASH BALANCE | | PENDING CASH BALANCE | | | | |
|---|---|---|---|---|---|---|---|---|
| $2,000,000 | | $2,000,000 | | N/A | | | | |

| | SYMBOL | QTY. | PUR. DATE | PRICE PAID | CUR. FT PRICE | DAYS AT MAT. | TRANSAC. FEE | TRANSAC. COST | TOTAL | TRANSAC.# |
|---|---|---|---|---|---|---|---|---|---|---|
| LEGAL | | | | | | | | | | |
| STOCK | | | | | | | | | | |
| PENDING | | | | | | | | | | |

CASH

FIG. 77

RSTS ISSUER ACCOUNT SCREEN

| TOTAL CASH | | FREE CASH BALANCE | | | | PENDING CASH BALANCE | | |
|---|---|---|---|---|---|---|---|---|
| $0 | | $0 | | | | N/A | | |

| SYMBOL | QTY. | PUR. DATE | PRICE PAID | CUR. FT PRICE | DAYS AT MAT. | TRANSAC. FEE | TRANSAC. COST | TOTAL | TRANSAC. # |
|---|---|---|---|---|---|---|---|---|---|
| WXYZ.R | 250,000 | | | $38.06 | | | | | |
| SYMBOL | QTY. | PUR. DATE | PRICE PAID | CUR. FT PRICE | DAYS AT MAT. | TRANSAC. FEE | TRANSAC. COST | TOTAL | TRANSAC. # |
| SYMBOL | QTY. | PUR. DATE | PRICE PAID | CUR. FT PRICE | DAYS AT MAT. | TRANSAC. FEE | TRANSAC. COST | TOTAL | TRANSAC. # |

CASH
LEGAL
STOCK
PENDING

FIG. 78

RSTS ISSUER ACCOUNT SCREEN

| CASH | TOTAL CASH |
|---|---|
| | $0 |

| | FREE CASH BALANCE |
|---|---|
| | $0 |

| | PENDING CASH BALANCE |
|---|---|
| | $260,405 |

| LEGAL | SYMBOL | QTY. | PUR. DATE | PRICE PAID | CUR. FT PRICE | DAYS AT MAT. | TRANSAC. FEE | TRANSAC. COST | TOTAL | TRANSAC.# |
|---|---|---|---|---|---|---|---|---|---|---|
| | WXYZ.R | 242,500 | | | $38.06 | | | | | |

| STOCK | SYMBOL | QTY. | PUR. DATE | PRICE PAID | CUR. FT PRICE | DAYS AT MAT. | TRANSAC. FEE | TRANSAC. COST | TOTAL | TRANSAC.# |
|---|---|---|---|---|---|---|---|---|---|---|
| | | | | | | | | | | |

| PENDING | SYMBOL | QTY. | PUR. DATE | PRICE PAID | CUR. FT PRICE | DAYS AT MAT. | TRANSAC. FEE | TRANSAC. COST | TOTAL | TRANSAC.# |
|---|---|---|---|---|---|---|---|---|---|---|
| | WXYZ.R | 7,500 | | | $38.06 | | $1,045 | $261,450 | $262,495 | 727461 |

FIG. 79

RSTS ISSUER ACCOUNT SCREEN

| | TOTAL CASH | | | FREE CASH BALANCE | | | | PENDING CASH BALANCE | | |
|---|---|---|---|---|---|---|---|---|---|---|
| CASH | $260,405 | | | $260,405 | | | | N/A | | |

| | SYMBOL | QTY. | PUR. DATE | PRICE PAID | CUR. FT PRICE | DAYS AT MAT. | TRANSAC. FEE | TRANSAC. COST | TOTAL | TRANSAC.# |
|---|---|---|---|---|---|---|---|---|---|---|
| LEGAL | WXYZ.R | 242,500 | | | $38.06 | | | | | |
| STOCK | SYMBOL | QTY. | PUR. DATE | PRICE PAID | CUR. FT PRICE | DAYS AT MAT. | TRANSAC. FEE | TRANSAC. COST | TOTAL | TRANSAC.# |
| PENDING | SYMBOL | QTY. | PUR. DATE | PRICE PAID | CUR. FT PRICE | DAYS AT MAT. | TRANSAC. FEE | TRANSAC. COST | TOTAL | TRANSAC.# |

FIG. 80

RSTS "ISSUER" ACTIVITY SCREEN

———————————————— 7/18/2014 ————————————————

ACCOUNT #637423 APPROVED. STATUS- *QUALIFIED ISSUER*.

———————————————— 8/3/2014 ————————————————

250,00 SHARES WXYZ CORPORATION RESTRICTED RECEIVED FROM ABC TRANSFER LLC.

———————————————— 8/4/2014 ————————————————

OFFER POSTED WXYZ.R 6% DFT 10,000/5,000 MIN. $33.50 MIN PRICE GTC.

———————————————— 8/5/2014 ————————————————

TRANSACTION #727461 - SOLD -7,500 WXYZ.R SHARES SOLD TO INV. *PENDING*
    -7,500 WXYZ.R PENDING
      -$260,405 PENDING

———————————————— 8/13/2014 ————————————————

TRANSACTION #727461 - APPROVED
    7,500 WXYZ.R TRANSFERRED TO INV.

———————————————— 8/17/2014 ————————————————

TRANSACTION #727461 - FORM 8K FILED WITH SEC.

FIG. 81

RSTS INVESTOR ACCOUNT SCREEN

| CASH | TOTAL CASH | | | FREE CASH BALANCE | | | | PENDING CASH BALANCE | | |
|---|---|---|---|---|---|---|---|---|---|---|
| | $2,000,000 | | | $1,738,550 | | | | $262,495 | | |

| LEGAL | SYMBOL | QTY. | PUR. DATE | PRICE PAID | CUR. FT PRICE | DAYS AT MAT. | TRANSAC. FEE | TRANSAC. COST | TOTAL | TRANSAC.# |
|---|---|---|---|---|---|---|---|---|---|---|
| | WXYZ.R | 242,500 | | | | | | | | |

| STOCK | SYMBOL | QTY. | PUR. DATE | PRICE PAID | CUR. FT PRICE | DAYS AT MAT. | TRANSAC. FEE | TRANSAC. COST | TOTAL | TRANSAC.# |
|---|---|---|---|---|---|---|---|---|---|---|
| | | | | | $38.06 | | | | | |

| PENDING | SYMBOL | QTY. | PUR. DATE | PRICE PAID | CUR. FT PRICE | DAYS AT MAT. | TRANSAC. FEE | TRANSAC. COST | TOTAL | TRANSAC.# |
|---|---|---|---|---|---|---|---|---|---|---|
| | WXYZ.R | 7,500 | 8/5/2014 | $34.86 | $38.06 | 184 | $1,045 | $261,450 | $262,495 | 727461 |

FIG. 82

RSTS INVESTOR ACCOUNT SCREEN

| CASH | TOTAL CASH | | FREE CASH BALANCE | | | | PENDING CASH BALANCE | | |
|---|---|---|---|---|---|---|---|---|---|
| | $1,738,550 | | $1,738,550 | | | | N/A | | |

| LEGAL | SYMBOL | QTY. | PUR. DATE | PRICE PAID | CUR. FT PRICE | DAYS AT MAT. | TRANSAC. FEE | TRANSAC. COST | TOTAL | TRANSAC. # |
|---|---|---|---|---|---|---|---|---|---|---|
| | WXYZR | 7,500 | 8/5/2014 | $34.86 | $38.06 | 176 | $1,045 | $261,450 | $262,495 | 727461 |

| STOCK | SYMBOL | QTY. | PUR. DATE | PRICE PAID | CUR. FT PRICE | DAYS AT MAT. | TRANSAC. FEE | TRANSAC. COST | TOTAL | TRANSAC. # |
|---|---|---|---|---|---|---|---|---|---|---|
| | | | | | | | | | | |

| PENDING | SYMBOL | QTY. | PUR. DATE | PRICE PAID | CUR. FT PRICE | DAYS AT MAT. | TRANSAC. FEE | TRANSAC. COST | TOTAL | TRANSAC. # |
|---|---|---|---|---|---|---|---|---|---|---|
| | | | | | | | | | | |

FIG. 83

RSTS INVESTOR ACTIVITY SCREEN

——————————————— 6/26/2014 ———————————————

ACCOUNT #727461 APPROVED FOR TRADING. STATUS- *QUALIFIED ISSUER (?)*

——————————————— 7/17/2014 ———————————————

FUNDS DEPOSITED - 2,000,000.00

——————————————— 8/5/2014 ———————————————

TRANSACTION #727461- BOUGHT 7,500 WXYZ CORPORATION RESTRICTED. SYMBOL- WXYZ

——————————————— 8/13/2014 ———————————————

TRANSACTION #727461- APPROVED
7,500 WXYZ.R TRANSFERRED FROM ACCOUNT #727461- PENDING TO ACCOUNT#727461-LEGAL - $262,495

——————————————— 2/5/2014 ———————————————

TRANSACTION #727461 - LEGAL DOCUMENTS TRANSFERRED

——————————————— 2/7/2014 ———————————————

TRANSACTION #727461 - LEGAL OPINION RECEIVED FROM COMPLIENCE COUNCIL LLP

——————————————— 2/8/2014 ———————————————

TRANSACTION #727461 - LEGAL OPINION SENT TO ABC TRANSFER LLC
TRANSFER FEE PAID - $75.00

——————————————— 2/9/2014 ———————————————

TRANSACTION #727461 - 7,500 WXYZ.R DEBIT FROM ACCOUNT #727461- LEGAL 7,500 WXYZ CREDIT TO ACCOUNT #727461- STOCK
  PROCESING FEE PAID- $100.00

FIG. 84

RSTS INVESTOR ACCOUNT SCREEN

| CASH | TOTAL CASH |
|---|---|
| | $1,738,550 |

| | FREE CASH BALANCE | PENDING CASH BALANCE |
|---|---|---|
| | $1,738,550 | N/A |

| LEGAL | SYMBOL | QTY. | PUR. DATE | PRICE PAID | CUR. FT PRICE | DAYS AT MAT. | TRANSAC. FEE | TRANSAC. COST | TOTAL | TRANSAC.# |
|---|---|---|---|---|---|---|---|---|---|---|

| STOCK | SYMBOL | QTY. | PUR. DATE | PRICE PAID | CUR. FT PRICE | DAYS AT MAT. | TRANSAC. FEE | TRANSAC. COST | TOTAL | TRANSAC.# |
|---|---|---|---|---|---|---|---|---|---|---|
| | WXYZR | 7,500 | 8/5/2014 | $34.86 | $37.79 | N/A | $1,045 | $261,450 | $262,495 | 727461 |

| PENDING | SYMBOL | QTY. | PUR. DATE | PRICE PAID | CUR. FT PRICE | DAYS AT MAT. | TRANSAC. FEE | TRANSAC. COST | TOTAL | TRANSAC.# |
|---|---|---|---|---|---|---|---|---|---|---|

FIG. 87

NON ACCREDITED INVESTOR ELIGIBLE OFFERINGS

| NAI | NAI REMAINING | PRICE | % DISCOUNT | MKT DEPTH |
|---|---|---|---|---|
| AAME | 32 | 3.58 | 30% | MARKET DEPTH |
| AMDA | UNLIMITED | 7.31 | 13% | MARKET DEPTH |
| ASRV | 14 | 3.27 | 20% | MARKET DEPTH |
| BABB | 13 | 0.80 | 30% | MARKET DEPTH |
| CFBK | 6 | 1.51 | 25% | MARKET DEPTH |
| JCP | 33 | 7.28 | 9% | MARKET DEPTH |
| KEY | 8 | 6.33 | 5% | MARKET DEPTH |
| MSTX | 27 | 0.8368 | 30% | MARKET DEPTH |
| MVIS | 16 | 2.23 | 22% | MARKET DEPTH |
| PDO | UNLIMITED | 6.57 | 8% | MARKET DEPTH |
| PPHM | UNLIMITED | 2.40 | 15% | MARKET DEPTH |

FIG. 88

COMPUTER-IMPLEMENTED TRADING SYSTEM FOR DYNAMIC MARKET IN RESTRICTED SECURITIES

CROSS-REFERENCE TO RELATED APPLICATIONS

This U.S. non-provisional patent application is a continuation of co-pending U.S. non-provisional patent application Ser. No. 14/682,886, filed on Apr. 9, 2015, which is in turn a continuation-in-part of U.S. non-provisional patent application Ser. No. 14/590,586, filed on Jan. 6, 2015, which is in turn a continuation-in-part of U.S. non-provisional patent application Ser. No. 14/515,063, filed on Oct. 15, 2014, which, in turn, claims the benefit of U.S. provisional patent application No. 61/891,532, filed on Oct. 16, 2013, the entire contents of all of which are incorporated herein by reference for all purposes.

FIELD OF THE INVENTION

The present invention relates generally to automated bidding securities exchanges in the financial services industry. More particularly, the invention pertains to a computer-implemented system and related methods for facilitating restricted securities transactions via a closed loop, real-time exchange for restricted stock in publically-traded securities. The system may be qualified and regulated as an exchange, as a broker-dealer trading system, as a multilateral trading facility, and as an Alternative Trading System.

BACKGROUND OF THE INVENTION

Automated securities trading systems are well known in the art, as are systems for automated bidding, valuation, accreditation and exchange of securities. However, there has been a long-standing, well-recognized, unmet need for an automated, real time market for the exchange of restricted securities. Companies often issue restricted stock for various purposes, such as, for example, to provide a form of compensation, to provide a means for raising capital through private investment, and as a component of a corporate reorganization. Such restricted stocks are often sold through broker "networks," in which brokers negotiate value for purchase and sale in what can only be termed an "old school" fashion—particularly in light of the penchant for modern era, electronically-based trading. Restricted securities comprise an estimated one-trillion dollar market, with only a cumbersome and highly-regulated means available for trade Generally, such restricted securities may include stocks, options, warrants or restricted share units. Numerous accreditation and documentation requirements limit the availability and exchange of restricted securities. Navigating through such inherent limitations can be painstaking and tedious.

While there are numerous methods and automated mechanisms facilitating the transfer of publically-traded securities, effective means for facilitating the automatic placement and sale of restricted securities are completely lacking for a variety of reasons. Primarily, transfers are restricted by regulatory authorities, transfer agents, broker-dealers, clearing firms and/or by the issuer of the interest itself.

At a most-basic level, it is simply difficult for buyers and sellers of restricted securities to efficiently identify one other, let alone come to terms falling within regulatory and issuer-imposed restrictions. Furthermore, even where this initial "identification/terms" hurdle is overcome; it is necessary to address the further inherent difficulties efficiently identifying the valuation of a restricted interest vis-à-vis valuation of a corresponding publically-traded interest. As is well known to those experienced in the restricted securities industry, trading within this market is limited in large measure by its inherent opacity, or lack of transparency, and inefficiency.

Still a further obstacle to the placement, registration and sale, of restricted securities results from the difficulty attendant with merely identifying a brokerage firm or clearing house willing to accept such securities for deposit or sale. One reason that brokerage firms and clearing houses have been increasingly less willing to accept restricted securities for deposit or sale is directly related to compliance requirements imposed by Financial Industry Regulatory Authority (FINRAa) Regulatory Notice 09-05, which reminds firms of their responsibilities to ensure that they comply with the federal securities laws and FINRA rules when participating in unregistered resale of restricted securities, particularly in situations where the surrounding circumstances place the firm on notice that it may be participating in illegal, unregistered resale of restricted securities, such as when a customer physically deposits certificates or transfers in large blocks of securities and the firm does not know the source of the securities.

As a result of FINRA Regulatory Notice 09-05 (April 2010), there has been an increase in the responsibility imposed upon financial institutions with regard to allowing unqualified investors or purveyors of fraudulent schemes to trade in these, often thinly-traded and speculative, securities. An additional reason that financial institutions have by-and-large chosen not to accept private placements is the increasing incidence of fraudulent-based certificates and related supporting documents. The refusal of these institutions to accept restricted shares has severely hampered the corresponding market for these types of securities.

Accordingly, there is a well-recognized, as of yet unmet, need in the art for a novel system and corresponding method, which overcome the drawbacks, limitations and disadvantages of currently-employed restricted securities systems and methods. It would be highly desirable to provide such a system and method that effectively overcomes the aforementioned imposed challenges, by enabling and facilitating real time exchange of information, regulatory clearance, valuation and transfer of interest.

SUMMARY OF THE INVENTION

The present invention effectively addresses and solves the aforementioned drawbacks, disadvantages and limitations of the prior art, by providing a Restricted Shares Trading System (alternatively referred to herein as "RSTS," and the "System") and corresponding computer-implemented methods for facilitating the dynamic valuation and exchange of restricted securities in real time.

In a preferred implementation, the process: (1) qualifies investors, using adjustable parameters adapted to comply with changing regulatory schemes; (2) qualifies issuers, using adjustable parameters adapted to comply with changing regulatory schemes; (3) qualifies Insider and Control parties, using parameters adapted to comply with changing regulatory schemes; (4) facilitates an automated online bidding and offering process, functioning as an auction system for primary placement of restricted securities; (5) facilitates an offering process for the resale of restricted securities; (6) ensures regulatory compliance; (7) ensures cross reference trade compliance and eligibility of counter parties; and (8) incorporates adjustable bid and offer calculations based upon modifiable discount points. The system processes information in real time, thereby facilitating information exchange and automated updates, valuation, auction and bidding, and compliance procedures.

BRIEF DESCRIPTION OF THE DRAWINGS

The invention will now be described, by way of example, with reference to the accompanying drawings, where like numerals denote like elements, and in which:

FIG. 4. illustrates an exemplary default screen for primary issuers of liquid shares, wherein an Issuer determines: (a) how many restricted shares they wish to offer; (b) whether they have a minimum purchase requirement; (c) a percentage discount from the current price; (d) whether they are discounting off of the current price or off of a trailing moving average; (e) a minimum price at which they are willing to sell the restricted securities, if any; and, (f) the duration of the order. Here, the Issuer further determines a minimum price at which they are willing to sell the restricted securities, if any, and the duration of the order. Here, the Issuer elects whether to accept counter bids and private counter offers for their restricted share offering (second in the sequence of the Primary Offer process—Liquid Issuer);

FIG. 5. Illustrates an exemplary Issuer Offering screen, wherein the Issuer prompts to determine the maximum shares that can be issued in the present placement of restricted securities pursuant to Regulation D. This figure (FIG. 5) illustrates a representative calculation of the lesser of: (a) the number of shares remaining in the Issuer's Regulation D offering; and (b) the maximum number of shares that can be legally placed pursuant to the designated "safe harbor" Rule governing the particular offering (which, in a preferred aspect, is either Rule 505 or Rule 506 of Regulation D). The Maximum Shares figure is automatically calculated (third in the sequence of the Primary Offer process—Liquid Issuer);

FIG. 8 illustrates the Issuer Offering screen for a primary issuer of illiquid shares. The default screen includes recommendations for pricing illiquid securities (second in the sequence of the Primary Offer process-Illiquid Issuer);

FIG. 9 illustrates the Offering screen for a primary issuer of illiquid shares. This screen displays prompted reasons for caveats, as well as recommendations for pricing a restricted Regulation D offering in illiquid securities (third in the sequence of the Primary Offer process-Illiquid Issuer);

FIG. 10 illustrates the Offer screen for a primary issuer of illiquid shares. The screen displays a greater discount-to-present-price of free trading shares than RS in a more liquid stock (as is typical of Regulation D offerings according to the known art). Shares are offered as a discount-to-moving-average, as per caveat shown on FIG. 9. Typically, Issuers offer greater incentives, such as greater discounts, additional warrants, or warrants that are closer to the current price of the issuer's free trading stock, in traditional Regulation D (Reg. D) offerings. The problem with the current system of Reg. D offerings is twofold: (1) the offering is not "priced" until a day or so prior to the offer and, even in that instance, the price quoted is in terms of a "range;" (2) Meanwhile, the free trading shares continue to fluctuate and the investor's funds are committed. Therefore, the investor has no idea or control over what type of incentive they are receiving in exchange for the less liquid investment in the public company. Also, the present system almost always includes warrants to purchase additional shares as part of a Restricted Share Unit (RSU). These warrants function as an incentive to invest in this illiquid class of investment. The problem with this is that during the period prior to the warrants expiring—sometimes many years—there is almost always pressure on the stock price at or around the exercise price. The warrants are dilutive to the company should they exceed the strike price, therefore creating a so called "overhang" effect to the price of the shares. The system and method in accordance with the present invention provides a more transparent, more liquid means of investing in restricted securities, which is less dilutive to the issuer. The investor knows exactly what price he is paying for these restricted securities at the time funds are committed for purchase. There is no warrant overhang, and the system provides a market for the investor to resell their shares. The present system changes the nature of restricted share investments by introducing real time pricing and greatly enhanced liquidity for the investor, by creating an electronic resale market for restricted securities (fourth in the sequence of the Primary Offer process-Illiquid Issuer).

FIG. 15 illustrates a quote screen listing all companies with tradable restricted securities, in which an Investor selects the "VVTV" stock symbol, and initiates an unsolicited bid for the restricted share offer, indicated on the Quote screen as "U BID." In the example illustrated, availability to place an unsolicited bid indicates that the issuer is not currently offering restricted shares, and is willing to consider unsolicited bids for the same (first in sequence of Investor Unsolicited Bid process);

FIG. 17 illustrates an exemplary Trade screen for "VVTV" stock, wherein the investor selects/prompts for the associated Market Depth screen. This exemplary screen reflects that, presently, there is neither a bid nor offer for restricted securities for VVTV. (Note: On the corresponding Trade screen, investors are able to trade both free trading shares and restricted shares in public companies, which are registered with the system and are accepting bids for restricted securities). (third in sequence of Investor Unsolicited Bid process);

FIG. 20 illustrates an exemplary Trade screen for "VVTV.R" (i.e., restricted shares in VVTV stock), wherein the Investor is ready to set parameters for bid (sixth in sequence of Investor Unsolicited Bid process);

FIG. 23 illustrates present Market Depth screen for VVTV.R. In this example, the investor, denoted as "ME," is the only participant. Eligible counterparties (in accordance with regulations) are displayed. In this instance, Bidder is restricted to purchasing shares from the Issuer or a Qualified Institutional Buyer. (Note: As result of the present bid, VVTV will automatically be delisted from the "No Market Tradable" Offer screen, and VVTV will be automatically added to the "Stocks with Bids Only" Offer screen. The system automatically determines and reflects eligible counterparties based upon desired action and class of market participant (ninth and final in sequence of Investor Unsolicited Bid process);

FIG. 24 illustrates an exemplary Trade screen for stock with a present bid and offer for restricted securities, wherein Investor prompts for a restricted share (RS) quote. If a public company is registered with the system, or if restricted shares are presently held in a shareholder's account within the system, the investor is able to access RS quote, and restricted shares are able to be bid (first in Investor Counter-Bid sequence);

FIG. 25 illustrates an optional exemplary Trade screen for "WYXZ.R" (i.e., restricted shares in "WYXZ" stock), wherein Investor prompts for corresponding Market Depth screen. Again, this is an optional, or non-mandatory, step prior to Bidding for, or Offering, shares. (second in Investor Counter-Bid sequence);

FIG. 26 illustrates a corresponding Market Depth screen for restricted shares in WZYZ (i.e. WXYZ.R), illustrating all bids and offers for restricted securities in WXYZ, in a series listed from the least-discounted bid (i.e., the "high bid") to the most highly-discounted offer (i.e., the "high offer"), as well as other aspects of the bids, offers, and eligible counterparties, in accordance with applicable regulations. This functions as a counter-bid "before" screen (third in Investor Counter-Bid sequence);

Figure 27:
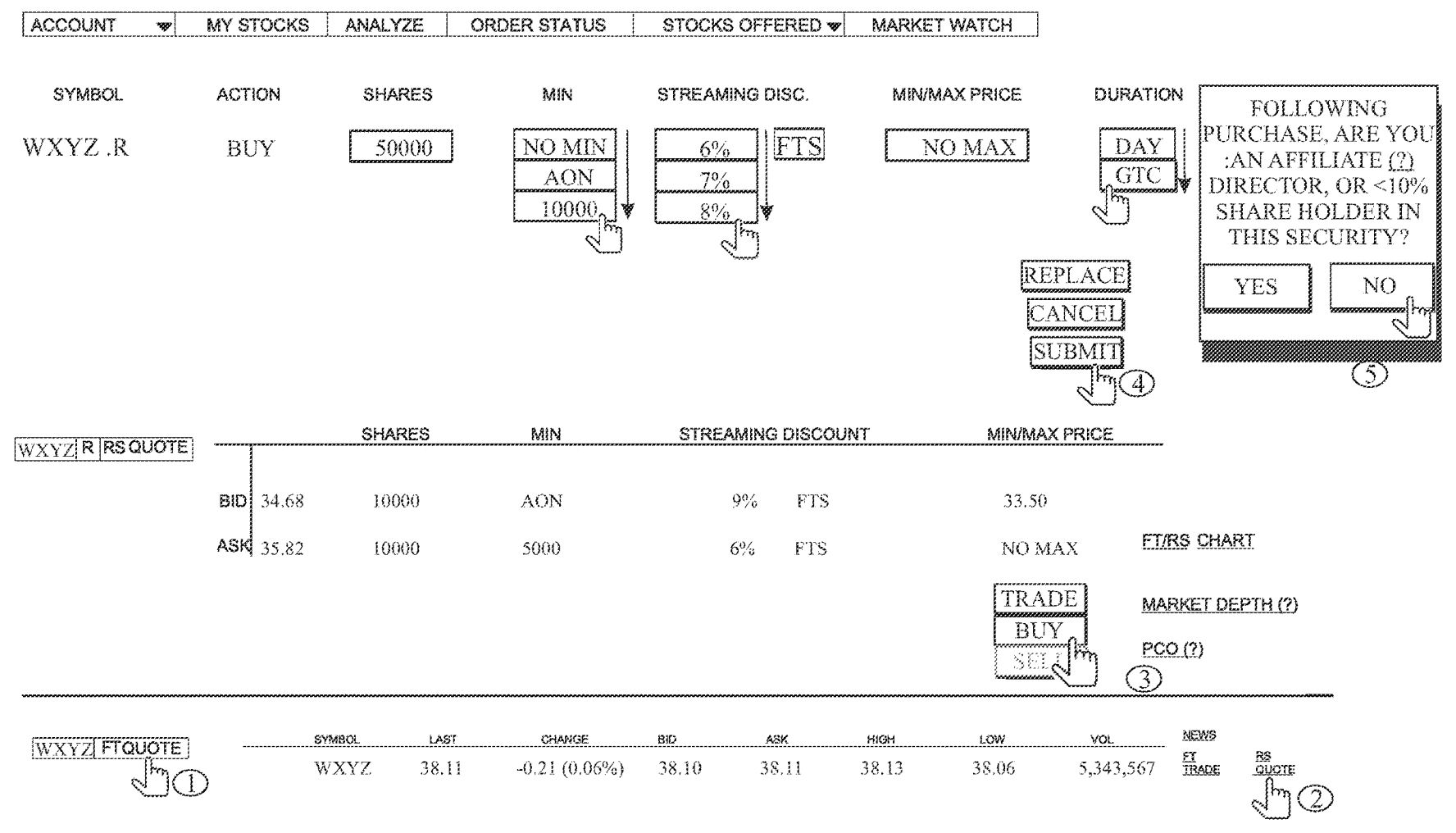

FIG. 27 illustrates an exemplary Trade screen for restricted shares in WXYZ (i.e., WXYZ.R), wherein WXYZ.R is being offered at a 6% streaming discount-to-free-trading shares (or DFT), illustrating a high bid currently at 9% DFT. In this example, the Investor is counterbidding at 8% DFT (fourth in Investor Counter-Bid sequence);

FIG. 28 provides a further illustration of the exemplary Trade screen shown in FIG. 27, wherein the Shareholder is defined as a 10% holder or affiliate. If Investor responds affirmatively when queried for insider status, Investor is subsequently presented with a questionnaire (not shown), the answers to which are used to determine the legality of the trade, and to query Investor whether Investor desires to have the system automatically submit required filings on Investor's behalf, in the event that a trade results (fifth in Investor Counter-Bid sequence);

FIG. 29 illustrates an exemplary Trade screen for WXYZ.R, wherein a counter bid is being submitted (sixth in Investor Counter-Bid sequence);

FIG. 31 illustrates an exemplary revised Market Depth screen for WXYZ.R, wherein Investor's counter bid is displayed as the high bid. Issuer is defined here as an eligible counter party for the selling of QIB. The System provides a method for facilitating Issuer's repurchase of their own restricted securities, in accordance with predetermined rules and regulations. Issuers are offered this optional service upon registration. If Issuer declines this service, issuer may elect to activate this service after registration. If Issuer repurchases shares, automatically populated notifications and filings can be delivered electronically to Issuer and made available to submit to regulatory agencies, if requested. (eighth and final in Investor Counter-Bid sequence);

FIG. 35 illustrates an Investor prompting a quote for a stock, utilizing an optional keyword search methodology in accordance with an exemplary implementation of the present invention (first in Keyword Stock Search sequence);

FIG. 36 illustrates an exemplary Trade screen for a stock that is not registered to sell restricted shares (RS) on the system, wherein the Investor prompts for a restricted share (RS) quote, resulting in the display of an "error" message. In an alternative implementation, optionally, under the same conditions, an RS quote prompt may not be available to be prompted. It should be noted that trading in "free-trading" shares via the present system is available (second and final in Keyword Stock Search sequence);

FIG. 37 illustrates an exemplary Investor dashboard, wherein Investor has prompted a "Stocks Offered By" dropdown menu, displaying various selectable parameters by which restricted securities are available for bid;

Figure 39:
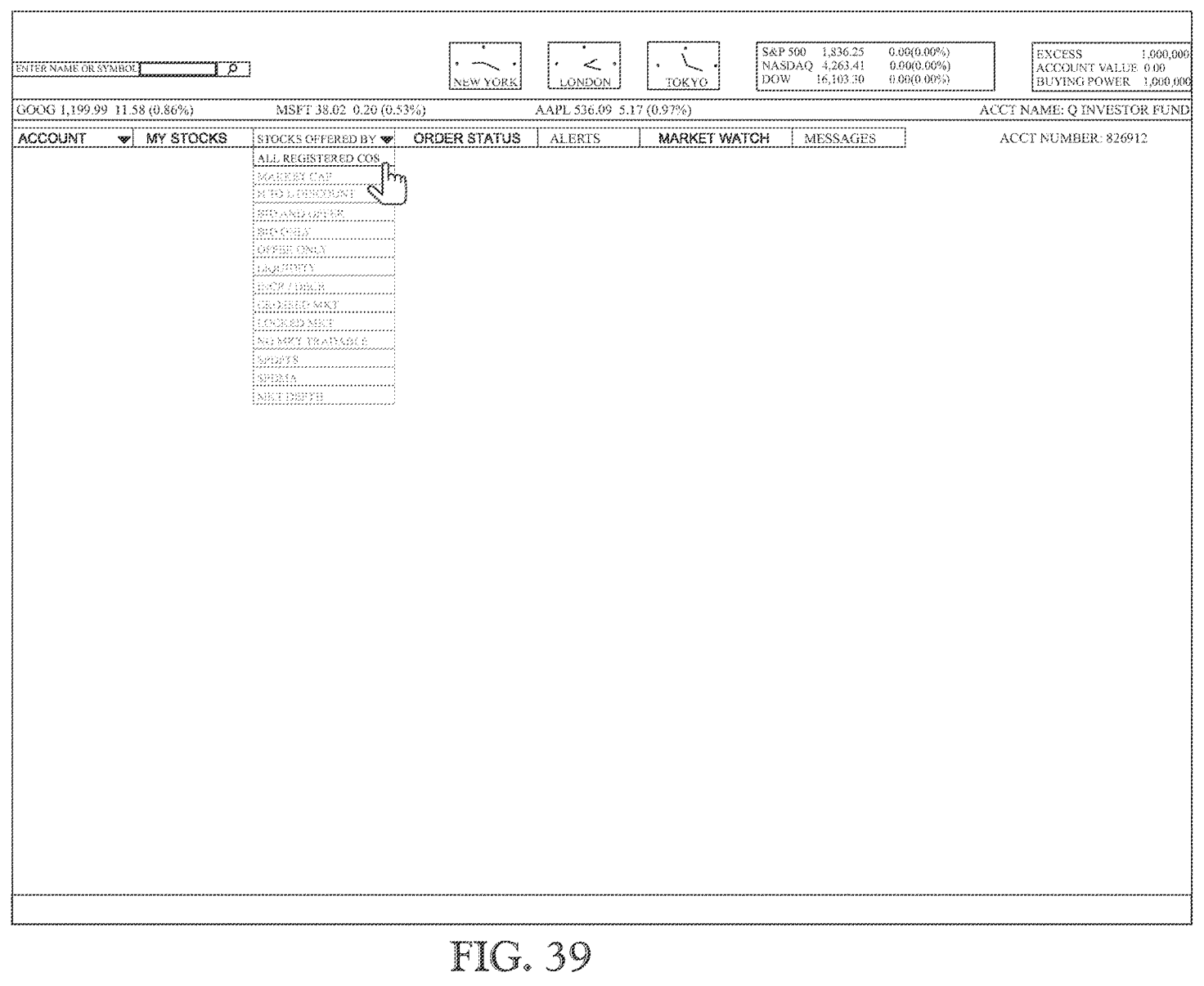

FIG. 39 illustrates an exemplary Investor dash board, wherein the Investor has selected, or prompted for, a screen displaying "All Registered Companies," which subsequently displays all companies whose shares can be traded on the system. This list includes all registered companies currently offering RS, all registered companies not presently offering RS but accepting unsolicited bids, and companies having restricted securities remaining in a shareholder's account within the system—whether or not the shares are presently offered for sale (first in "All Registered Companies" investment sequence);

FIG. 40 illustrates an exemplary Offer screen, appearing subsequent to Investor's selection in FIG. 39, wherein the Offer screen displays all companies whose shares of restricted offerings are tradable via the System of the present invention. This screen displays all system stocks having respective restricted securities, and further denotes whether or not the respective Issuer is currently offering shares (or whether investors hold previously purchased restricted shares (RS) in a particular security). As displayed on this screen, shares are denoted as being available for unsolicited bid (i.e., U BID) or counter bid (i.e., C BID). This effectively communicates whether or not a current offer for the shares exists. The screen also indicates whether or not counter bids are accepted for a particular security, or whether or not the Investor is required to purchase shares within parameters of an offer. Preferably, this is communicated on-screen as an opaque prompt adjacent to a listed stock. (second and final in "All Registered Companies" investment sequence);

Figure 41:
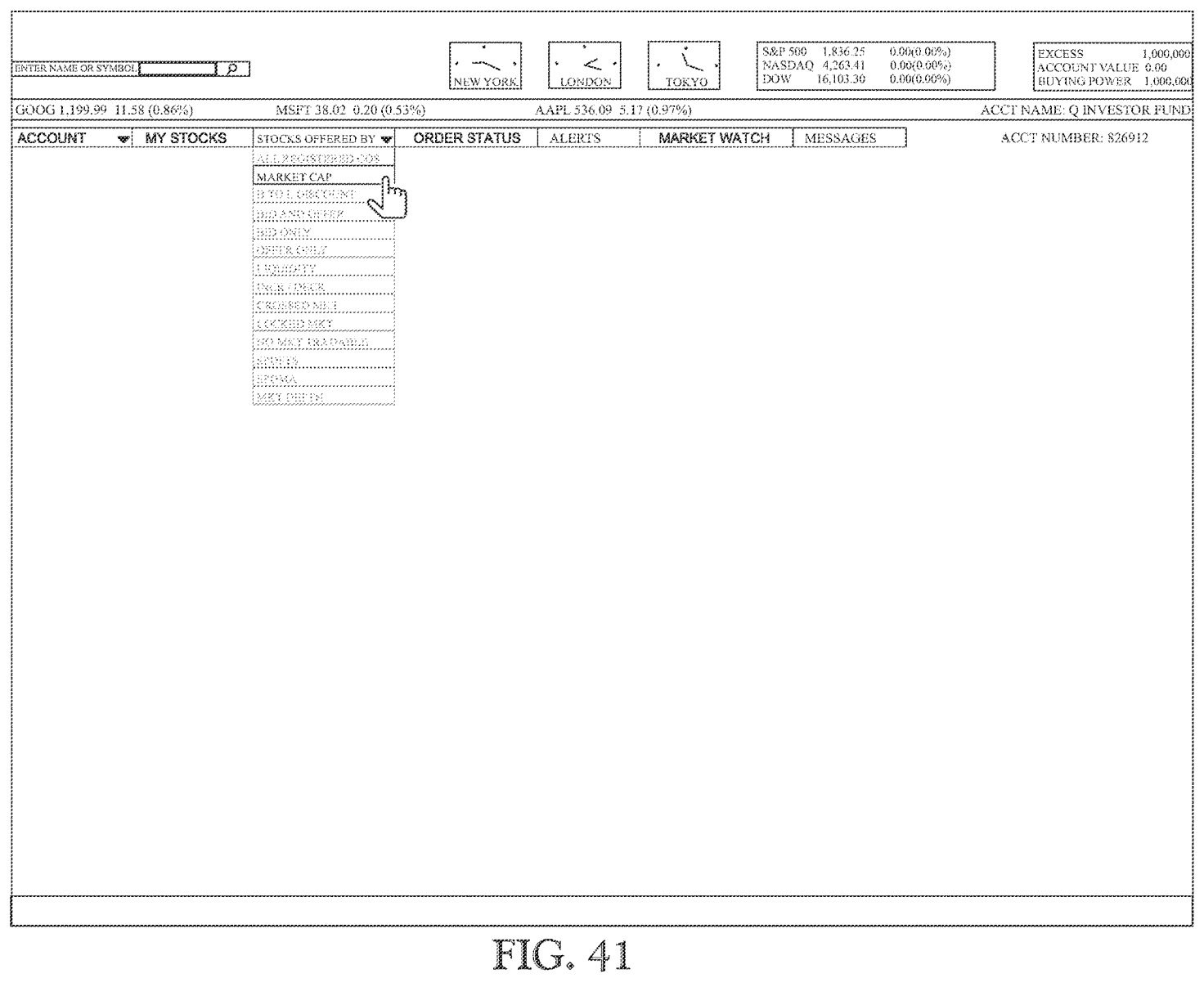

FIG. 41 illustrates an exemplary Investor dash board, wherein Investor selects "MARKET CAP," prompting for a screen that displays all Issuers offering restricted securities listed in order, from high to low, based upon respective market capitalization (first in Market Cap investment sequence);

FIG. 42 illustrates an exemplary Offer screen, which displays stocks currently offering restricted securities (RS), displaying respective stocks in order from highest-to-lowest market capitalization. Selecting a particular stock symbol opens the corresponding Trade screen for that security. Selecting the market depth (MKT DEPTH) prompt opens a corresponding screen displaying bids and offers for the underlying security (second and final in Market Cap investment sequence);

Figure 43:
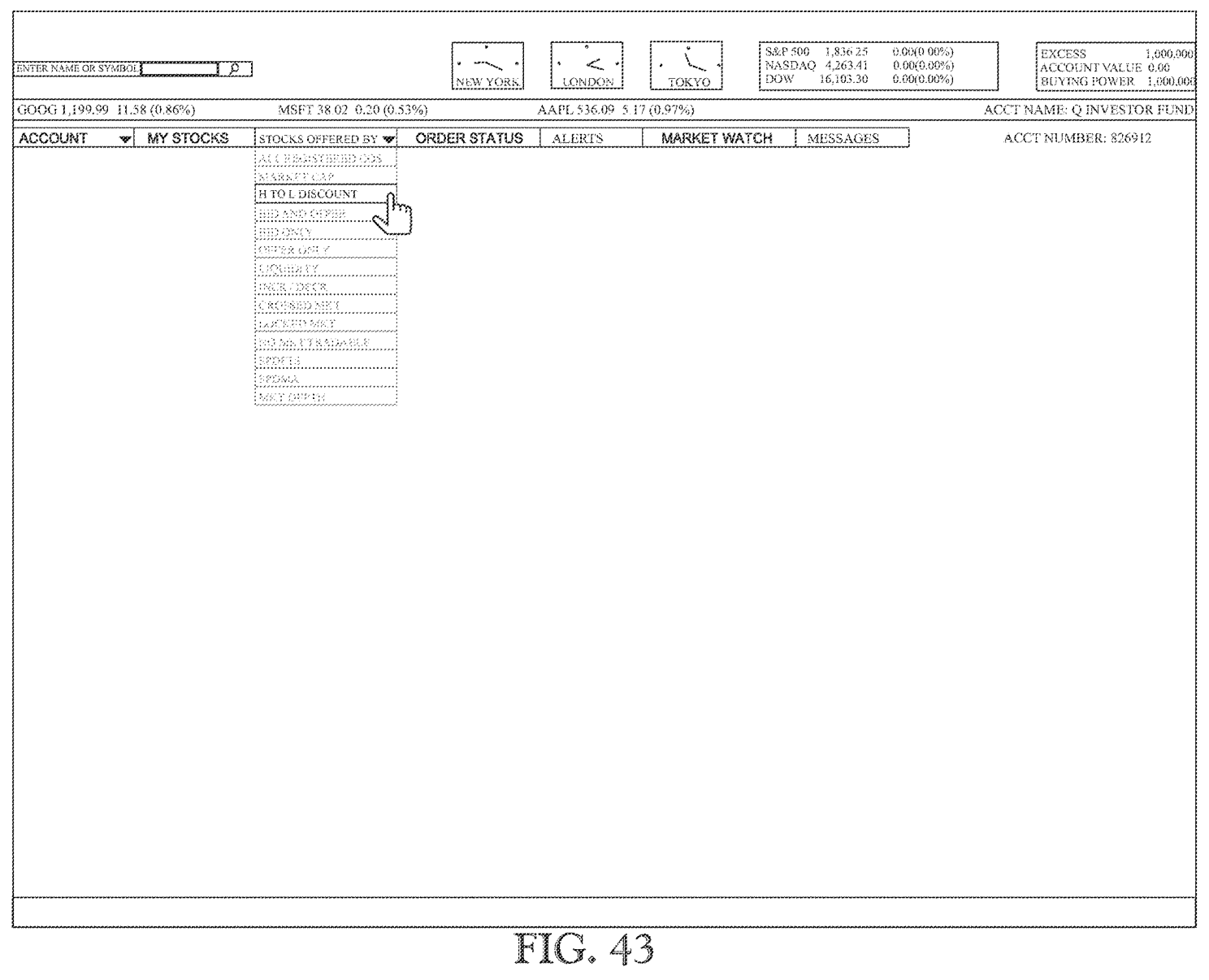

FIG. 43 illustrates an exemplary Investor dash board, wherein the Investor has selected "H TO L DISCOUNT," querying the system to display stocks for which securities are currently offered, sequenced from high-to-low discount vis-a-vis the respective current price of free trading shares (first in High-To-Low Discount investment sequence);

FIG. 44 illustrates an exemplary Offer screen, which displays restricted securities in a column, ordered from highest-to-lowest, as a percentage of the current price of respective free-trading shares. Optionally, as shown, restricted securities (RS) can be displayed in a column list format, from highest-to-low discount offer, wherein the discount offer fluctuates for shares offered in terms of discount-to-moving-average (DMA). Furthermore, as shown, RS can be displayed listed both in terms of offer price and current discount. For example, If the restricted shares for ABCD (i.e., ABCD.R) are offered at a 10% DMA (the "stated discount"), and have been moving up recently, the RS current discount would be greater than the stated discount of 10%. Conversely, if ABCD has been moving down recently, ABCD.R's current discount to ABCD would be less than the stated discount of 10% DMA. (second and final in High-To-Low Discount investment sequence);

FIG. 46 illustrates an exemplary Offer screen listing companies whose corresponding restricted securities (RS) have both bids and offers on the System, wherein RS having locked markets and crossed markets are indicated (second in Offers With Bids investment sequence);

Figure 47:
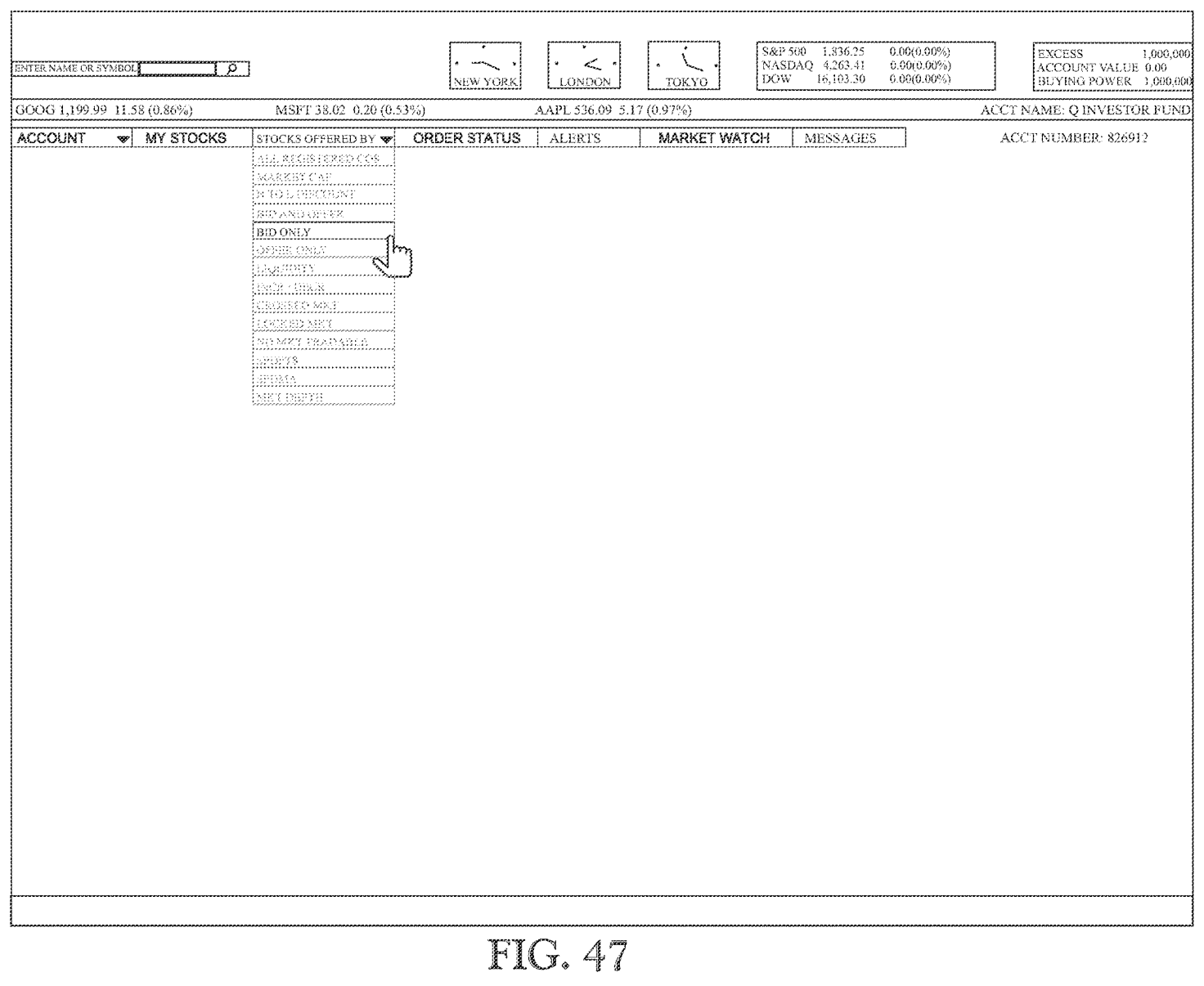

FIG. 47 illustrates and exemplary Investor dash board, wherein Investor has prompted for a screen displaying companies having current bids for their restricted stocks (RS), but no offers. These are companies registered with the System, which accept unsolicited bids (U BID) for restricted shares and/or having RS held in an Investor's account, providing an option for the Investor to resell the RS if desired. The System presents all market participants with the option to be alerted if a bid emerges for a restricted stock (RS) they are holding. These options include whether market participant (MP) wants to be alerted if a counter bid emerges, whether an MP wants to be alerted if an unsolicited bid emerges, or whether an MP wants to be alerted if a bid emerges that would result in a profitable sale. Only eligible counterparties would be alerted. If a bidder emerges for a restricted securities (RS), prospective sellers that elected to be contacted will receive an alert. This provides prospective sellers a convenient means of monitoring the market. (first in Bids Only investment sequence);

FIG. 48 illustrates an exemplary Offer screen, which displays restricted Stock (RS) with bids, but no current offers, wherein the screen displays a list of bid price, and in which Investor is provided an option to prompt for corresponding Market Depth screen or Trade screen by selecting stock to prompt for bid details. It should be noted that all investment screens can include or exclude any market details. All investment screens displayed and discussed in this present application are not intended to be limiting, but are mere examples of what the applicant believes to be useful peripheral information about the offering in terms of each offering parameter. The varied information shown from offer screen to offer screen also serves to display the various information that can be included in this type of screen. (second and final in Bids Only investment sequence);

FIG. 49 illustrates an exemplary Investor dash board, wherein Investor selects stocks offered by "OFFER ONLY" screen, in order to display restricted securities (RS) that are offered (i.e., from any party offering shares), but have no current bids (first in Offers Only investment sequence);

FIG. 50 illustrates an exemplary Offer screen, which displays restricted securities (RS) having offers, but no current bids. Preferably, terms for the corresponding offers are listed, the respective type of the offering is identified, the class of the offering party is identified and the eligible class of counterparties is identified. Offerings by Issuers reflect whether they are willing to accept counter bids. Rules corresponding to each offer are displayed, including a prompt for the text of the rule (not shown). Additional information—most notably eligible counterparties—can be viewed by prompting for the "Market Depth" screen. As will be apparent, the exemplary Offer screen is (and, for that matter, all exemplary screens provided herein are) not intended to be limiting. For example, with respect to the Offer screens, the quantity of any of the various details displayed relating, for instance, to offerings, bids and counterparties, is not intended to be limited in any of the Offer screens presented herein (second in Offers Only investment sequence);

FIG. 51 illustrates an exemplary Investor dash board, wherein the user has selected stocks offered by "LIQUIDITY," prompting for the screen that displays offered restricted securities (RS) in order from highest-to-lowest liquidity in the corresponding free trading security (first in Liquidity investment sequence);

FIG. 52 illustrates an exemplary Offer screen, which displays restricted securities (RS) with offers arranged in a list from highest-to-lowest liquidity (i.e., Liquidity Coefficient), wherein the term "liquidity" is defined by simply selecting the "(?)" symbol, and indication of illiquid shares is made clear, for example, by preceding illiquid stocks with "(I)." Two components of liquidity—market cap and average daily volume—are displayed. Restricted securities having free-trading counterpart rates (i.e., liquidity coefficients), for example, below 1.0, as calculated in accordance with a proprietary system liquidity formula, are defined as "illiquid." (Note: As with all investment screens, the designation and position of the restricted security on each investment list is dynamic, and is programmed to automatically fluctuate as the specific aspect of the stock on each investment list changes). (second in Liquidity investment sequence);

FIG. 53 illustrates an exemplary Investor dash board, wherein Investor selects "INCR/DECR" that prompts for a screen that displays the most recent increases and decreases in restricted stock offer discount (first in Discount Increase/Decrease investment sequence);

FIG. 54 illustrates an exemplary Offer screen listing companies in terms of the time passed since a change in the respective "streaming-percentage-discount-to-free—trading-shares" or "streaming-percentage-discount-to-moving-average" for pricing RS offerings, in order from the least time passed (i.e., most recently changed) to those having the most time passed (i.e., the greatest time since a change). Preferably, this list includes any party that is currently "low offer" for a restricted security. In an alternate implementation, shares may be listed in an order based upon the respective magnitudes of discount change, for example, from greatest discount change to the least discount change for a particular respective RS offer (second in Discount Increase/Decrease investment sequence);

Figure 55:
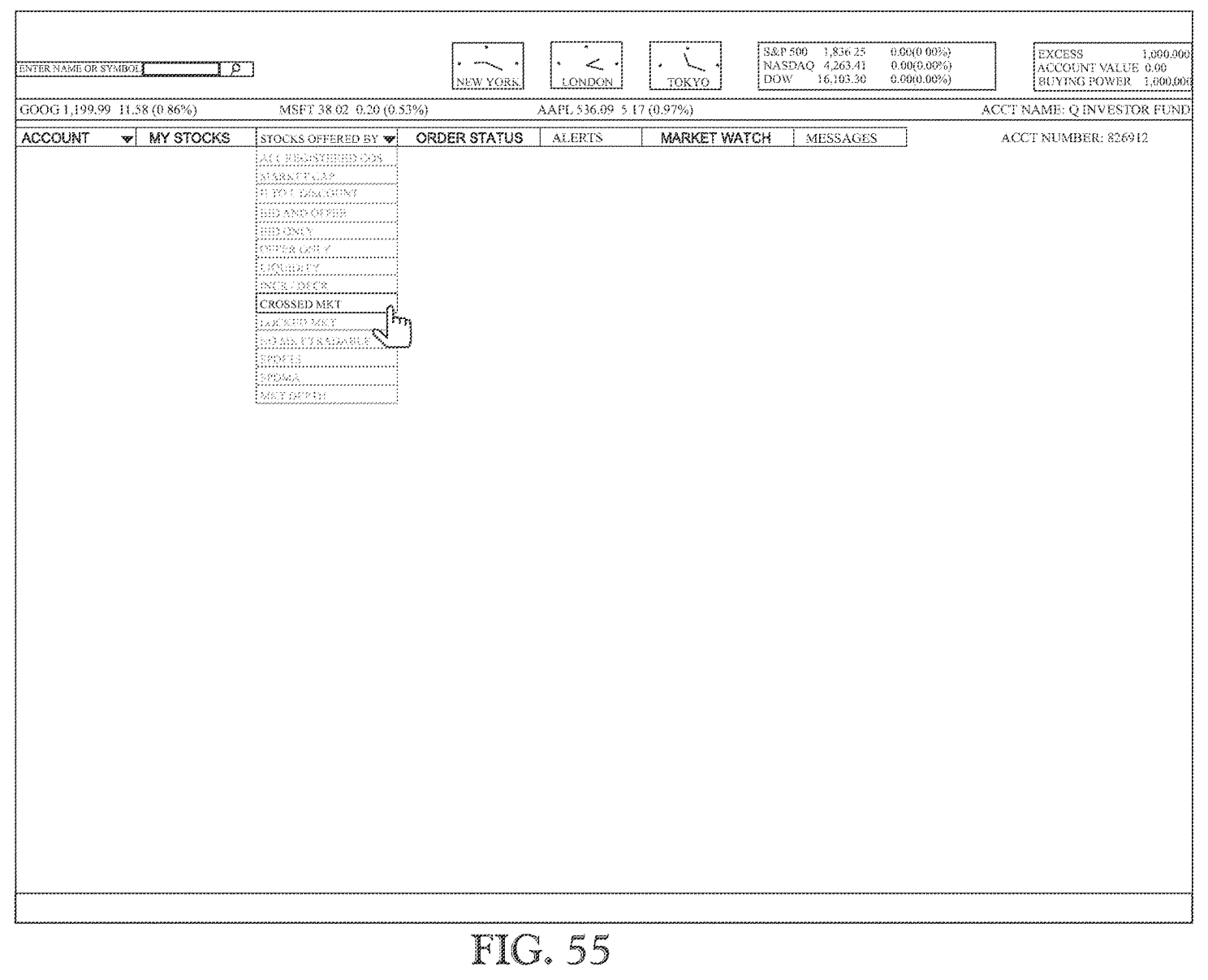

FIG. 55 illustrates an exemplary Investor dash board, wherein Investor selects stocks ordered by "CROSSED MKT," prompting for screen that displays a list of stocks with "Crossed Markets" (first in Crossed Markets investment sequence);

FIG. 56 illustrates an exemplary Offer screen, which displays a list of RS offerings in which the bid is currently higher than the offer (referred to in the art as a "crossed market"), wherein the definition of the term "crossed markets" is displayed by simply selecting the "(?)" symbol (second in Crossed Markets investment sequence);

FIG. 57 illustrates an exemplary Offer screen, which displays a list of RS offerings for which the markets are currently crossed. As shown, in this example, the System operator select "MKT DEPTH" corresponding to stock symbol "KEY," one of the securities with a crossed market, thereby displaying the reason for the crossed market. (third in Crossed Markets investment sequence);

FIG. 58 illustrates an exemplary Market Depth screen for restricted shares in KEY, displayed as "KEY.R." In this example, the bid and offer are crossed as result of incongruent bid and offer share size. In this case, some examples of how to effectuate the trade include: (1) the investor could purchase a quantity of shares commensurate with the minimum share offer; (2) the seller could lower the minimum share offer to a quantity commensurate with the high bid; (3) the bidder and seller could settle on a trade size by means of a private counter offer (PCO); or (4) the seller could sell shares to the next highest bidder, whose bid size, but not price, is commensurate with the seller's offer (fourth in Crossed Markets investment sequence);

Figure 59:
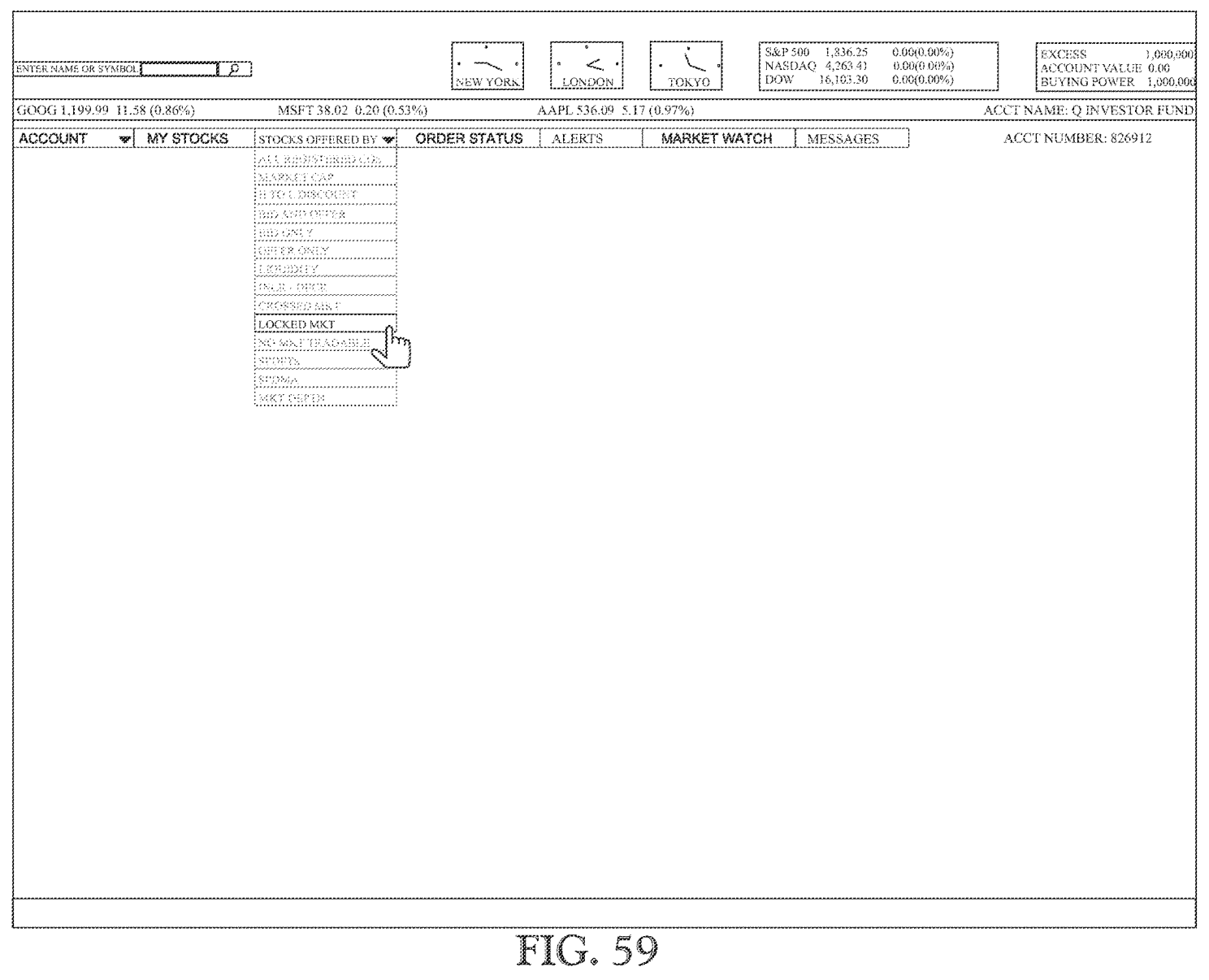

FIG. 59 illustrates an exemplary Offer screen, which displays a list of RS offerings for which the markets are currently locked (first in Locked Markets investment sequence);

FIG. 60 illustrates an exemplary Offer screen which displays a list of RS offering (in this example, one RS offering) in which the bid is currently the same price as the offer, known as a "locked market." In this case, the System operator selects "MKT DEPTH" in order to prompt the Market Depth screen for "MVIS.R," currently subject to a locked market, which will then display the reason for the locked market. Locked markets occur when the bid and offer match, but as with crossed markets, the trade cannot be consummated because one or more aspects of the bid and offer are incongruent, thereby resulting in the trade being unfeasible. Share quantities, classification of trade counterparties, or other aspects of trade specifications can stop the trade from being consummated (second in Locked Markets investment sequence);

FIG. 63 presents "Market Depth" screen for MVIS.R. On this screen the investor decides to purchase RS at a less favorable price from an eligible counter party; in this case the issuer. According to the "Eligible Counter Party' column, the Issuer may sell shares to any investor registered and accredited within the System. As with crossed markets, or any RS offer on the System, if the trade parameters of the "inside market" (high bid/low offer) does not suit the market participant, they may source alternative bids and offers on the "Market Depth" screen. Market participants may prompt to trade any eligible bid or offer from the "Market Depth" screen. (fifth and final in Locked Markets investment sequence);

Figure 64:
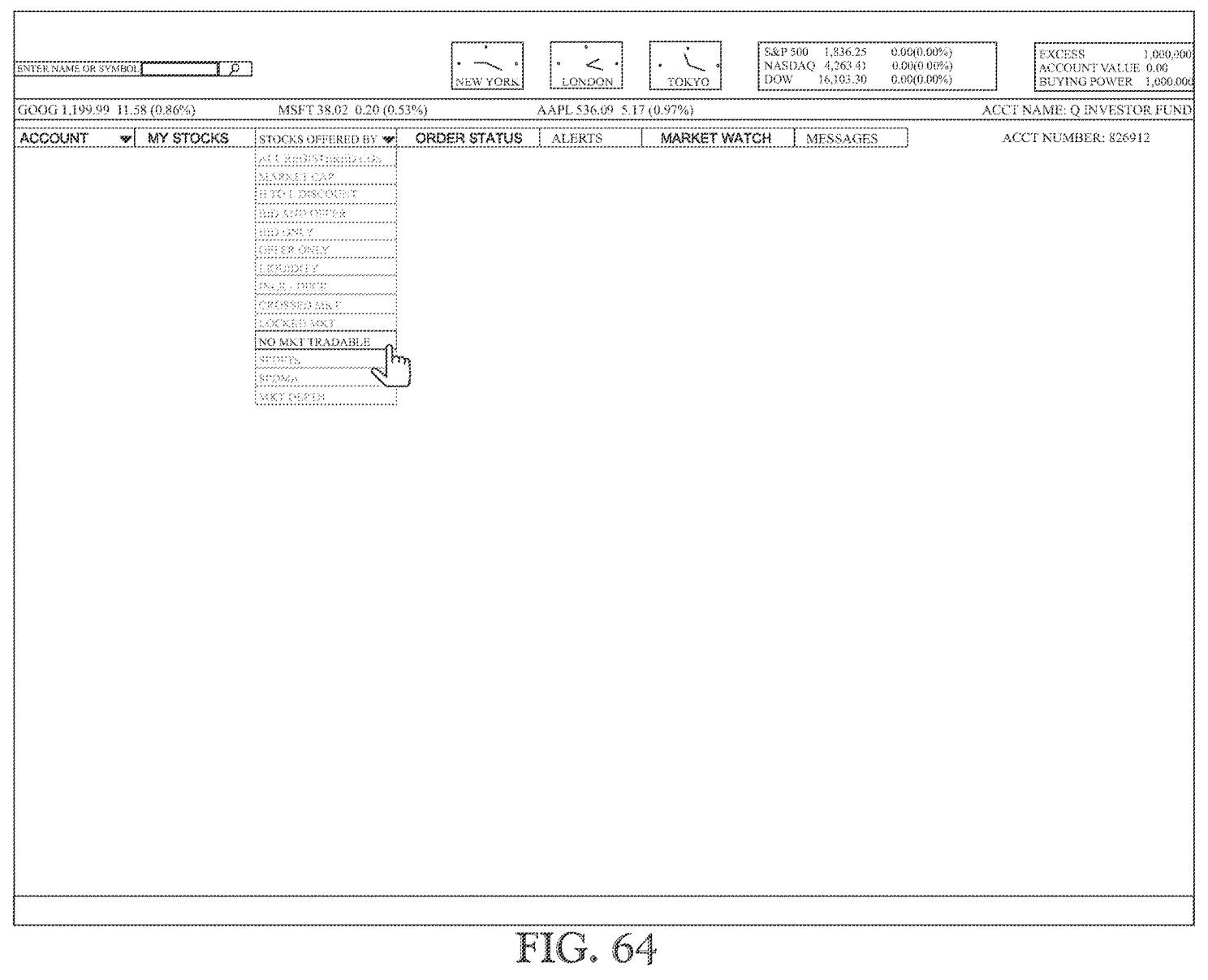

FIG. 64 presents an exemplary Investor dash board, wherein Investor prompts screen that displays a list of RS offerings that have no current bid or offer. RS on this list include issuers registered with the System that allow unsolicited bids for restricted share offerings, and public companies whose RS were placed within the System and are currently positioned in an account within the System. Note: if restricted shares placed within the System pursuant to Regulation D remain in an investor's account within the System, and the issuer is no longer registered with the System, the public company will be represented on applicable investment lists until no RS in the public entity remain in the System. Note: issuers can elect to be notified if there are unsolicited bids for restricted securities in their company. Additionally, investors currently holding restricted securities can elect to be notified when bids are present for restricted securities they are holding. Additionally, investors can elect to be notified if there are bids present for restricted securities they are presently holding that exceed the price they paid for the securities. (first in "No Market Tradable" investment sequence);

FIG. 65 presents an exemplary Offer screen that displays a list of public companies for which a market participant may bid or offer restricted securities, but currently have neither a bid nor and offer. Note: the list is contemplated to display general characteristics about the free trading securities (e.g., liquidity, market capitalization and FT share price, in order to present a profile of the publically traded entity. This serves to assist with pricing bids or offers by the market participant. (second and final in "No Market Tradable" investment sequence);

Figure 66:
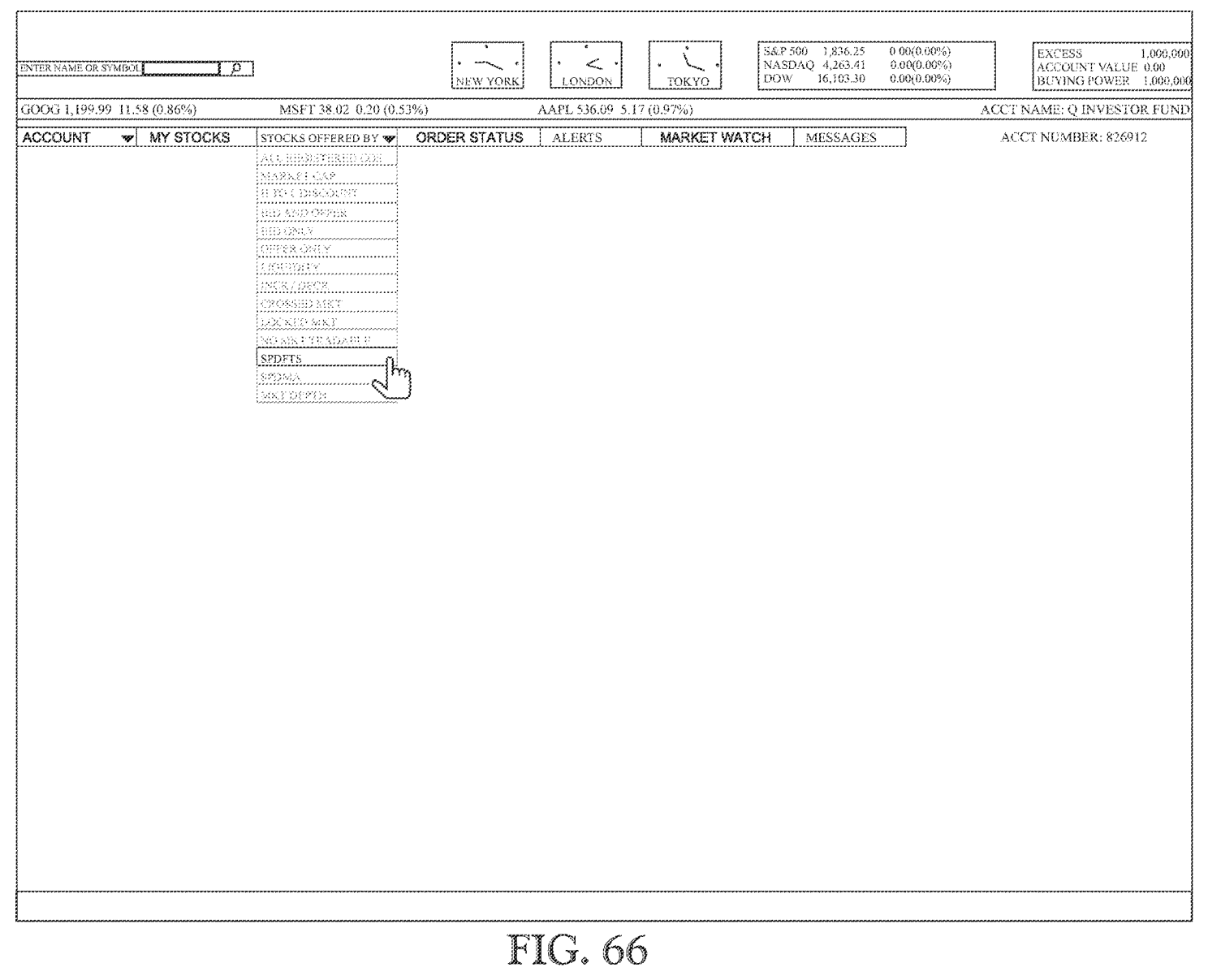

FIG. 66 presents an exemplary Investor dash board, wherein Investor prompts screen that displays a list of RS offering that are priced in terms of streaming percentage discount to free trading shares. (first in "SPDFTS" investment sequence)

FIG. 67 presents offer screen which displays a list of public companies whose restricted securities (RS) offers are priced in terms of streaming percentage discount to the corresponding free trade (FT) shares. Other parameters and details of the offer, such as minimum share price, quantities, etc., can be accessed by prompting either the stock symbol or the "market depth" screen. Note: this screen only displays RS currently being offered, either by the Issuer or any other party. (second and final in "SPDFTS" investment sequence);

Figure 68:
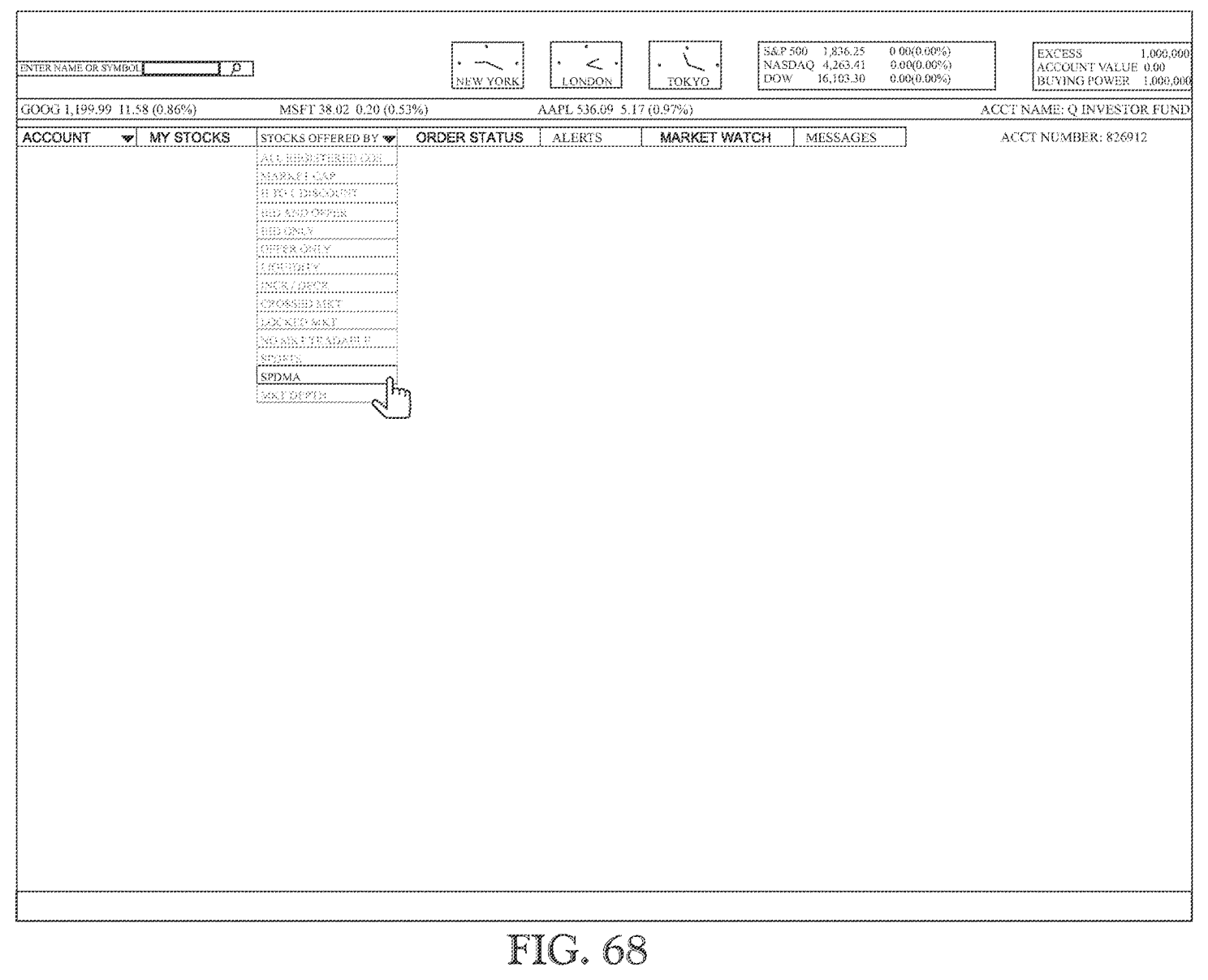

FIG. 68 presents and exemplary Investor dash board, wherein Investor prompts screen that displays a list of restricted securities (RS) offerings that are priced in terms of Streaming Percentage Discount to a specified trailing Moving Average, also referred to herein as "SPDMA." (first in "SPDMA" investment sequence);

FIG. 69 presents an exemplary Offer screen that displays a list of public companies whose restricted securities (RS) Offers are priced in terms of streaming percentage discount to a specified trailing moving average. The screen displays RS listed from high-to-low current discount to a specified trailing moving average (DMA). In contrast to SPDFTS, the discount when priced as SPDMA fluctuates. Therefore, DMA share listings are contemplated to reflect a stated discount (not shown) as well as a current discount. As with the SPDFTS list, other details of the offer are available upon prompting the stock symbol or the "Market Depth" screen. Note: this screen only displays RS that are currently being offered either by the Issuer, or any other party. (second and final in SPDMA investment sequence);

Figure 70:
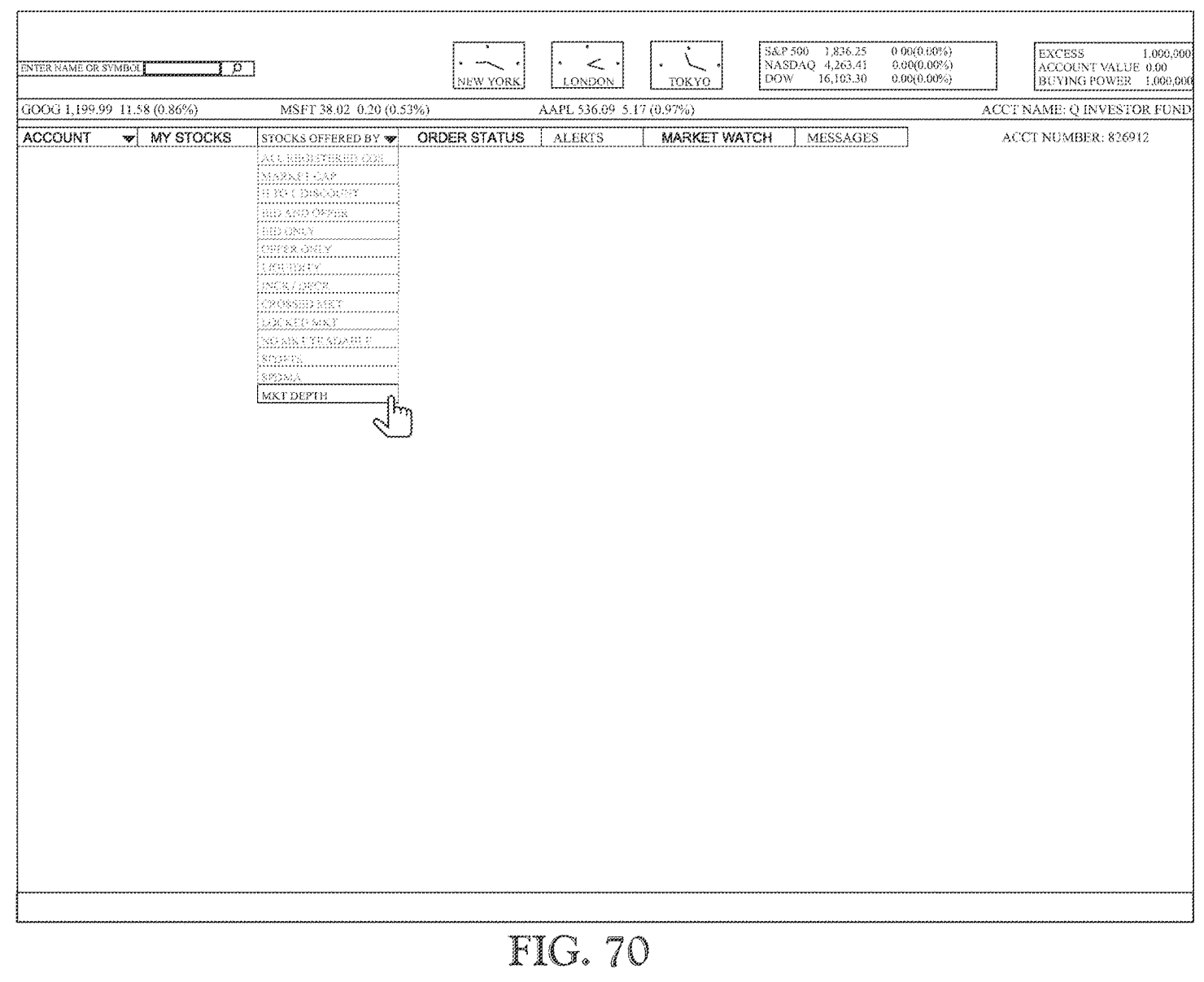

FIG. 70 presents and exemplary Investor dash board, wherein Investor prompts screen that displays a list of RS offerings that are listed in order of greatest-to-fewest number of market participants. (first in "Market Depth" investment sequence);

FIG. 71 presents and exemplary Offer screen that displays a list of public companies whose restricted securities (RS) offers are listed in terms of greatest-to-fewest market participants. This list functions much like a liquidity ranking for the RS offerings. The screen includes RS that have no market participants. As with other investment lists, prompting the stock symbol will open the trade screen, and prompting "Market Depth" opens Market Depth screen. Trade screen is accessible by prompting stock symbol on "Market Depth" screen as well. (second and final in "Market Depth" investment sequence);

FIG. 72 presents an exemplary "All Registered Companies" investment screen. This list displays all companies that have tradable restricted securities (RS) offered or held within the System, as illustrated in this example, where an RS offering (PPHM.R) is available to either purchase within the parameters of the offer or to counter bid. The present implementation contemplates that only Issuers have the option whether or not to accept counter bids for their RS offering. Therefore, the market participant accepting counter bids in the present example is either an Issuer willing to accept counter bids, a Reseller of the issue, or an Insider or Control person selling their Rule 144 shares in the issuing company's shares;

FIG. 73 presents the exemplary "All Registered Companies" investment screen, listing all companies that have tradable restricted securities (RS) listed on the System. Shown is an example of an issuer (PLUG.R) offering restricted securities (RS) for sale, yet not accepting counter offers. Again, Issuers are contemplated to be the only market participant to have the option whether or not to accept counter offers. If the investor wishes to purchase shares within the parameters of the offer, they prompt the stock symbol, and a corresponding auto-populated Trade screen appears. The invention contemplates the nonnegotiable aspect wherein the Offer would be deemed the price. If the required quantity of shares for purchase is posted in terms of an "all or none," then the entire offer is only available at the issuer's terms. If the offer has a minimum share quantity purchase, or no minimum share quantity purchase, the investor has some leeway in terms of the investment. Note: The indication of whether a counter bid is accepted (i.e., "trade indicator") is streaming, and adjusts as participants offering shares in a particular issue change. Significantly, only the parameters of the seller offering restricted securities (RS) at the lowest price, i.e., low offer, is reflected on the trade indicator. Prospective investors can navigate to the "Market Depth" screen to view complete terms of a displayed offer, or other offers, and perhaps circumvent the "no counter offer" seller by arranging a Private Counter Offer (PCO) with a different seller of the same security;

FIG. 74 again presents the exemplary "All Registered Companies" investment screen, listing all companies that have tradable restricted securities listed on the System. This illustrates a listing for restricted securities (i.e., ASUR.R) for which the Issuer is willing to accept unsolicited bids. This indicates there are no current offers for the restricted securities. However, there may already be other unsolicited bids for the restricted securities. To view whether or not other bids are present, an investor can prompt the "Bids Only" investment screen to check whether the stock is listed, or the investor can navigate to the "Market Depth" screen by way of the Trade screen. If investor wishes to place a bid for the restricted securities, they may navigate to the Trade screen by prompting the stock symbol on the present screen, on another investment screen, or by prompting the stock symbol on the "Market Depth" screen;

FIG. 77 presents an exemplary Investor Account screen, displaying an investor account that has been funded. The free cash is reflected in the investor's "Cash account." No investments or other transactions have taken place (first in "Investor Purchase" sequence);

FIG. 78 presents an exemplary Issuer's Account screen, illustrating that the issuer (WXYZ Corp) has received and deposited restricted WXYZ shares into the "legal" account. The shares are electronically transferred from the Issuer's transfer agent to the Issuer's legal account in the bank or clearing firm. Alternatively, the restricted securities (RS) designated for the Regulation D offering can be held in book-entry form by the transfer agent, for possible subsequent transfer, if required. In this scenario, shares are reflected visually in the shareholder's account, but held by the transfer agent. Note: clearing entities for investment institutions designate an account to hold any securities that have unresolved legal issues that must be resolved before the securities can be freely traded. Typically, as also referred to herein, the account is called the "legal" account. The "legal" account, as opposed to the "stock" account, holds restricted securities (first in "Issuer Reg. D Placement" sequence);

FIG. 79 presents an exemplary Issuer's account screen, wherein the Issuer (WXYZ Corp) has sold 7,500 shares of restricted securities (WXYZ.R) through the placement process of the System. The trade is pending review. The quantity of shares commensurate with the sale is transferred from the "legal" account to the "pending" account. Details of the trade are displayed. Shares remain in the "pending" account until the trade is either approved or declined. During the "pending" period the trade and counterparties are reviewed for compliance. The present invention contemplates both buyer and seller making or restating representations made earlier in the process during the party approval and trade processes. The post-trade review process is contemplated to be performed largely by way of questionnaire. The questionnaire is contemplated to be automatically populated with details of the trade and previous representations, and presented in the form of a checklist or the like. In one exemplary implementation, if documents are considered out-of-date documents at the time of trade, an investing entity is requested to send current, replacement supporting documents to show that they remain qualified as an accredited investor and that their existing investor classification remains unchanged, prior to approving trade. If one or both counter parties do not comply with the review process in a timely fashion, resulting in a trade being broken, the market participant may be subject to compensatory damages or suspension from use or access to the System. For example, the "pending" period is contemplated to take approximately two (2) to five (5) days (second in "Issuer Reg. D Placement" sequence);

FIG. 80 presents and exemplary Issuer Account screen, wherein the sale of 7,500 shares of restricted securities (WXYZ.R), through the placement process of the System, has been approved and completed. Shares sold pursuant to the Reg. D placement are debited from the issuer's "pending" account and credited to the investor's "legal" account. An amount of cash commensurate with the purchase price, subtracting commissions or fees, if applicable, is simultaneously transferred from the investor's "pending" account to the seller's "cash" account (third and final in "Issuer Reg. D Placement" sequence);

FIG. 81 presents an exemplary Issuer Activity screen. This screen is contemplated to be prompted from an account screen or dashboard, and demonstrates a timeline of activity in the account, including the present trade. Note: a post-trade filing, in this case a Form 8k, is shown as filed. If requested, market participants are contemplated to receive automatic notifications of required filings or communications as per information shared with parties linked to the System. If requested, automatically populated filings required by rules and regulations are filed by the system, or made available to file to issuer's legal counsel. This service is contemplated to be optional;

FIG. 82 presents an exemplary Investor Account screen, wherein an investor has purchased 7,500 shares of WXYZ.R and the trade is pending review. Cash commensurate with the cost of the restricted securities (RS) plus applicable commission is "frozen" and is reflected as being in a "pending" state. Preferably, as shown, this screen displays details of the trade and reflects the number of days until the registration process for the restricted securities can be initiated. This is shown as "days to mat." and indicates the number of days left until maturity on the current screen. Note: this screen corresponds to FIG. 79 in the transaction process. (second in "Investor Purchase" sequence);

FIG. 83 presents an exemplary Investor Account screen, illustrating that the transaction has been approved. The shares have been transferred from the "pending" account to the "legal" account. The cash, previously reflected as "pending," has been transferred to the selling counter party's account. The screen reflects there are 174 days until the shareholder can begin the process of registering the shares, indicating the countdown to maturity date began at the date of the trade. Alternatively, the countdown date may begin when the trade is approved and funds are freed in the seller's account, as per SEC Rule 144 After the trade has been approved, the shareholder may elect to offer the RS for resale on the System, hold the RS until maturity, have the RS transferred to another financial institution, or have the RS delivered in the form of a certificate. Significantly, if the RS are transferred out of the System, they may not reenter. This preserves the integrity of the "closed-loop" nature of the System. This screen corresponds to FIG. 80 in the transaction process (third in "Investor Purchase" sequence);

FIG. 84 presents an exemplary Investor Account screen, wherein RS have matured and the shares have been registered. Restricted shares in WXYZ have been transferred from the "legal" account with fully-executed legal opinion and to the transfer agent, while the transfer agent has electronically transferred the same quantity of registered shares in WXYZ to the shareholder's "stock" account (fourth and final in "Investor Purchase" sequence);

FIG. 87 presents an exemplary Investor Activity screen, illustrating a timeline of investor's purchase and registration of 7,500 shares of WXYZ.R though the System's automated transaction process. This screen is navigated to from, for example, the Account screen or Investor's Dashboard.

FIG. 88 presents an exemplary offer screen in which registered securities are offered to unaccredited investors pursuant to Rules 504, 505 and 506(b), of Regulation D. This rule allows up to 35 unaccredited investors to participate in an offering. This type of offering requires additional documents to be created, approved and made available electronically to the potential investor, most notably, a Private Placement Memorandum. The System makes these documents available on the offering screen and/or the trade screen, and is electronically available in the investor's account during the period the shares are held.

Figure 1:
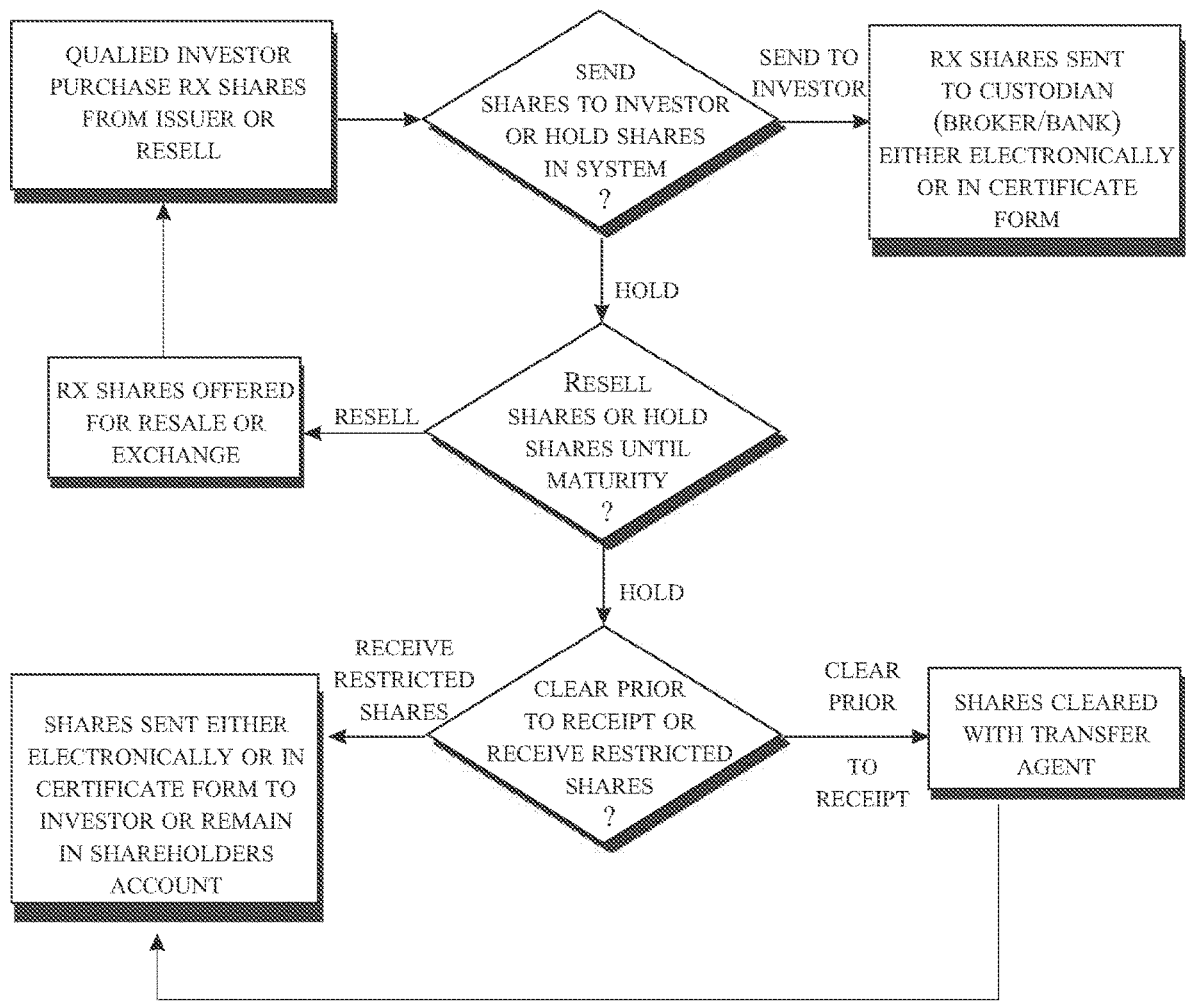
FIG. 1 illustrates a schematic flow chart of the general series of steps of during use of an electronic automated restricted trading system in accordance with an implementation of the present invention. The schematic provides an overview of the closed-loop nature of the system, from an investor's perspective.
Figure 2:
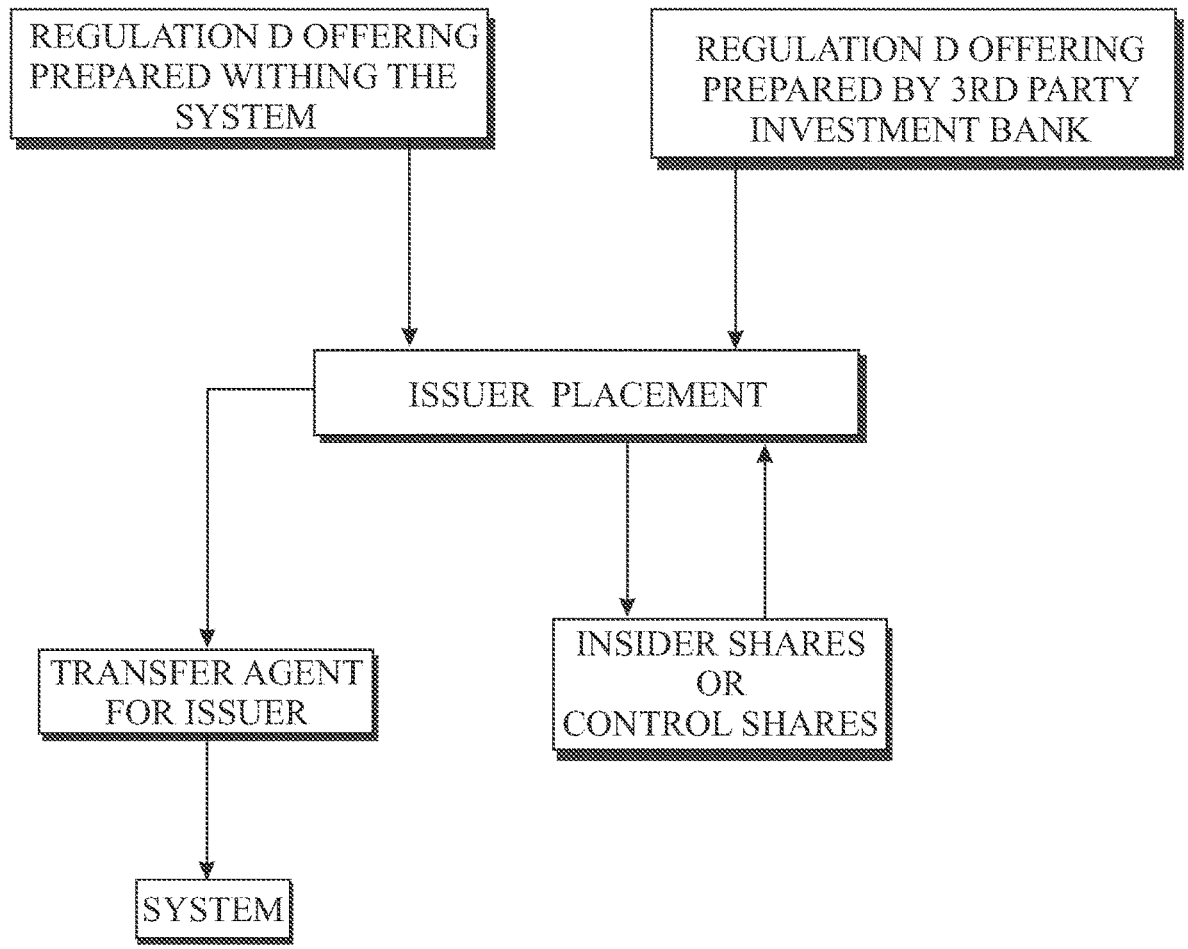
FIG. 2 illustrates a schematic flow chart generally showing the methodology associated with shares entering the system, including shares placed pursuant to both Regulation D and Rule 144 restricted securities that only have a single, common point of entry (i.e., via a transfer agent). This method reduces, and preferably eliminates, any question as to the propriety or origin of the shares entering the system. In accordance with this system, all supporting documentation is provided by the system's most scrutinized participants (i.e., the transfer agent or the issuer), thereby eliminating all other participants from providing potentially-fraudulent documents, subsequently reducing the need for oversight, and streamlining the process from initial sale or placement to share registration.
Figure 3:
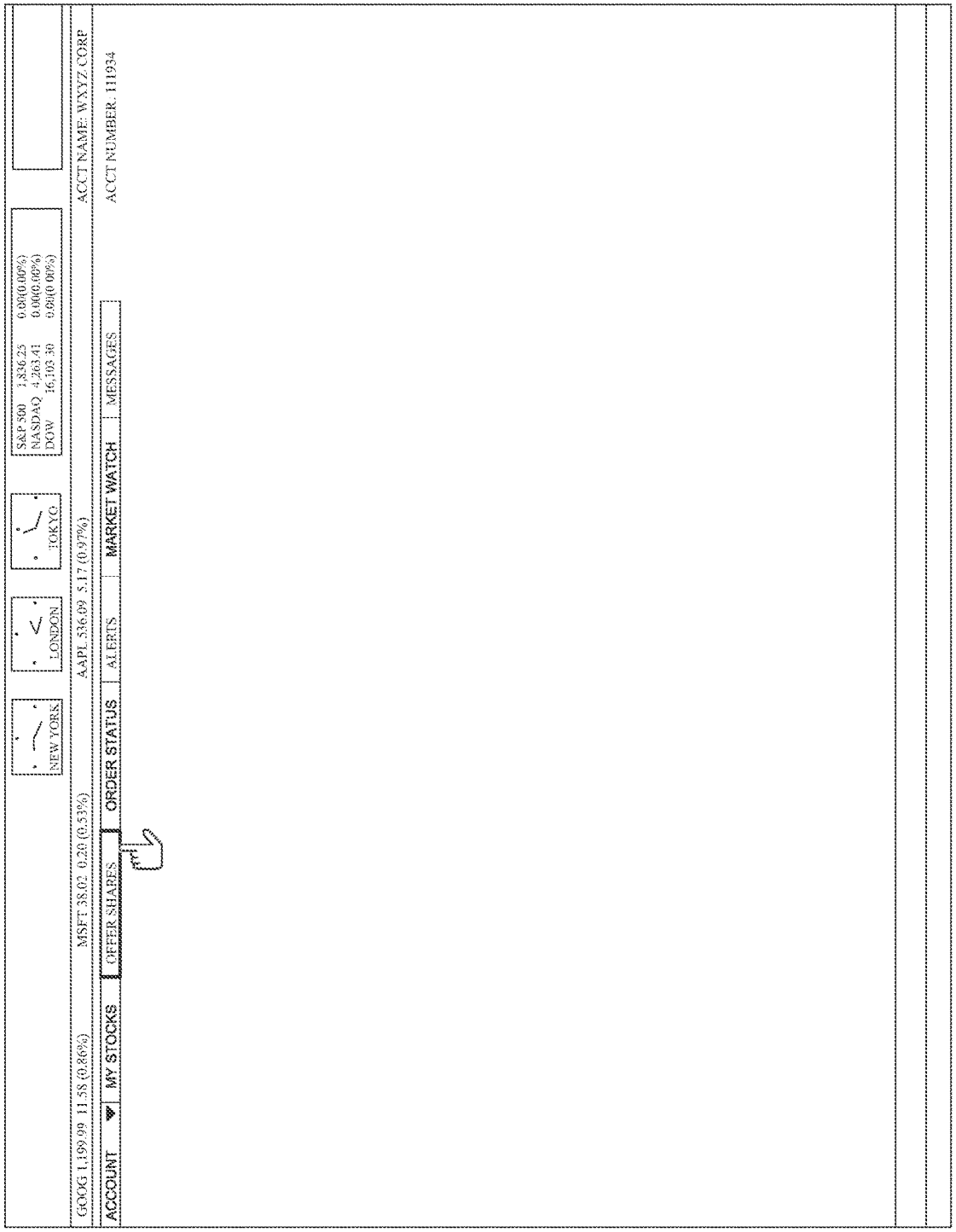
FIG. 3 illustrates an exemplary view of an Issuer's dashboard, wherein an Issuer prompts an "Offer Shares" tab to open an Offer screen (first in a sequence of the Primary Offer process)
Figure 6:
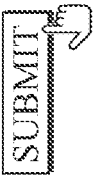
FIG. 6 illustrates the Issuer selecting parameters for the present primary placement of restricted securities pursuant to Regulation D. The example shown is contemplated to be an offering of a company whose shares are liquid. This is evident by: (1) the small discount; and (2) the fact that the shares are offered as a discount-to-the-current-price, rather than as a discount-to-a-trailing-moving-average (fourth in the sequence of the Primary Offer process—Liquid Issuer)
Figure 7:
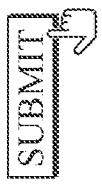
FIG. 7 illustrates the Liquid Issuer Offering screen, with parameters for Regulation D offering selected and ready to submit. This offer will be reflected on a Trade screen, upon prompting, and all applicable Offer lists, as well as on a Market Depth screen for the offering of restricted securities (fifth and final in the sequence of the Primary Offer process—Liquid Issuer)
Figure 11:
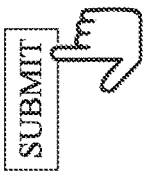
FIG. 11 illustrates an Illiquid Issuer Offering screen, with parameters for Regulation D offering selected and ready to submit. This offer will be reflected on the Trade screen, upon prompting, and all applicable offer lists, as well as the Market Depth screen for the offering of restricted securities. (Note: as previously illustrated, RS can be offered or bid in terms of current discount to the price of free trading shares (or "DFT"), or in terms of discount to trailing moving average (or "DMA"). These modes of bid and offer do not necessarily have to match. For instance, RS can be bid in terms of DFT and offered in terms of DMA, or shares can be offered in terms of DFT and bid in terms of DMA. In these cases, if the bid and offer—priced in terms of disparate modes—cross, the trade is automatically executed. (Fifth and final in sequence of Primary Offer process-Illiquid Issuer)

Additionally, the System provides investors in 506(b) offerings electronic access to issuer's management or shareholder relations, as well as levying restrictions for general solicitation on the issuer. The inclusion of 506(b) offerings with 506(c) offerings in the System creates further options and flexibility for the issuer to raise capital, and allows for additional market participants.

DETAILED DESCRIPTION OF EXEMPLARY IMPLEMENTATIONS

The present invention provides an automated, closed loop stock exchange system for trading restricted securities in publically traded companies. The Restricted Shares Trading System (RSTS) (alternatively referred to herein simply as the "System"), includes: (a) a system operator; (b) an automated bidder qualification means, wherein a bidder is designated a qualified bidder upon meeting bidder qualification criteria set by the system operator; (c) means for accepting and storing a submitted bid from the qualified bidder; (d) means for accepting and storing a sell offer from a primary or secondary seller; (e) an automated bid and offer evaluation means, wherein the submitted bid is evaluated against bid criteria set by the system operator; (f) an automated compliance means, wherein the submitted bid and offer is evaluated against compliance criteria set by the system operator; (g) an automated submitted bid and offer adjustment means, wherein the submitted bid and offer is modified pursuant to criteria set by the system operator; (h) an automatic feedback means, wherein the qualified bidder, primary or secondary seller is informed if the qualified submitted bid is accepted; (i) an automated feedback means, wherein investor; primary and secondary seller are electronically alerted to status of their bid or offer pursuant to criteria set by the system operator; (j) an automated feedback means wherein investor; primary and secondary seller are electronically alerted to the presence and status of counter bids and offers pursuant to the criteria set by the system operator; and (k) an automatic transaction means to effectuate the accepted transaction.

In order to gain an appreciation of the present invention, it is necessary to understand various exemptions from the federal securities laws regarding the registration of offerings of securities. As will be apparent to those skilled in the securities trading industry, the implementation of the present invention takes advantage of particular exemptions; namely, Rule 504, Rule 505 and Rule 506, exemptions.

Briefly, Rule 505 allows a company to raise an aggregate amount of $5,000,000 over a twelve-month period. Similar to Rule 504, Rule 505 does not permit an issuer to use general advertising and solicitation to market its offering. A Rule 505 offering is available to an unlimited number of accredited investors and up to a maximum of thirty-five (35) non-accredited investors. In a Rule 504 offering, an unlimited number of non-accredited investors may participate. Unlike a Rule 504 offering, non-accredited investors must receive a substantive disclosure document that includes financial statements, although even if only accredited investors are involved, care must be taken such that anti-fraud requirements are met and that there are no false statements, no misleading statements, and no omissions that might make what you have disclosed misleading. Purchasers must receive restricted securities, meaning that the securities may not be sold without either registration or an exemption.

On the other hand, Rule 506 contains no limit on the amount of capital that can be raised in an offering. Similar to other exemptions, an issuer using Rule 506 cannot use general advertising or general solicitation to market its offering. Rule 506 is available to an unlimited number of accredited investors and up to thirty-five (35) non-accredited investors. Unlike Rule 505, all non-accredited investors, either alone or via a purchaser representative, must be sophisticated. That is, they must have sufficient knowledge and experience in financial and business matters to make them capable of evaluating the merits and risks of the prospective investment. Just as with Rule 505, non-accredited investors must receive a substantive disclosure document that includes financial statements, although even if only accredited investors are involved, care must be taken such that the anti-fraud requirements are met and that there are not false statements, no misleading statements, and no omissions that might make what you have disclosed misleading. Purchasers must receive restricted securities, meaning that the securities may not be sold without either registration or exemption.

With regard particularly to Rule 506(c) of Regulation D, Section 201(a) of the JOBS Act requires the SEC to eliminate the prohibition on using general solicitation under Rule 506 where all purchasers of the securities are accredited investors and the issuer take reasonable steps to verify that the purchasers are accredited investors. To implement Section 201(a), the SEC adopted paragraph (c) of Rule 506. Under Rule 506(c), issuers can offer securities through means of general solicitation, provided that: (1) all purchasers in the offering are accredited investors; (2) the issuer takes reasonable steps to verify their accredited investor status; and (3) certain other conditions in Regulation D are satisfied. Rule 506(c) sets forth a principles-based method of verification which requires an objective determination by the issuer (or those acting on its behalf) as to whether the steps taken are reasonable in the context of the particular facts and circumstances of each purchaser and transaction. Among the factors that an issuer should consider under this method are: (1) the nature of the purchaser and the type of accredited investor that the purchaser claims to be; (2) the amount and type of information that the issuer has about the purchaser; and (3) the nature of the offering, such as the manner in which the purchaser was solicited to participate in the offering, and the terms of the offering, such as the minimum investment amount. Rule 506(c) specifically includes a non-exclusive list of verification methods that issuers may use, but are not required to use, when seeking greater certainty that they satisfy the verification requirement with respect to natural person purchasers. This non-exclusive list of verification methods consists of: (1) verification based on income, by reviewing copies of any IRS form that reports income, such as Form W-2, Form 1099, Schedule K-1 of Form 1065, and filed form 1040; (2) verification of net worth, by reviewing specific types of documentation dates within the prior three months, such as bank statements, brokerage statements, etc.; (3) a written confirmation from a registered broker-dealer, an SEC-registered investment adviser, a licensed attorney or a certified public accountant stating that such person or entity has taken reasonable steps to verify that the purchaser is an accredited investor within the last three months and has determined that such purchaser is an accredited investor; and (4) a method for verifying the accredited investor status of persons who had invested in issuer Rule 506(b) offering as an accredited investor before Sep. 23, 2013 and remain investors of the issuer. Rule 506(b) remains unchanged following the adoption of Rule 506(c) and continues to be available for issuers that wish to conduct a Rule 506 offering without the use of general solicitation or that do not wish to limit sales securities in the offering to accredited investors.

According to an implementation, the system incorporates a method including steps for qualifying bidders, using various automated qualifying criteria. An automated bidder qualification means comprises a means for accepting and storing certain bidder information and comparing bidder information with bidder qualification criteria. The present invention contemplates a variety of qualification criteria as determined by statutes, regulations, policies, and the discretion of counterparties. Preferably, the method incorporates an automated online bidding and offering process for restricted securities, and an automated compliance determination step. Preferably, the system incorporates an adjustable formula for aiding with the bidding or offering of restricted securities based on a real time, streaming percentage discount of the price of restricted securities to the price of the corresponding free trading shares, as set by the system operator. Furthermore, the system may incorporate an adjustable formula for aiding with bidding and offering restricted securities based upon a real time streaming percentage discount of the price of restricted securities to a trailing moving average of the corresponding free trading shares as set by the system operator. Preferably, processing occurs in real time, facilitating information exchange, valuation and auction. In an aspect, the system comprises a reward system for bidding and closing a transaction.

The system may incorporate a process by which the buyer and seller settle on a price and effectuate a transaction between the bid and offer prices for a restricted security. Optionally, the method may incorporate a secondary loop for resale of purchased restricted securities (see FIG. 1). The system operator may be an individual or a computer algorithm utilizing a set of criteria data used in system evaluation. The system and method contemplate a variety of criteria data as detailed herein and as described in the literature, statutes, regulations and policies as they relate to trading, reporting and dissemination of restricted securities. The submitted bid information may be accepted and stored in the system in association with bidder information for the purpose of automatically cross-referencing bidder limitations and eligibility according to rules and regulations. The submitted bid may be evaluated against compliance criteria set by the system operator, preferably wherein processing occurs in real time, facilitating information exchange, valuation and auction and bidding.

Issuer Registration: The Issuer establishes log-in information and logs on to registration screen, wherein the Issuer provides corporate documents as required in accordance with a preferred implementation. A checklist may be displayed on the registration screen from which issuer accesses document requirements. Furthermore, the issuer may upload required information directly to this screen. Document requirements may include, by way of example, but not limitation: audited financial statements; most recent corporate filings; certificate(s) of good standing, "bad actor" questionnaire(s), and other related documents that evidence the fact that the issuer is current with filings and is in good standing according to rules and regulations set forth by applicable governing bodies. Here, the Issuer represents that all public information is current, provides contact information for his transfer agent and corporate counsel, provides director's resolution authorizing the offering of securities pursuant to Regulation D and quantity of the share offering, and provides information regarding currently active offerings if any.

Preferably, the Issuer provides authorization for the present system to electronically link issuer's transfer agent account. Electronic link is established to issuer's account at the transfer agent or, alternatively, to issuer's account at transfer agent's contracted third party designee. The link to Issuer's transfer agent account allows the present system to electronically monitor and utilize information that is necessary to automate many system integrated functions, as well as monitor Issuer's corporate affairs for the purpose of confirming compliance. The link establishes a communication link for the free flow of information between the system and transfer agent. Information in issuer's transfer agent account may include, for example, streaming shareholder list and ownership, issuances, account balances and transactions, corporate filings, shares remaining in an issuance and updated share count, by way of example. This also serves as a means for referencing and cross-referencing offers and parties involved in the offer, determining whether they are compliant, and whether any filings are required. Preferably, share float and change of share ownership, for parties within the system, are continuously or regularly monitored.

Additionally, automated electronic communication between corporate counsel and transfer agent may be established and maintained through the transfer agent's link with the system. Importantly, the electronic communicative link to the issuer's transfer agent account allows the transfer agent and the system to process, cross-reference and record, all aspects of the Regulation D offering to the transaction, through the holding period and, ultimately, up to the share registration. Beneficially, this is accomplished automatically and in real time, thereby circumventing conventional arduous requirements associated with the preparation of paperwork, and manual requests, approvals and filings.

The system may establish an electronic communication link with issuer's corporate counsel. Counsel establishes log-in information in order to establish a communication link to a dedicated page within the system. Counsel's page includes a list of clients of counsel that are currently offering shares within the system. In an exemplary implementation, the page contains a prompt for Regulation D and/or Rule 144 documents for a specific issuer's current offering. Furthermore, the page may contain a list of individual transactions within a specified offering.

The issuer may incorporate a single offering through the system in conjunction with outside placement agents. In that case, the system functions as a member of a selling group or distribution participant. Investing parties within the system are the only participants of the offering permitted to resell or hold/maintain the shares within the system. Alternatively the system may preclude the issuers from utilizing the services of outside agents during a particular offering within the system. In all scenarios, the system preferably utilizes streaming information, accessed via the issuer's transfer agent and linked to their account, to automatically determine, and in some cases implement, filings and restrictions pursuant to governing rules, regulations and issuer designations. If non-accredited investors are granted permission to participate in an offering pursuant to Rule 504, Rule 505 or Rule 506(b) of Regulation D—as opposed to Rule 506(c) of Regulation D—the system will necessarily be the exclusive placement agent, contemplating a relatively low quantity of non-accredited investors permitted to participate in a Rule 505 or Rule 506(b). The non-accredited participants are counted by the system in substantially real time and preferably limited to a maximum of thirty-five (35) investors. For the purpose of making restricted securities (RS) investments available to non-accredited investors, pursuant to Rule 504, Rule 505 or Rule 506(b), the system determines eligibility by programming and utilizing modified parameters pertaining to investment experience, risk tolerance, and income net worth. An investment screen is available for listing securities that are currently available for investment by non-accredited investors (FIG. 88). The list also includes the number of non-accredited investors that remain eligible to participate in the RS offering.

Preferably, the Issuer provides information about past or current status as a "blank check" or "shell company." The Issuer provides company authorization to one or more individuals to operate the system. The Issuer provides authorization to link to its transfer agent, or designated third party, in order to access and stream information as required for the purpose of real-time corporate issuance updates. The Issuer provides authorization to the system for accrediting and qualifying prospective investors, and documents related to the Regulation D offering. If an issue is offered pursuant to Rule 505 or Rule 506(b), the issuer may provide information and authorization for direct electronic contact/communication with the issuer. In contrast, if an issue is offered pursuant to Rule 506(c) of Regulation D, such contact/communication may not be required. Documents may be prepared by, or in conjunction with, personnel within the system. Optionally, documents related to the Reg. D offering are prepared by a third party, reviewed manually, and then an applicant is approved, rejected or receives a "qualified" approval. If the registration process results in a rejection or qualified approval, then the Issuer is informed, via electronic communication means, of reasons for the rejection or qualified approval and, if applicable, additional unmet requirements. Documents are maintained, or otherwise stored, in digital format available to all interested parties upon prompting. Information may be updated directly within the system, or updated via links to the SEC EDGAR system or another designated third party. Documents may be prompted for viewing from a corporate information screen, a quote screen, or a trade screen.

Issuer Dashboard: Upon approval, the Issuer is provided with a password-protected Account screen. Optionally, Issuer may be prompted to authorize the system to qualify prospective investors. The system or issuer may manually designate that the offering proceeds pursuant to Rule 504, Rule 505, Rule 506(b) or Rule 506(c), of Regulation D. As will be abundantly clear to those skilled in the art of securities trading, in light of certain regulations enacted pursuant to the Jobs Act of 2012, Rule 506(c) offerings are contemplated to be the primary basis for use, or implementation, of offerings effected via the present system. However, in the event that the issuer elects to offer shares pursuant Rule 504, Rule 505 or Rule 506(b) of Regulation D, the issuer may determine whether they wish to allow unaccredited investors to participate in the restricted securities (RS) offering. If, for instance, the Issuer determines that unaccredited investors are acceptable, then, for example, up to thirty-five (35) unaccredited investors may be allowed to invest in an offering on the system pursuant to Rule 505 and Rule 506(b) of Regulation D, and unlimited non-accredited investors may be allowed to participate in an offering pursuant to Rule 504. Furthermore, the system is preferably programmed to automatically count down the number of non-accredited investors participating in a particular offering. When the predetermined number (e.g., 35) of unaccredited investors is reached, non-accredited investor's ability to bid on an offering pursuant to Rule 505 or Rule 506(b) of a Regulation D offering is disabled. Optionally, the system contains an investment screen listing RS offers available to non-accredited investors, in accordance with regulations governing Rule 504, Rule 505 and Rule 506(b) of Regulation D (FIG. 88). The regulations between these three "safe harbor" designations vary somewhat; however, the system is programmed and otherwise configured, to automatically comply with respective varying regulations. For example, for Rule 505 offerings, the system may monitor a financial value of issuances during a designated period of time. If an unaccredited investor has an unfilled bid for shares, and the threshold of (e.g. 35) unaccredited investors has been achieved, the bid is cancelled and the unaccredited bidder automatically receives an electronic message stating the basis for the cancellation.

Optionally, the Issuer may identify potential investors (e.g., by name or identification number) barred from investing in the issuers restricted securities offering. Issuer is prompted to agree to allow all investors to participate in the offering as per regulations for the designated "safe harbor" exemption, in the event that no investors are barred. Alternatively, an Issuer may block specified investors from purchasing additional shares once they reach a designated share threshold. Furthermore, issuer can optionally designate a threshold to block all investors from purchasing a designated number or percentage of outstanding shares. An Issuer may be prompted to identify parties subject to blackout periods. For instance, in an exemplary implementation, Issuer is prompted to decide whether he desires to electronically receive unsolicited offers for restricted shares during the time period shares are not being offered. Issuers are prompted to choose pursuant to which activity, and by what means, to receive trade or offering alerts, and confirmations by checklist or other means. Messages or alerts may include, by way of example, trade alerts, counter bid alerts, notification that counter bids have been increased or decreased, notification of deficient or expired documents, notification of a private counter offer, notification of the presence of an unsolicited bid, notification of preselected thresholds of percentage of offer placed, notification that an offer has been completed, notification of time remaining until expiration of an offer, and notification of required filings. Optionally, Issuer may prompt the system to automatically provide required auto-populated documents for electronic signature and filing. The issuer is also provided with an option to facilitate filings manually. Furthermore, the Issuer may prompt the system to automatically update, and post to the dashboard, the number of days remaining for a particular offering pursuant to Regulation D, as well as the quantity of shares remaining in the respective RS offer.

Insider or Control Party Registration: An Insider or Control Party (hereinafter referred to generally as ICP) may establish log in information, and subsequently log on to a Registration screen. A checklist may be provided on the registration screen, from which ICP may access document requirements and to which ICP may upload required information. Information may include, for example, general personal information, information pertaining to how shares were acquired, supporting documents and the like. The Insider or Control Party may file a request (with their company) for authorization to allow the system to establish and maintain an electronic link to Issuer's transfer agent account, for instance, if they are not presently linked. An electronic link is preferably established to ICP's company account at a transfer agent, or at a transfer agent's contracted third party designee. Furthermore, this communication link allows the system to: (1) electronically monitor and utilize information necessary to automate many system functions; and (2) monitor ICP's holdings and share sales, for the purpose of compliance. In one exemplary implementation, Insider or Control Parties may be prompted to decide whether they wish to electronically receive unsolicited offers for restricted shares during the time period when shares are not being offered. With regard to receiving trade and/or offering alerts, ICPs are preferably prompted to select an activity type pursuant to which they will receive trade/offering alerts, as well as a means by which they will receive such alerts (e.g., by text, emails, etc.).

Messages or alerts may include, but are not limited to, trade alerts, counter bid alerts, notification of counter bid changes, notification of deficient and/or expired documents, notification of private counter offers, notification of the presence of an unsolicited bid, and notifications of required filings. In an exemplary implementation, an ICP may be prompted to select whether or not ICP wishes to receive, by electronic communication, unsolicited offers for restricted shares during periods of time when shares are not being offered. In an exemplary implementation, ICP may request that the system automatically provide required auto-populated forms for electronic signature. Insider or Control Parties may be provided with an option to facilitate filings themselves. The aforementioned documents may include, for example, SEC Form 3, Form 4, Form 5 and Form 144.

Preparation for Sale of Restricted Insider or Control Party (ICP) Shares: Upon approval, Insider or Control Parties (ICP) may electronically transfer shares from a transfer agent to system. Preferably, prior to sale, ICP files Form 144 with the SEC, either independently or through system.

Insider or Control Party (ICP) Restricted Share (RS) Sales: Market participants designated as Insider and Control Parties (ICPs) are subject to restrictions on restricted stock sales pursuant to Rule 144. The present system is designed and otherwise configured, in addition to providing a market for these securities, to provide a platform to: monitor such sales; automatically update maximum sale information; restrict sales; and remain current with filings. The system automatically integrates streaming information—provided by means of the electronic link with the transfer agent—to calculate maximum share sales in substantially real time according to rules and regulations.

Preparation for Placement of Issue Pursuant to Regulation D: The present system incorporates one or more checklist(s) of legally required documents on a placement page, listing legally required documents for the placement of restricted securities under Securities and Exchange Commission (SEC) Regulation D of the United States Securities Act of 1933. Documents are gathered, uploaded and submitted, to the system for approval. Documents may include, for example, director's resolution, term sheet, private placement memorandum, 8k filing or amendment, Form D, and any other documents required, in accordance with rules and regulations as set forth by applicable governing bodies. In an exemplary implementation, documents are prepared, approved and disseminated, by a qualified third party. In an alternative implementation, documents are prepared, approved and disseminated, within the corporate structure of the system. Upon approval, private placement documents are electronically filed with appropriate governing bodies, if required, including FINRA's Private Placement Filing System, within a designated time period according to regulations, stored electronically, and made available for electronic access to system participants.

Preparation for Placement of Issue (Continued): Upon approval, required documents are uploaded to the Issuer's transfer agent, and a share certificate (commensurate with the maximum number of shares in the offering) is electronically downloaded electronically from the transfer agent. In one implementation, the Issuer or Seller Shares are posted and reflected electronically in Issuer's Account screen and Activity screen. Optionally, Issuer may authorize the system to automatically electronically populate documents for restricted securities sales pursuant to Regulation D and related filings. For example, these forms preferably include at least: stock purchase agreements; subscription agreements; 8k filings; amendments; Form D's; Form 144's; Form 144b letters; and legal opinions. In one implementation, the system electronically generates a legal opinion and a 144b letter that are automatically populated according to the facts and circumstances of a particular trade. If an investor chooses to utilize the system for share registration, the respective electronically-populated legal opinion and 144b letter are stored on the system for subsequent automatic dissemination to counsel, in addition to any other required supporting trade and funding documents, upon the conclusion of the required holding period pursuant to Rule 144. The Issuer may, for instance, authorize the system to automatically request a legal opinion from counsel in order to administer rapid processing for registration.

Investor Registration: Investors must be qualified and approved to invest in placements by means of the system. Preferably, an accreditation procedure is implemented, maintained and updated within the system as required. Alternatively, accreditation and maintenance may be contracted to a third party and electronically linked. Investors may download and fill out new account forms. Investors may then be prompted to designate themselves as a particular category of investor. By way of example, categories may include: accredited individual investors, non-accredited individual investors, qualified institutional buyers (QIBs), market makers, trusts, holding companies, and other parties potentially allowed to invest. Definitions of each designation may be made available to registering parties upon prompting. Preferably, the investors supply documents to support their designation. The investor's designation determines whether the market participant is eligible to participate in transactions according to respective rules and regulations. The system is contemplated to be programmed to reference qualifying factors and set trade parameters to automatically comply with regulations with regard to counter party eligibility, offering, designation and resale (see FIG. 50 and FIG. 62). Additionally, according to the counter party designation and other factors in a specific trade, the system may automatically determine whether "tacking," in each restricted share sale, is allowable by rules and regulations. The term "tacking" refers to tacking together the time each shareholder holds the stock, and is allowable under certain parameters and circumstances pertaining to a particular trade. The ascertainment of whether tacking is permitted in a particular trade determines the date a restricted security is eligible to have the restriction lifted. For example, the system may process the variables of the trade in comparison with existing regulations to determine whether tacking is allowed in a particular resale of shares, or whether the holding period restarts for a new investor. Investors declare whether they are related to a syndicate or group of investors, which determines filing requirements and may determine if or how many shares can be purchased in a particular share offering according to Section 16 of the Securities Exchange act of 1934. For example, if the investor is designated as part of a syndicate or related investment group, the system may be programmed to automatically link the investors for purposes of Section 16 compliance, as well as for the purpose of disqualifying barred investors from purchasing specified restricted security offerings, in accordance with issuer's request. Investors may represent whether they are insiders or control parties in any public company. Potentially, investors may authorize the system to automatically populate and/or electronically sign documents related to trades. These documents may include, for instance, stock power, stock purchase agreements and subscription agreements. Investors may be queried whether they authorize the system to automatically file and disseminate required documents according to available information. Filings may include, for example, Form 3, Form 4, Form 5, Form 144 and Form 144B, in addition to any documents supporting a legal opinion for purposes of registration. Upon acceptance by the system, qualified investors sign and upload required documents. Documents are filed electronically in the system.

Offer for Sale by Issuer/Seller: In accordance with an exemplary implementation, a qualified issuer or reseller of restricted securities may offer to sell restricted securities through a secure web-based portal or other electronic means. The restricted securities offered for sale are priced by the issuer, corporate insider or control person, or reseller in terms of a specified streaming percentage discount-to-free-trading (DFT) shares. The price of restricted securities may automatically adjust to the offer or last trade price of corresponding free trading shares on a streaming, real-time basis. Preferably, a percentage discount range is provided within a range of 5 percent to 50 percent. According to one example, shares are offered as a day order. According to another example, the offer remains effective until cancelled. According to yet another example, orders remains effective until a specified date (see FIGS. 3-11).

According to another implementation, restricted securities are offered at a fixed price. Prices set by formula are also contemplated. For example, shares may be offered in terms of a streaming discount to free trading share price with or without a fixed price minimum. Alternatively, shares may be offered at a discount to a specified trailing moving average, with or without a fixed price minimum. A variety of parameters are used to establish the price. For example, the offer size is entered in terms of number of shares offered, number of shares offered all or none, or number of shares offered with a minimum share purchase. According to a further embodiment, shares may be offered as a "contingency offer." In this case, shares are offered contingent upon the occurrence of an event; typically, an aggregate number of shares being purchased by the closing date of the offering, and no minimum purchase requirement. According to a preferred embodiment, contingent offers will be designated, for example, by a "c" or other notation means in conjunction with the restricted share quote. In this case, details of the terms of the contingency are available to the prospective investor upon prompting. Accordingly, if the investor purchases shares of restricted securities that are offered subject to one or more contingencies, shares and funds designated for purchasing shares remain pending until the contingencies are satisfied or the offer is cancelled.

All of the various types of offers are preferably electronically submitted, and reflected on the trading platform. For instance, the issuers may determine whether they are willing to accept counter bids for their offers. Preferably, issuer and/or seller are electronically notified of counter offers.

Figure 14:
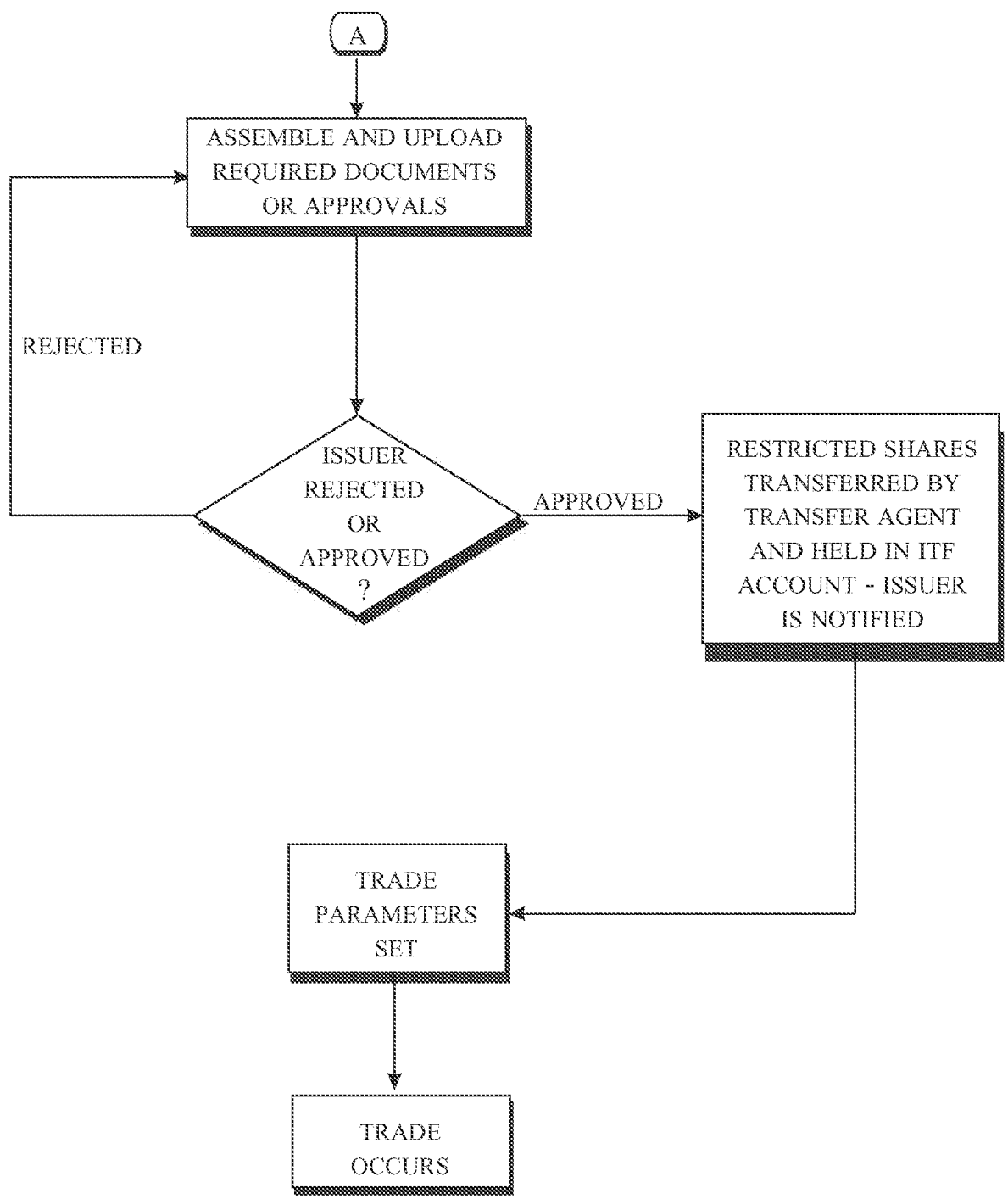
FIG. 14 presents a second portion of a schematic flow diagram (initiated in FIG. 13) of an Issuer Registration and Issuer Approval process, in accordance with a preferred implementation of the present invention.
Figure 16:
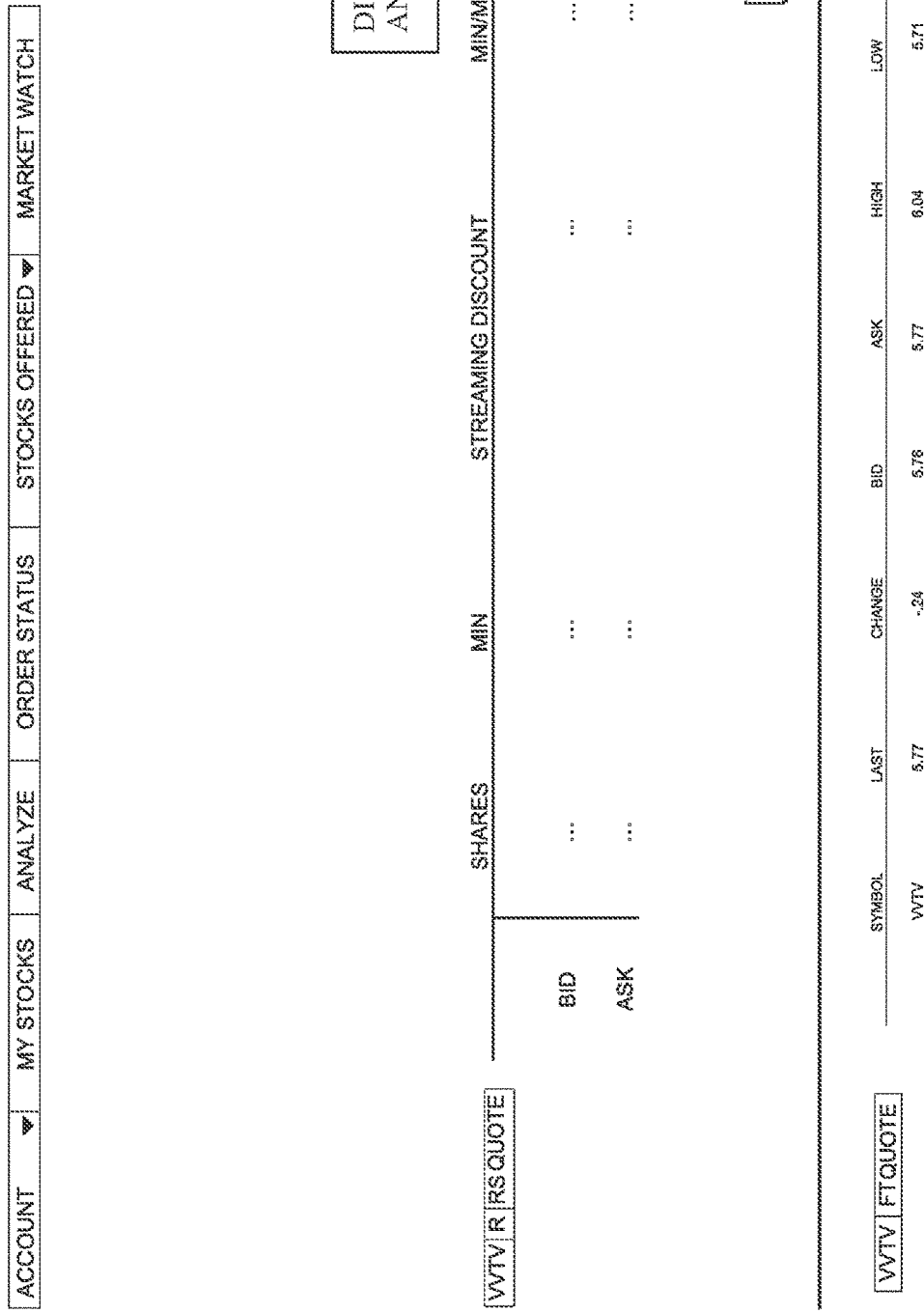
FIG. 16 illustrates an exemplary Trade screen for "VVTV" stock, wherein a free trade quote is available. Here, the restricted share quote shows neither a present bid nor present offer for restricted shares in VVTV stock. In this instance, the Bidder prompts to query the meaning/definition of the corresponding Market Depth screen (second in sequence of Investor Unsolicited Bid process)
Figure 18:
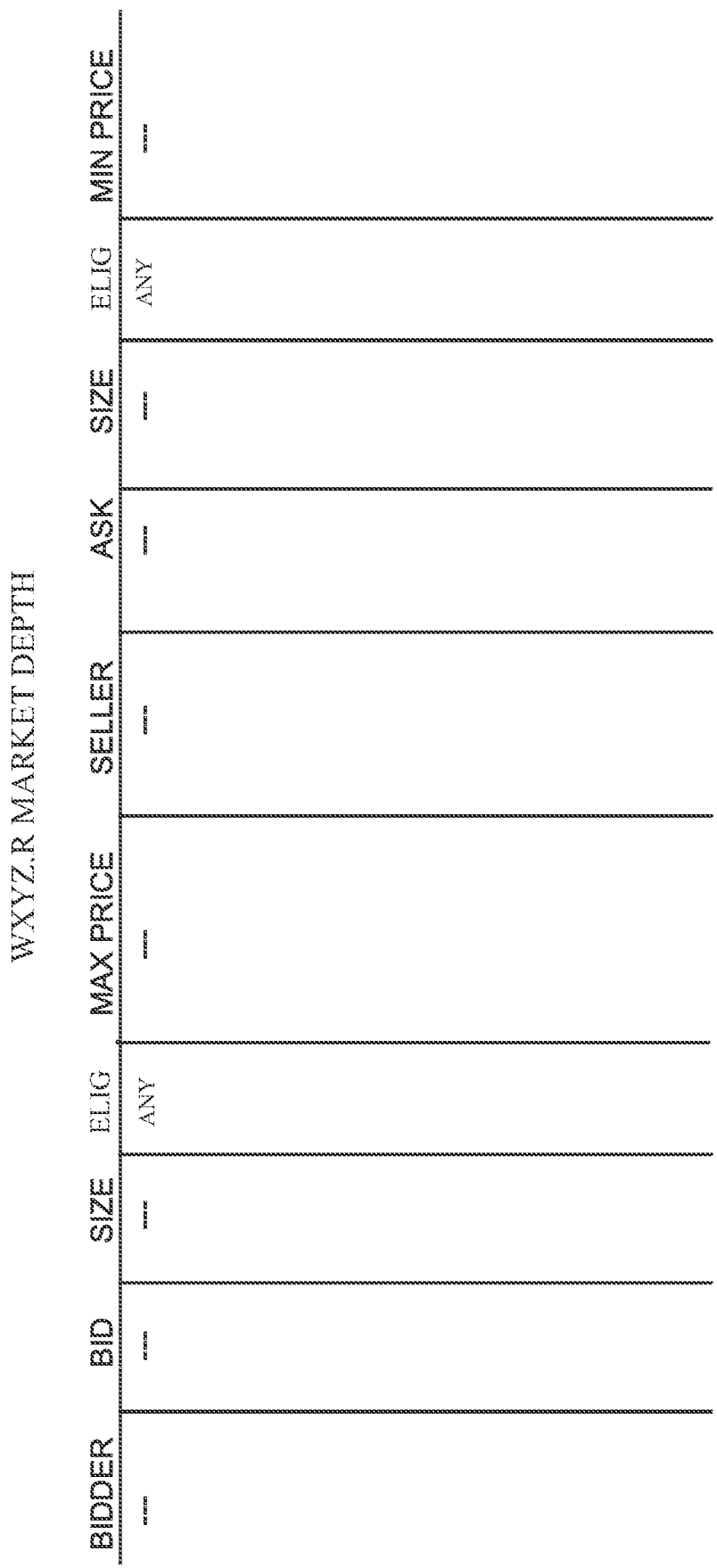
FIG. 18 illustrates and exemplary Market Depth screen layout, in which there is no current bid or offer for VVTV restricted securities. This functions as a "before" screen for the present sequence (forth in sequence of Investor Unsolicited Bid process)
Figure 19:
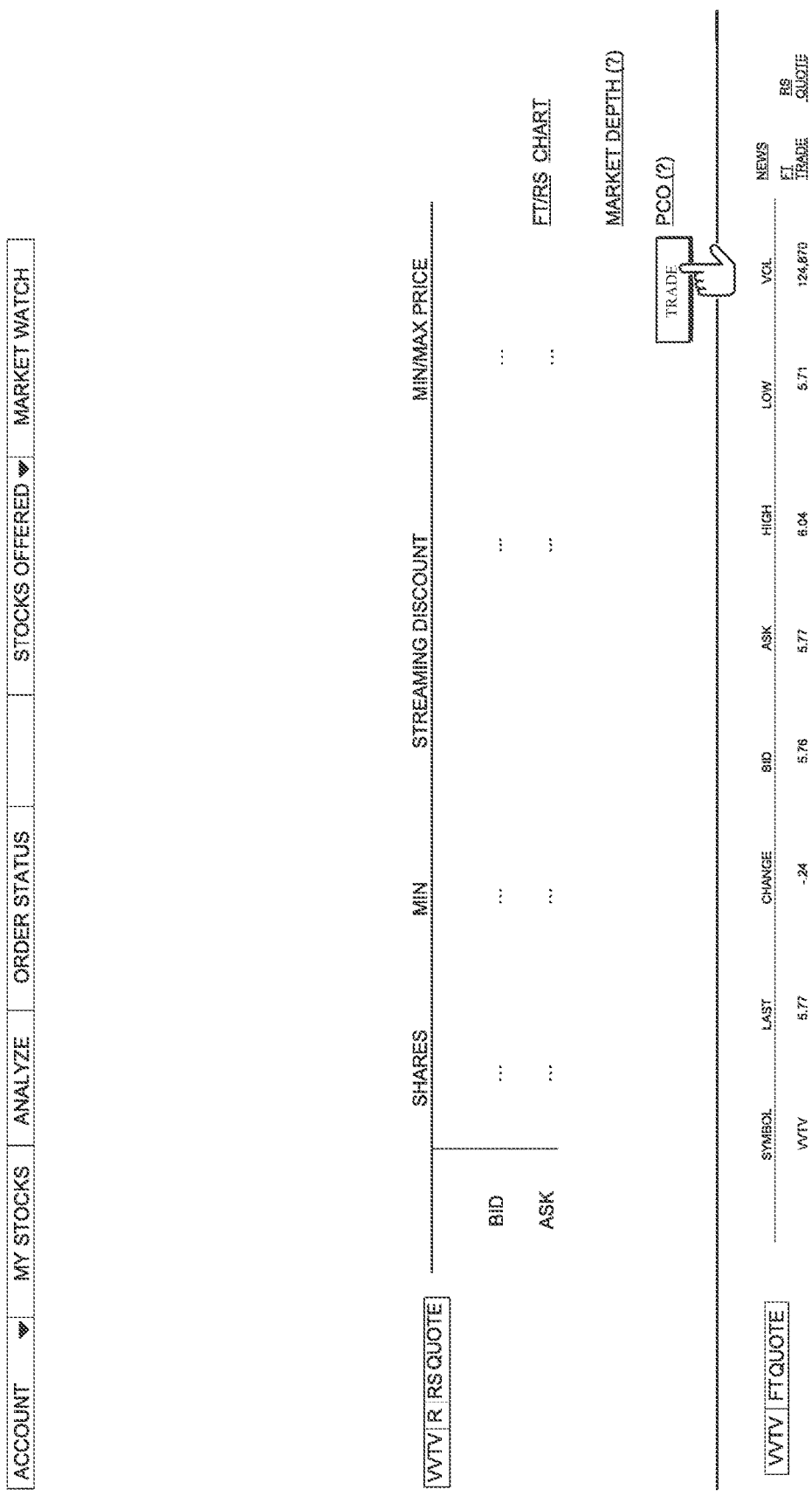
FIG. 19 illustrates an exemplary Trade screen for VVTV stock, wherein the investor elects to trade restricted securities in VVTV stock. Restricted shares can be offered and sold by the issuer pursuant to Regulation D, by an insider or control person that has Rule 144 shares and is registered with the system, or by a reseller of restricted shares in VVTV, which the reseller has purchased and is holding in reseller's account within the system. According to the present invention, if there are no potential sellers at a particular point in time, during a period a bidder has an active bid, the bid is automatically cancelled and the bidder is electronically notified of cancellation (fifth in sequence of Investor Unsolicited Bid process)
Figure 21:
FIG. 21 illustrates an exemplary Trade screen for VVTV.R, wherein Trade parameters are set and subsequently submitted. (seventh in sequence of Investor Unsolicited Bid process)
Figure 22:
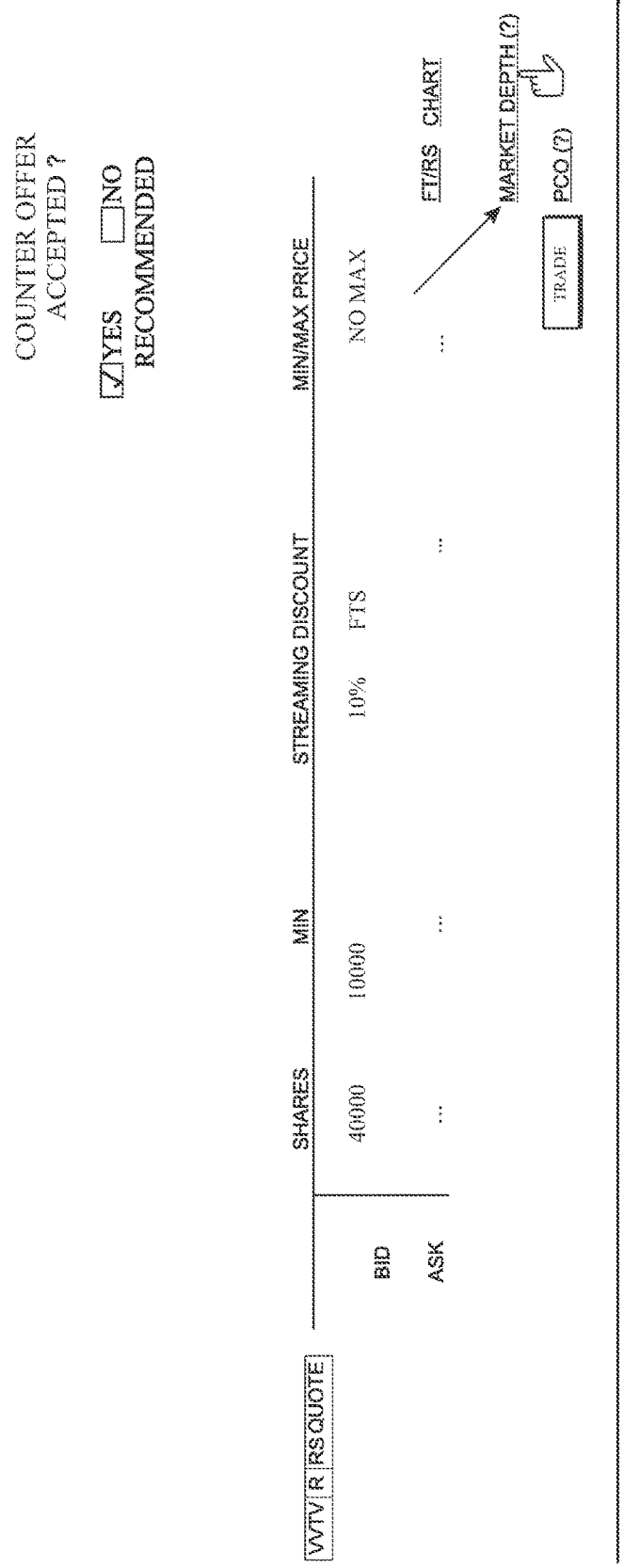
FIG. 22 illustrates an exemplary Trade screen for VVTV stock, wherein restricted shares in VVTV stock (i.e., VVTV.R) is shown currently displaying Investor's bid. In this example, Investor selects/prompts Market Depth screen to display current bids and offers (eighth in sequence of unsolicited bids)
Figure 30:
FIG. 30 illustrates an exemplary Trade screen for WXYZ.R, wherein Investor has prompted for corresponding Market Depth screen in order to view the present market. (seventh in Investor Counter-Bid sequence)

Issuer/Seller Compliance: According to another implementation of the present invention, when a seller is an issuer, a statement of governing regulations, a compliance agreement and a checklist are prompted upon entering an order to sell shares. Detailed regulations for the specific trade are made be available upon prompting. The system automatically cross-references facts and circumstances of a particular trade, and subsequently compiles a list of required filings according to rules and regulations incorporated into the system. In the United States, for issuers, the preferred implementation would likely be in accordance with Rule 504, Rule 505, Rule 506(b) or Rule 506(c), of SEC Regulation D. Also, in the United States, for insider or control persons selling, or resellers of shares, the preferred implementation would likely be SEC Rule 144 or SEC Rule 144a. For instances in which regulatory filings are required, the seller or issuer is preferably prompted to file appropriate documents prior to sale, or within a designated period of time according to regulations. Documents are preferably automatically populated in accordance with trade data and personal information, and cross-referenced rules and regulations programmed or otherwise integrated into the system. In addition to electronic filing of documents to appropriate regulatory agencies, electronically filed documents are preferably automatically copied to the issuer's portal, to issuer's legal counsel, and to issuer's transfer agent. Furthermore, such documents are preferably made available to all parties upon prompting. Compliance issues for seller or issuer preferably include: the number of shares issued by an issuer within a designated time period; issues related to insider or control status of the seller of shares; seller's lock-up periods; seller's holdings status; issuer's reporting status; and other limitations described in respective statutes, regulations and policies (FIG. 14).

Noncompliant Offers: The system may automatically reject offers that fall outside programmed compliance parameters for trading. According to an implementation, an offer falls out of compliance if the offering price for restricted shares drops below 50-perecent of streaming, real-time price of free trading shares. According to another example, an offer fails in the event the free trading share price falls below a fixed offering price for restricted shares. According to a third example, the offer fails if the stated minimum offer price for the free trading shares exceeds the current market price of the free trading shares. According to a fourth example, the offer fails if a restricted share offer is priced as a discount to trailing moving average, and the offer crosses current price for free trading shares. In the event issuer, seller or reseller, are determined by the system to be out of compliance, or not current with information or filings, offers may be cancelled at the system's discretion. In the event the offer is rejected or cancelled, the seller is electronically informed of reason for rejection of offer.

Offer for Sale Limitations by Issuer/Seller: According to an exemplary implementation, restricted shares are offered by the issuer or reseller when there is no bid present—thereby, creating a posted offer. Restricted shares may be offered at parameters that are not in accord with an existing bid, creating a posted counter offer. Furthermore, the Seller may sell shares within the parameters of the existing bid to consummate the transaction. Furthermore, issuers registered with the system can elect whether or not to accept unsolicited bids from potential investors for registered securities. If the issuer chooses to accept unsolicited bids for restricted shares, the company's offering of restricted shares will be listed on the system as "available" for bid or purchase (FIG. 15). Issuers may elect to accept counter bids for shares offered through the system. Alternatively, issuer can require that if investors purchase shares, the transaction is effectuated within the parameters of their offer.

Figure 13:
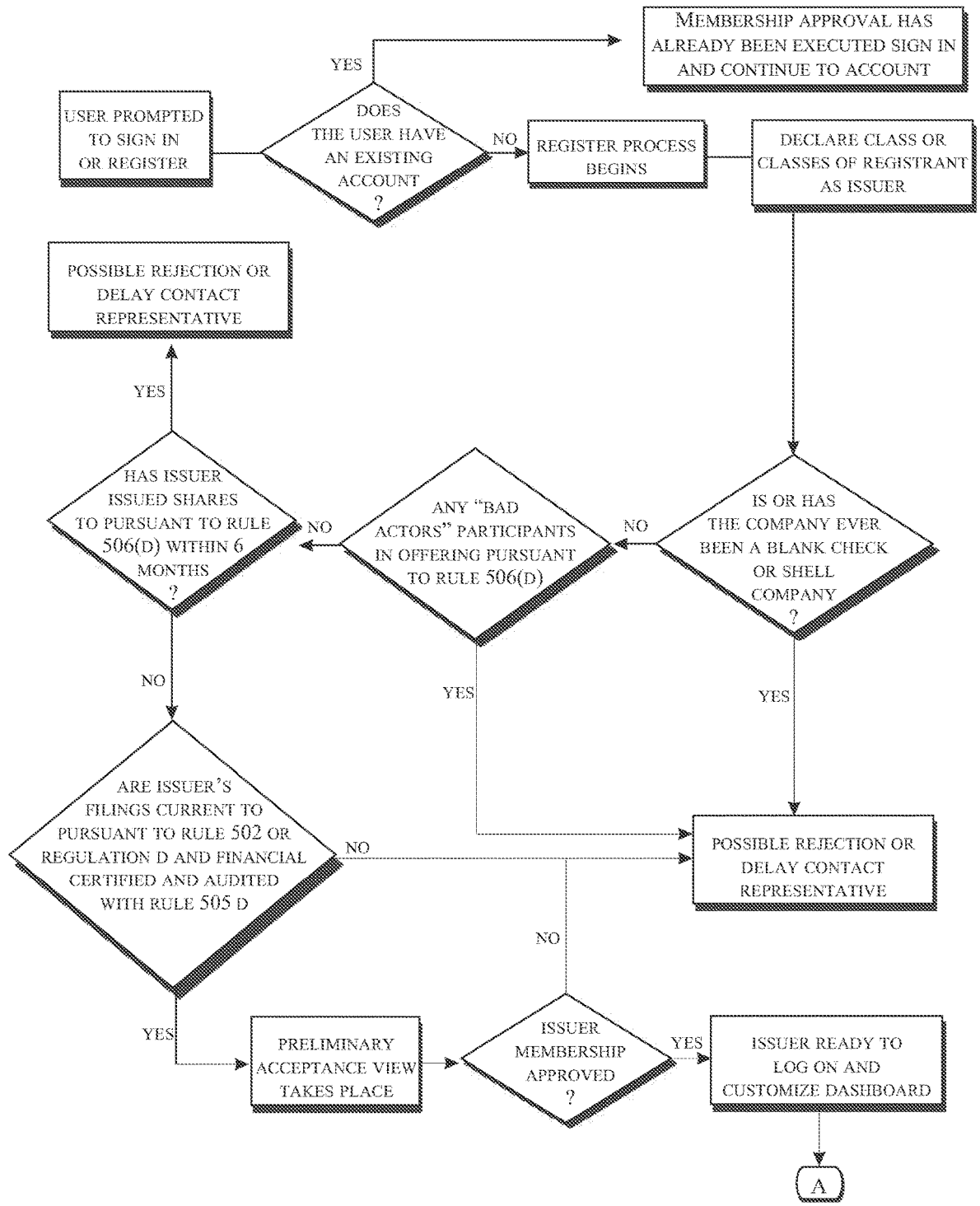
FIG. 13 presents a first portion (continued in FIG. 14) of a schematic flow diagram of an Issuer Registration and Issuer Approval process, in accordance with a preferred implementation of the present invention.

The system may accept or reject offers based upon the number or value of restricted securities issued by an issuer within a specified time period, in accordance with rules and regulations governing the specific transaction. Issuer may be alerted to file a revised Form 8-k to the SEC if the offer is materially changed. The system monitors the number or value of shares the issuer or seller is permitted to sell within a given time period according to regulations, and updates the corresponding value displayed upon the account screen on a streaming basis. The system may accept or reject offers based upon criteria such as, for example, a seller's insider status, a seller's holdings status, an issuer's reporting status, whether an issuer has recently placed securities pursuant to Regulation D, and any other criteria that may raise questions as to the propriety of the transaction. (FIG. 13).

Bid to Purchase by Qualified Investor: By way of example, a qualified investor may bid for restricted securities through a secure web-based Internet portal, Intranet, or any other network or other communication means. According to one embodiment, if unsolicited bids are accepted for a selected security, restricted shares are bid for by the Investor when there is no bid present, creating a posted bid for the restricted securities (FIGS. 15-23).

Figure 32:
FIG. 32 illustrates an exemplary Trade screen for WXYZ.R, wherein Investor has bid within the parameters of a corresponding defined offer. This functions as a so-called "buy at market" order, or a "buy at offer" order. (Note: on the present screen, the "sell" option on the trade prompt is opaque. The "sell" option is able to be prompted only if the market participant has restricted shares (RS) in the designated stock in their account.

According to an exemplary implementation, restricted shares are bid at parameters that are not in accord with an existing offer, creating a posted counter bid for the restricted securities (FIGS. 24-31). Alternatively, where there is an existing offer to sell restricted securities, an investor may purchase shares within the parameters of the existing offer to consummate the transaction. (FIG. 32).

Figure 12:
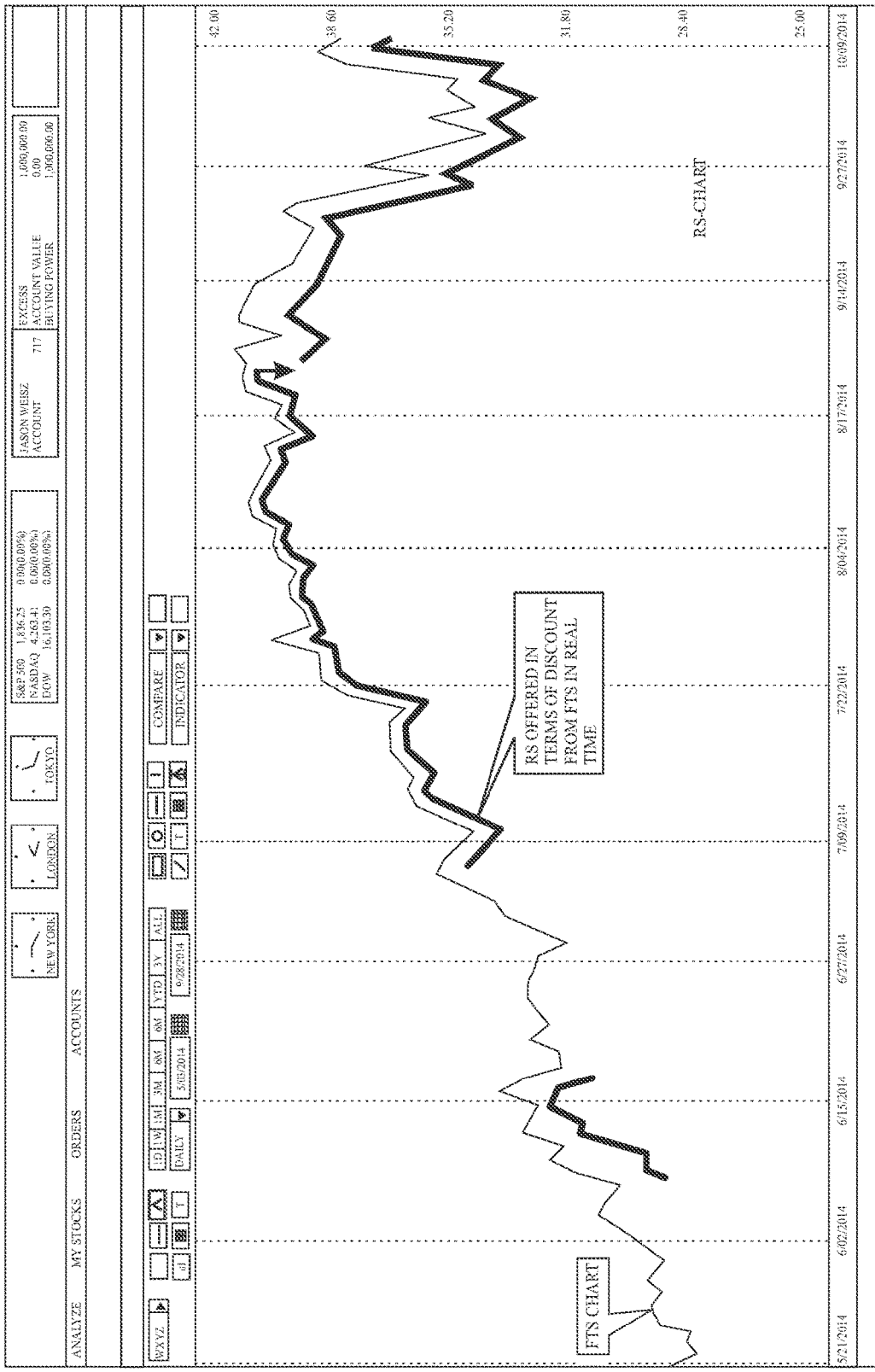
FIG. 12 illustrates offer of liquid shares reflected on a corresponding chart, wherein offer of restricted securities trades parallels free trading share price, and in which discount to free trading shares is reflected as having increased.
Figure 29:
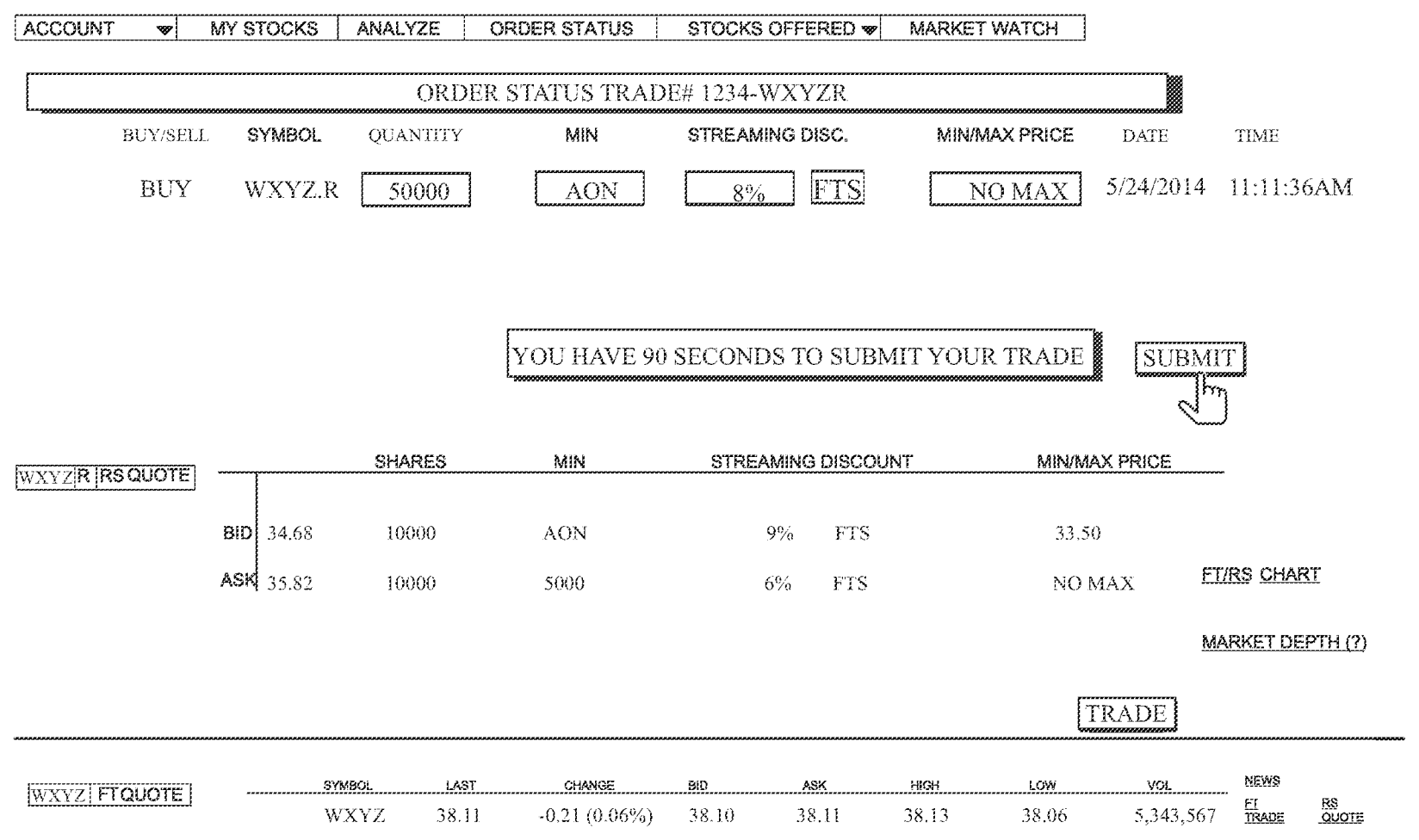

Restricted shares can also be bid for at a fixed price. Additionally, restricted shares can be bid in terms of a streaming discount to free trading shares with or without a fixed price maximum. In another embodiment, restricted shares can be bid in terms of a discount to a trailing moving average with or without a fixed price maximum. If restricted shares are bid in terms of a discount, the bid automatically adjusts to the bid, offer or last trade price of the free trading shares on a streaming real time basis. (FIG. 12) The bid size can be in terms of number of shares, number of shares bid all or none, or number of shares bid with a minimum share purchase. All three types of bids can be electronically submitted and reflected in detail on the trading platform. According to another example, Shares are offered either as a day order, effective until cancelled or effective until a specified date. According to one embodiment, upon submitting a trade, an investor can again be qualified for suitability electronically, such as via pop-up screen or other method (FIG. 28). According to another embodiment, a specified time period to complete the bidding process is displayed upon entering parameters for the trade. According to a preferred embodiment of this invention the maximum time period between selecting the parameters of the bid and submitting the bid for trade is 90 seconds. (FIG. 29).

Non-Compliant Bids: The System may automatically reject bids that fall outside programmed compliance parameters for trading According to one embodiment, a bid falls out of compliance if the bid price for restricted shares drops below 50% of streaming, real time price of free trading shares. According to another example, a bid fails in the event the free trading share price falls below the bid price for restricted shares without the trade for restricted shares being executed. According to a third example, bid fails if the stated maximum bid price for the free trading shares exceeds the current market price of the free trading shares. In the event Issuer, investor is determined by the System to be out of compliance or not current with information or filings, bids may be cancelled at the system's discretion. In the event the bid is rejected or cancelled, the bidder is electronically informed of reason for rejection of offer.

Figure 62:
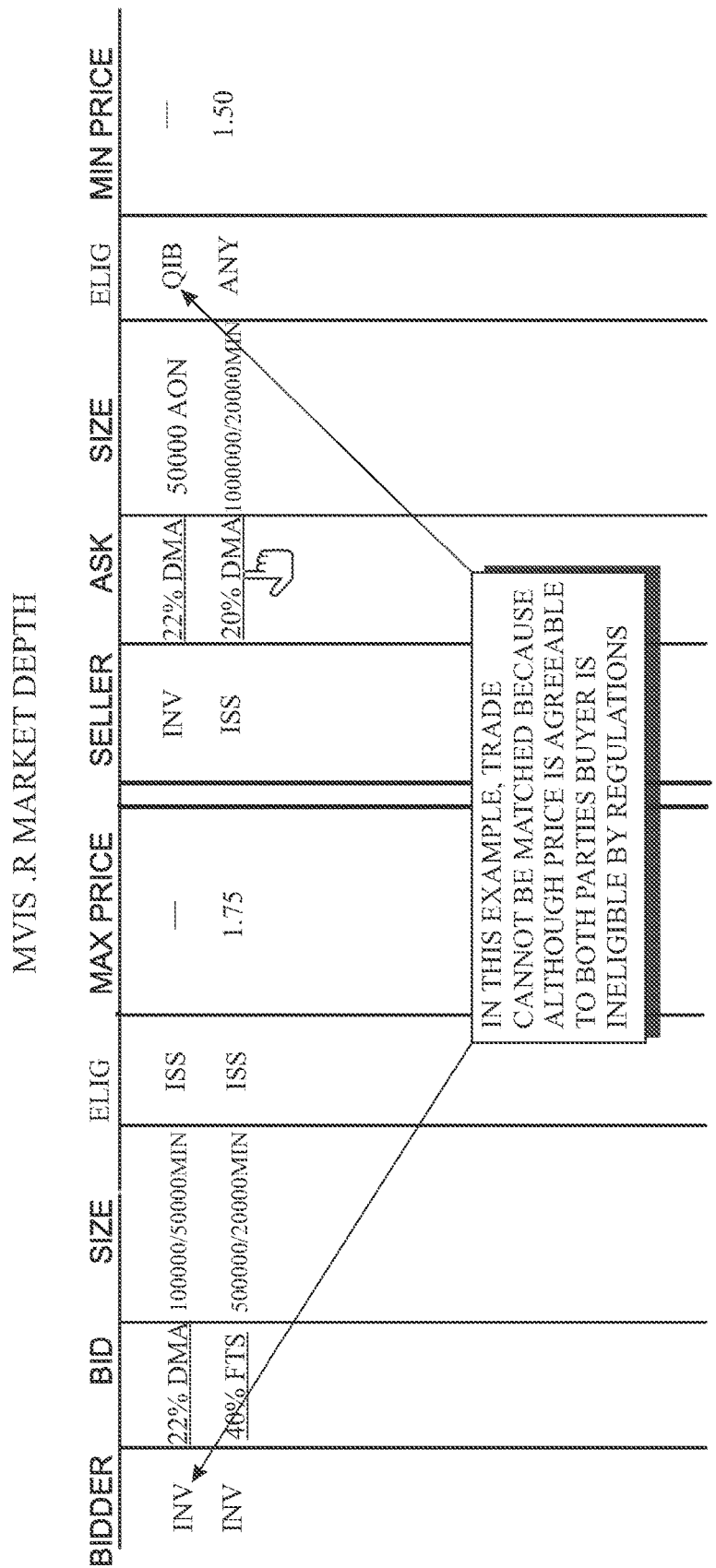
FIG. 62 presents "market depth" screen for MVIS.R. The screen displays two bids and two offers for the restricted shares, including an investor (reseller) as low offer, and an investor as high bidder. As stated earlier, different designations of market participants result in different eligibility as counterparties in trades involving restricted securities. In the present instance, reseller is reliant on Rule 144a, which permits resale of restricted securities only to qualified institutional buyers. On the present screen, it is shown in the "Eligible Counter Party" column that a reseller is only eligible to sell to a QIB (shown). Therefore, in this case the bidding investor (not a QIB) is not eligible to purchase shares from the seller with the low offer. The problem is identified, displayed, and explained (fourth in Locked Markets investment sequence)

Dynamic Pricing in Real Time: According to this example, the current high bid or low offer, whether static or dynamic, is reflected on a computer monitor trade screen. Other active bids and offers, including bid or offer size, are available for display by the site user. According to one embodiment, trade screen can be accessed by keyword, from quote screens, offer screens or market depth screens. The invention contemplates that a counter party may trade any existing bid or offer prompted on the market depth screen, not just the inside market (FIG. 62).

According to one example, a seller offers shares at a 6% discount to free trading shares and a bidder submits a bid for shares at a 9% discount. The restricted share quote reflects: "WXYZ.R −6% −9%" with size and other trade parameters displayed.

Dynamic Trading in Real Time: The present invention contemplates that the system utilizes dedicated software through a secure website. The website comprises designated electronic pages for issuer and investor, representing both sides of the transaction, including inter alia, one or more of the following: introduction; qualification questionnaire; new account form; instructions; tutorial demonstration, or other applicable forms or information. Secure login capability is also contemplated using methods well-known in the art. Security protection and privacy concerns are contemplated. According to an embodiment of this invention, the system further comprises a secured system providing secure confidential information exchange.

Figure 35:
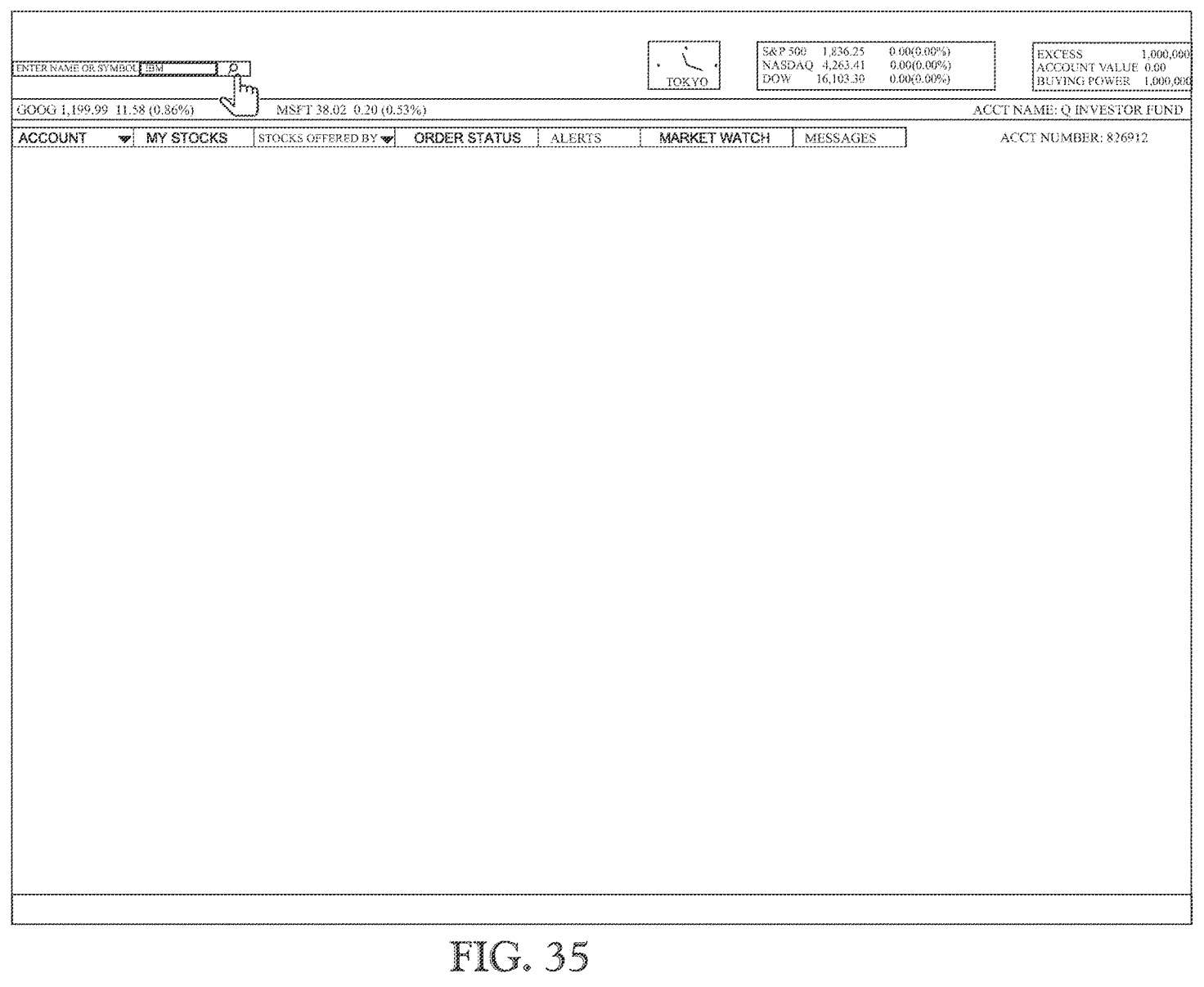
Figure 36:
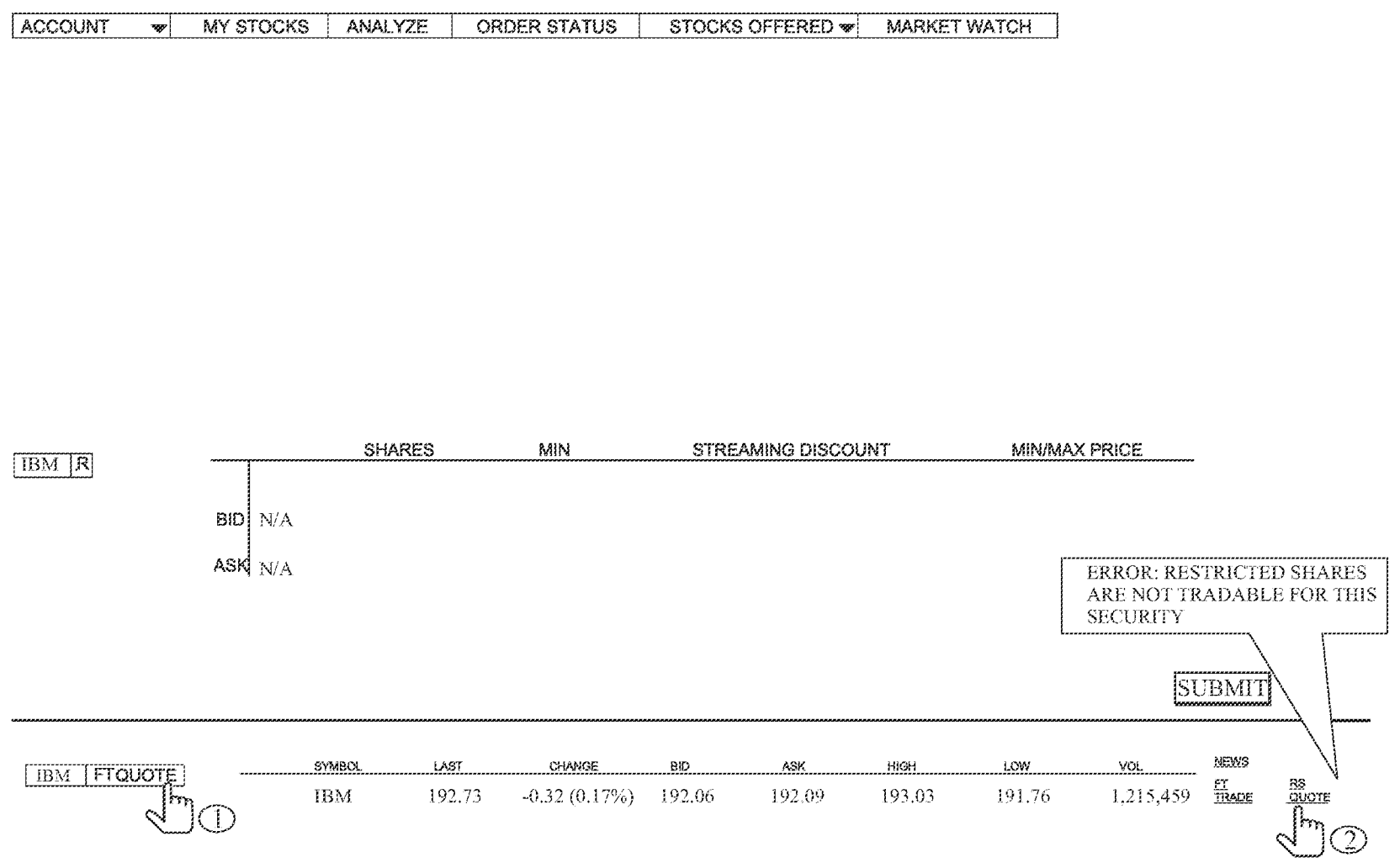
Figure 37:
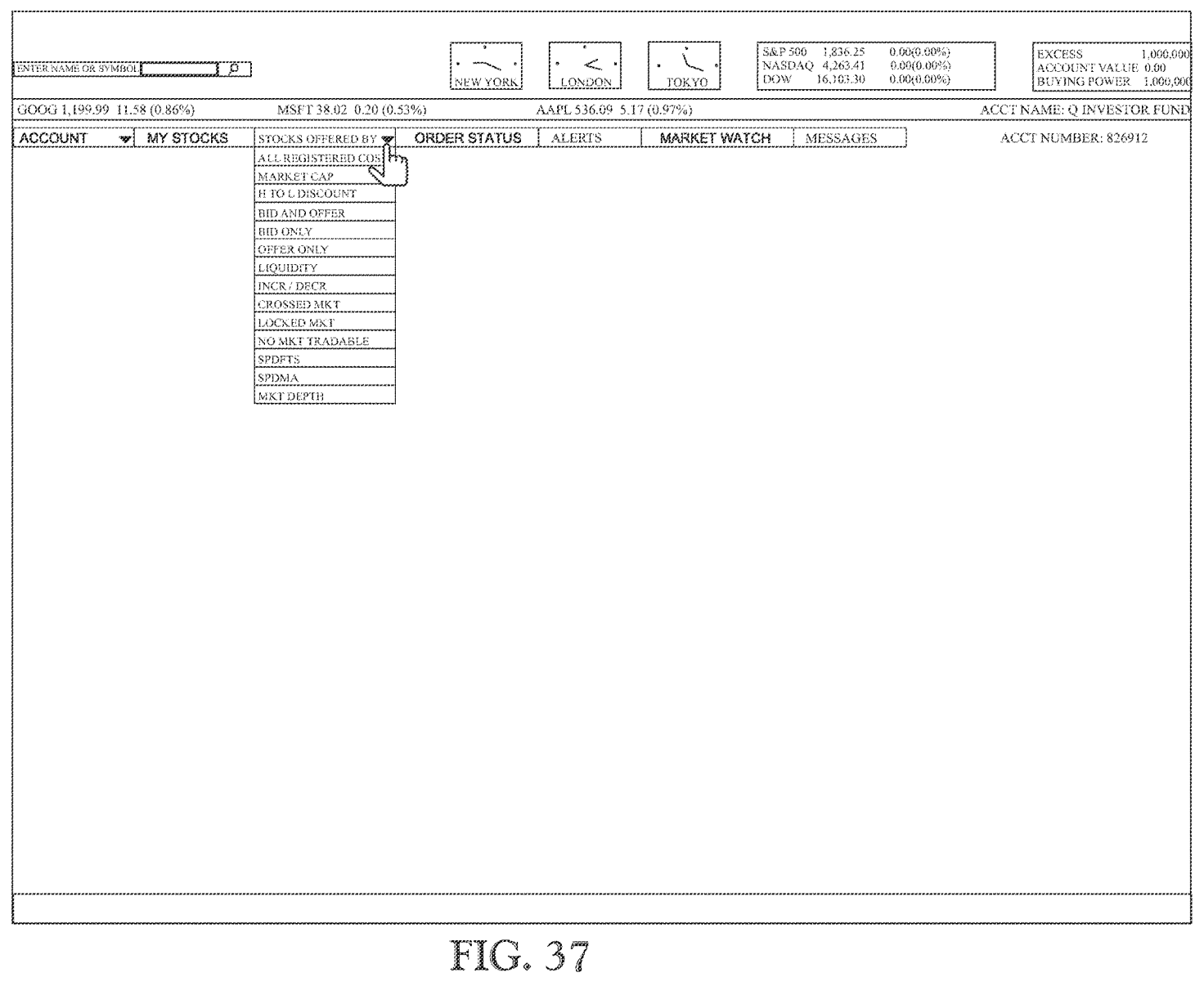

According to one implementation, the qualified investor elects to purchase or sell a security. If the investor does not presently hold securities, the option to sell is not made available (FIG. 32). According to one embodiment, the website lists registered and participating issuers via electronic lists, electronic grid, and makes them available for search via keyword or free trading quote screen (FIG. 32; FIG. 37). The invention contemplates providing an indication if restricted securities are not tradable in the stock accessed via keyword or free trading quote screen. (FIG. 35; FIG. 36). According to a preferred embodiment, electronic lists delineate tradable restricted securities by designated parameters (FIG. 37).

Figure 38:
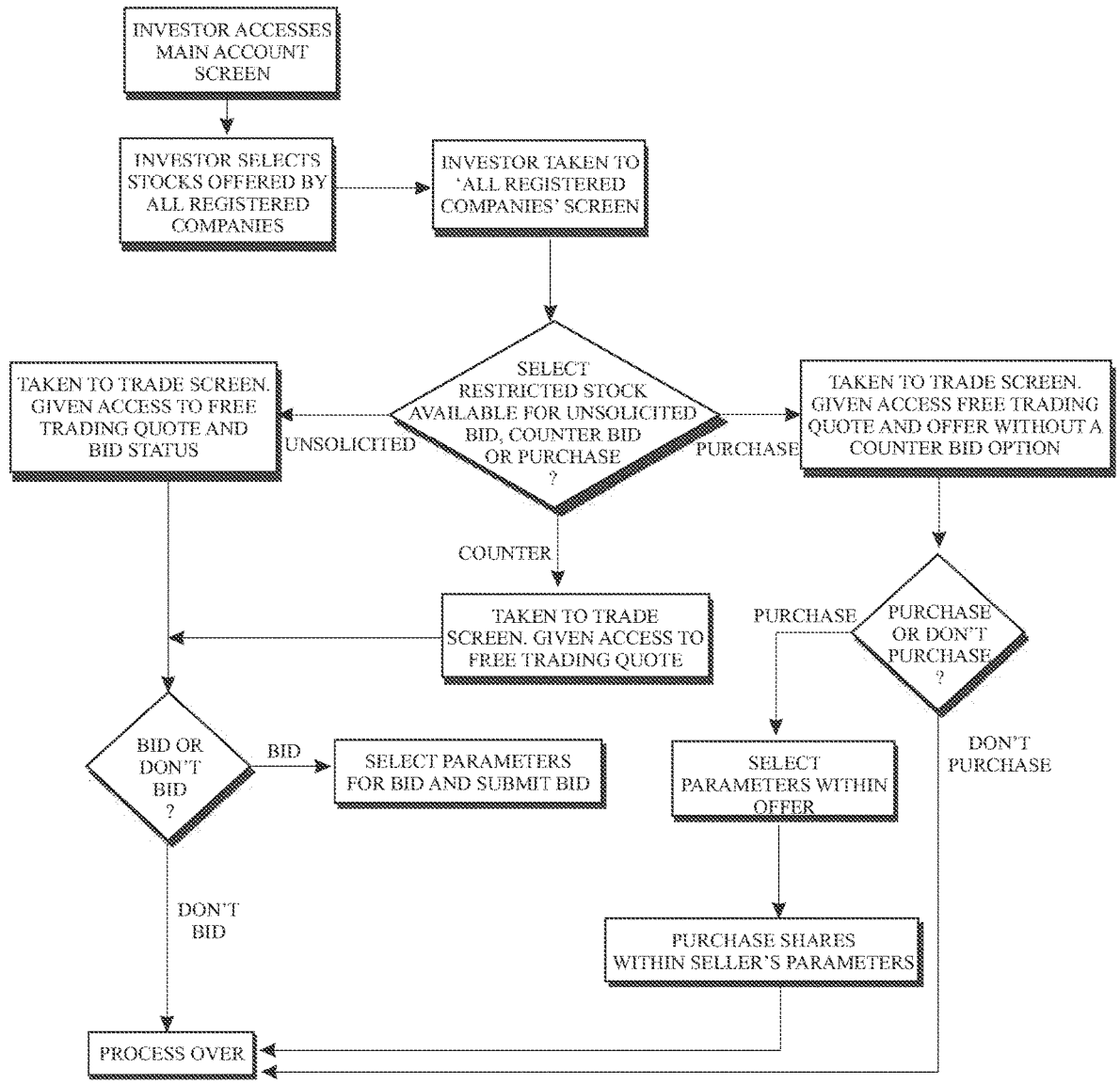
FIG. 38 illustrates an exemplary schematic flow diagram of a process for accessing a comprehensive listing of available RS investments, selecting an investment, and completing an investment process, in accordance with the present invention.
Figure 45:
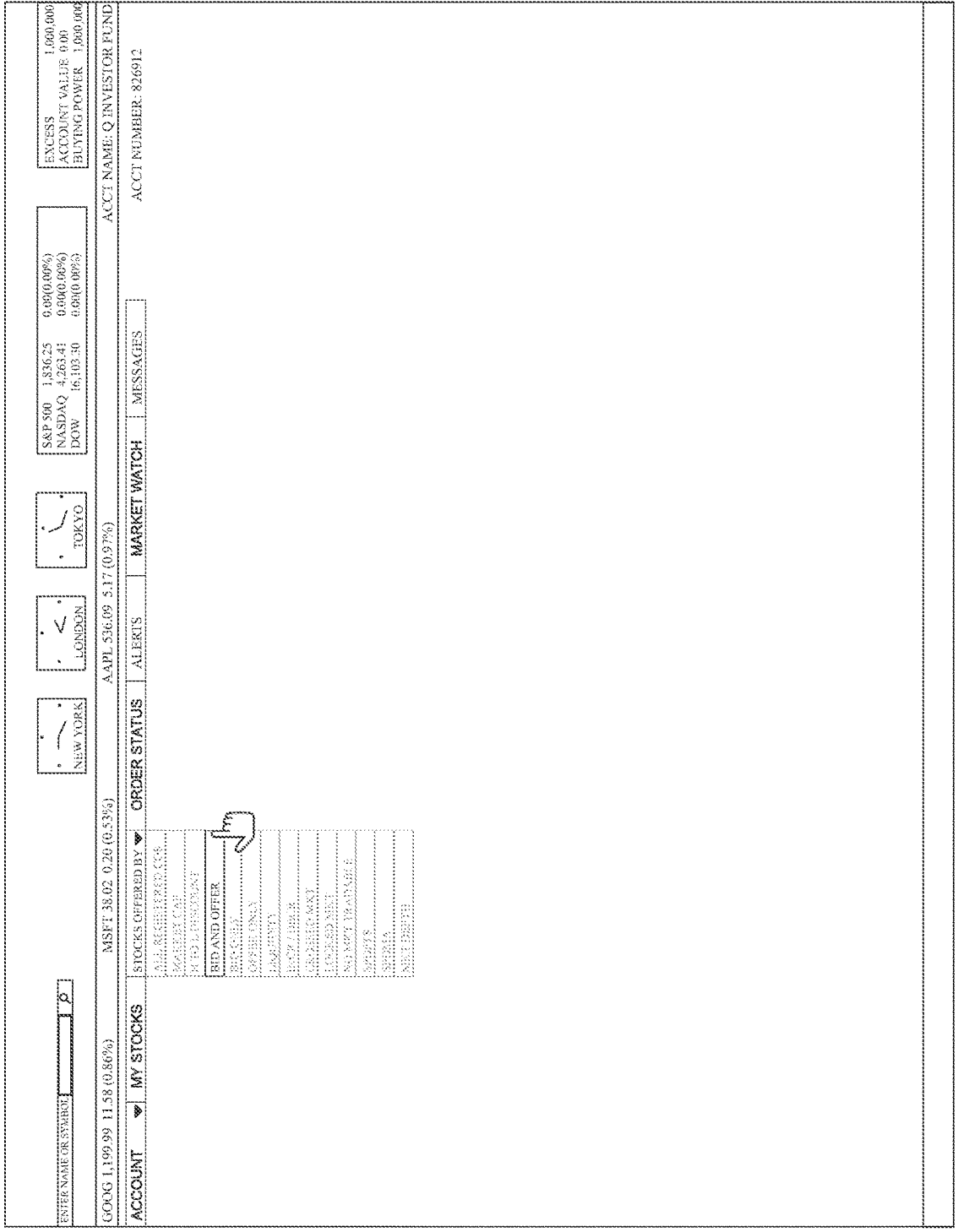
FIG. 45 illustrates an exemplary Investor dash board, wherein Investor prompts for a screen that displays stocks for which restricted securities (RS) with current bids and offers are listed (first in Offers With Bids investment sequence)

According to another implementation, all companies registered with the system are listed. In another embodiment, all public companies whose restricted shares are tradable on the System are listed (FIGS. 38-40). In another embodiment, tradable restricted securities are listed by high to low, or low to high market capitalization (FIG. 41 and FIG. 42). In yet another embodiment, tradable restricted securities are listed by high to low or low to high discount. (FIG. 43); (FIG. 44) In yet another embodiment, tradable restricted securities with both bids and offers are listed. (FIG. 45); (FIG. 46) In yet another embodiment, tradable restricted securities with bids only are listed. (FIG. 47); (FIG. 48)

Figure 49:
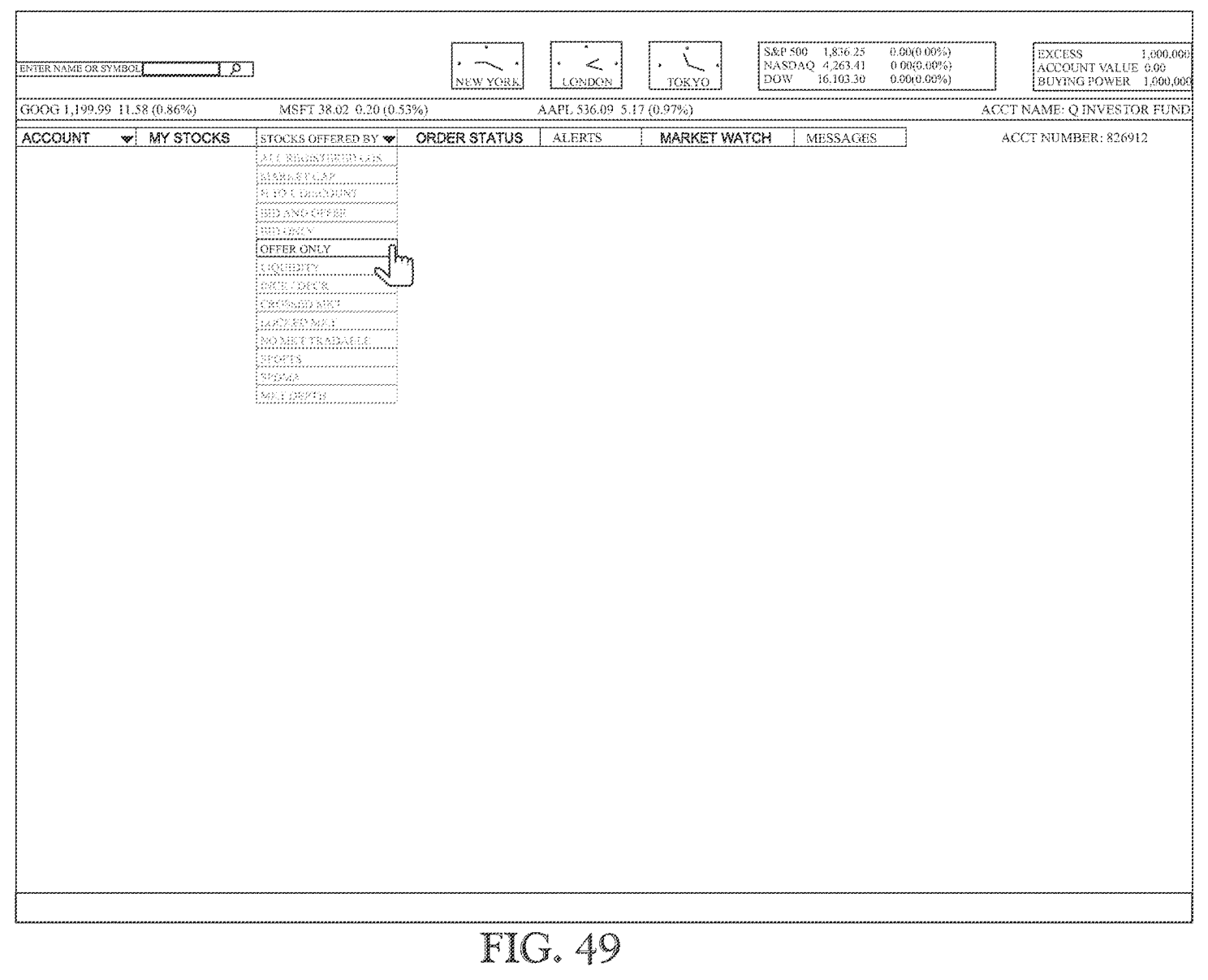
Figure 51:
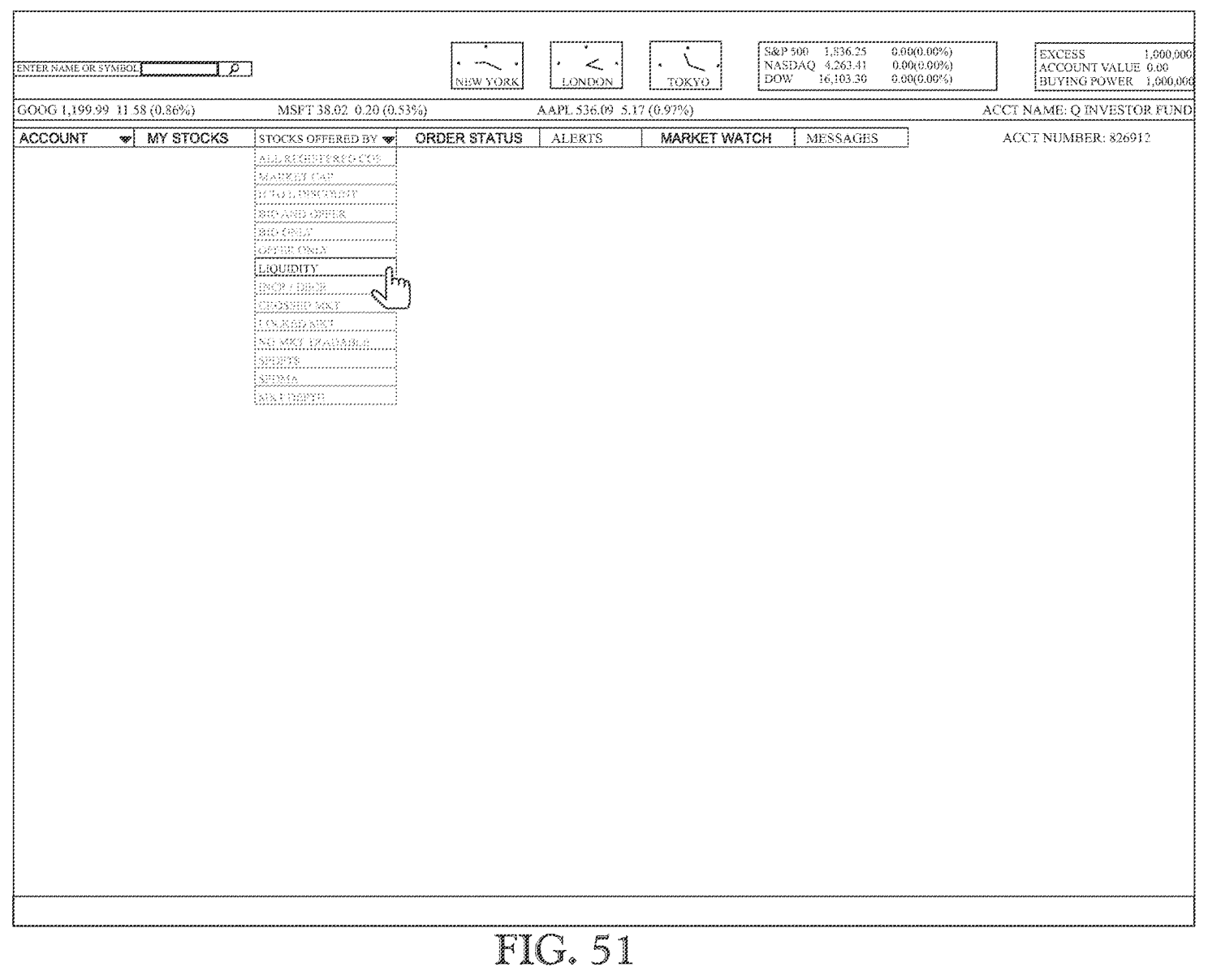
Figure 53:
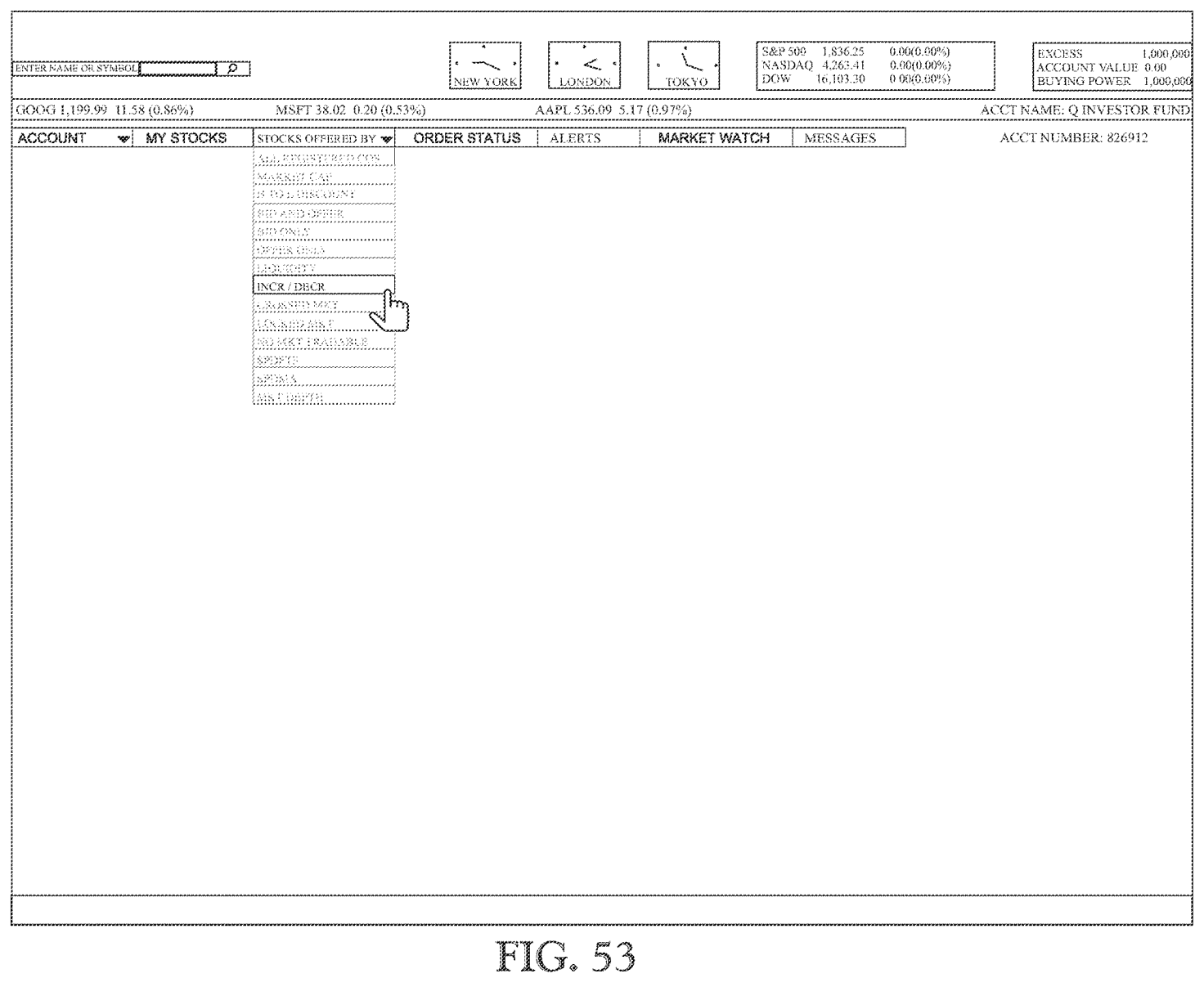

In another implementation, tradable restricted securities with offers only are listed. (FIG. 49); (FIG. 50) In yet another embodiment, tradable restricted securities are listed by high to low, or low to high liquidity. (FIG. 51); (FIG. 52) In yet another embodiment, tradable restricted securities are listed by high to low discount increase or decrease. (FIG. 53); (FIG. 54)

Figure 61:
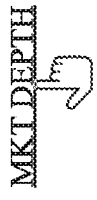
FIG. 61 illustrates an exemplary Offer screen which displays the lone RS offering for which the market is locked. In the present screen, there is only one RS that has a market that is locked. System operator prompts 'market depth' screen for 'MVIS.R', to examine the reason for the locked market. (third in Locked Markets investment sequence)

According to another implementation, tradable restricted securities with crossed markets are listed. (FIG. 55); (FIG. 56); (FIG. 57); (FIG. 58) In still another embodiment, tradable restricted securities with locked markets are listed. (FIG. 59); (FIG. 60); (FIG. 61); (FIG. 62); (FIG. 63) In still yet another embodiment, tradable restricted securities are listed by stocks with no current bid or offer. (FIG. 64); (FIG. 65) In yet another embodiment, tradable restricted securities are listed by stocks trading at a streaming discount to free trading shares. (FIG. 66); (FIG. 67) In still yet another embodiment, tradable restricted securities are listed by stocks trading at a streaming percentage discount to moving average. (FIG. 68); (FIG. 69) In still yet even another embodiment, tradable restricted securities and listed by number of participants in the market for the shares, in this example referred to as "market depth." (FIG. 70); (FIG. 71)

Figure 75:
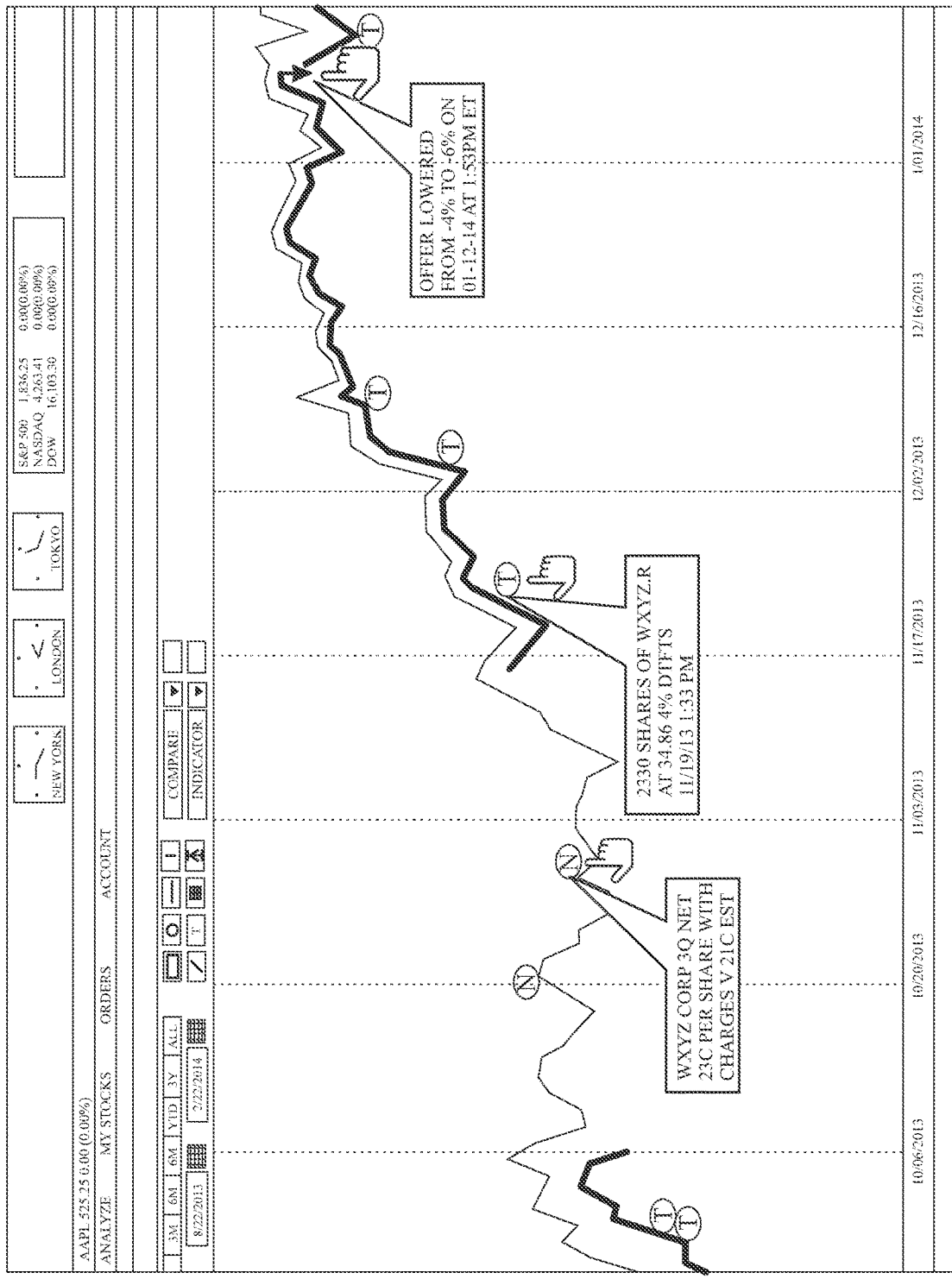
FIG. 75 presents an exemplary chart screen, which displays the Offering history for WXYZ.R. The chart displays the restricted securities (RS) offer moving parallel to the free trading (FT) share price, indicating the restricted securities (RS) have been offered at a streaming discount to free trading (FT) shares throughout time periods during which the public company was offering shares/securities. This also illustrates that the offering was either completed or terminated for a period of time, and either restarted or a new Regulation D (Reg. D) offering commenced. This further illustrates that during the month of January the offer was "sweetened," by increasing the discount for WXYZ.R. A history of individual trades in WXYZ.R are displayed, the details of which are available by prompting. Furthermore, company news is available on this screen. It is contemplated that the Chart screen can be navigated to upon prompting from the Trade screen.

According to another implementation, lists of registered sellers include indications of issuer-offered securities. In one embodiment, an offer is present and the list includes the availability of a counter bid option for the investor (FIG. 72). In another embodiment, the offer is firm and the investor does not have the option to counter bid, but may purchase the security within the parameters of the offer. (FIG. 73) In another embodiment, there are bids present, but no offer(s). (FIG. 74) In still another embodiment, there are neither bids nor offers present, and investors may place bids for restricted securities. Qualified resellers, issuers, or insider/control parties are eligible to offer shares. In one embodiment, the invention includes lists of non-issuer offered securities. Other information about the issuing company is contemplated to be available via electronic prompting or other electronic means in a real-time setting. This information is contemplated to include free trading quote, restricted securities quote, company news and information, daily and historical stock chart, average daily volume, and other information. (FIG. 75) Restricted shares are contemplated to be designated on quote and trading screen as (stock symbol) .R or other appropriate designation. Free trading stocks are contemplated to be listed in terms of free trading shares bid and ask, with or without size. Restricted securities quotes are contemplated to include bid and offer, with or without size. Restricted securities are contemplated to be listed in terms of number of shares bid and offered, number of shares bid and offered all or none, or number of shares bid and offered with a minimum transaction amount. According to one embodiment, information is provided accompanying RS quote or chart including the number of shares issued during designated time periods. According to one embodiment, available information available with RS quote or chart includes number of days issuer has been offering the shares during current offer. According to a further embodiment, information available with RS quote or chart includes percentage of current offer placed, According to another embodiment, information regarding date and size of previous offer is available with RS quote or chart. According to yet another embodiment, average daily volume history of RS offer price is available with RS quote or chart. According to a further embodiment, indication of whether current bid and offer price has been raised or lowered by an arrow or other means is available with RS quote or chart.

Desired information is selected and modified electronically through a user's individualized portal through checklist of features or other means. Information is accessible via site user's portal and reflected on site user's individual screen. Restricted shares are entered for purchase or sale through registered site user's electronic portal.

Trade Resolution: According to an alternative example, seller offers to sell shares at bid, or a designated percentage discount to free trading shares. As a method of trade resolution, the buyer of the shares must pay the entire fee for the trade, which will be added to the cost of shares.

According to yet another alternative example, an investor "takes" an existing offer and purchases the shares at a designated discount to free trading shares, and as a method of trade resolution, the seller pays the entire fee for the trade. This type of counter bid and offer are contemplated to be facilitated as an option on the Private Counter Offer screen. This method facilitates activity and liquidity.

Figure 33:
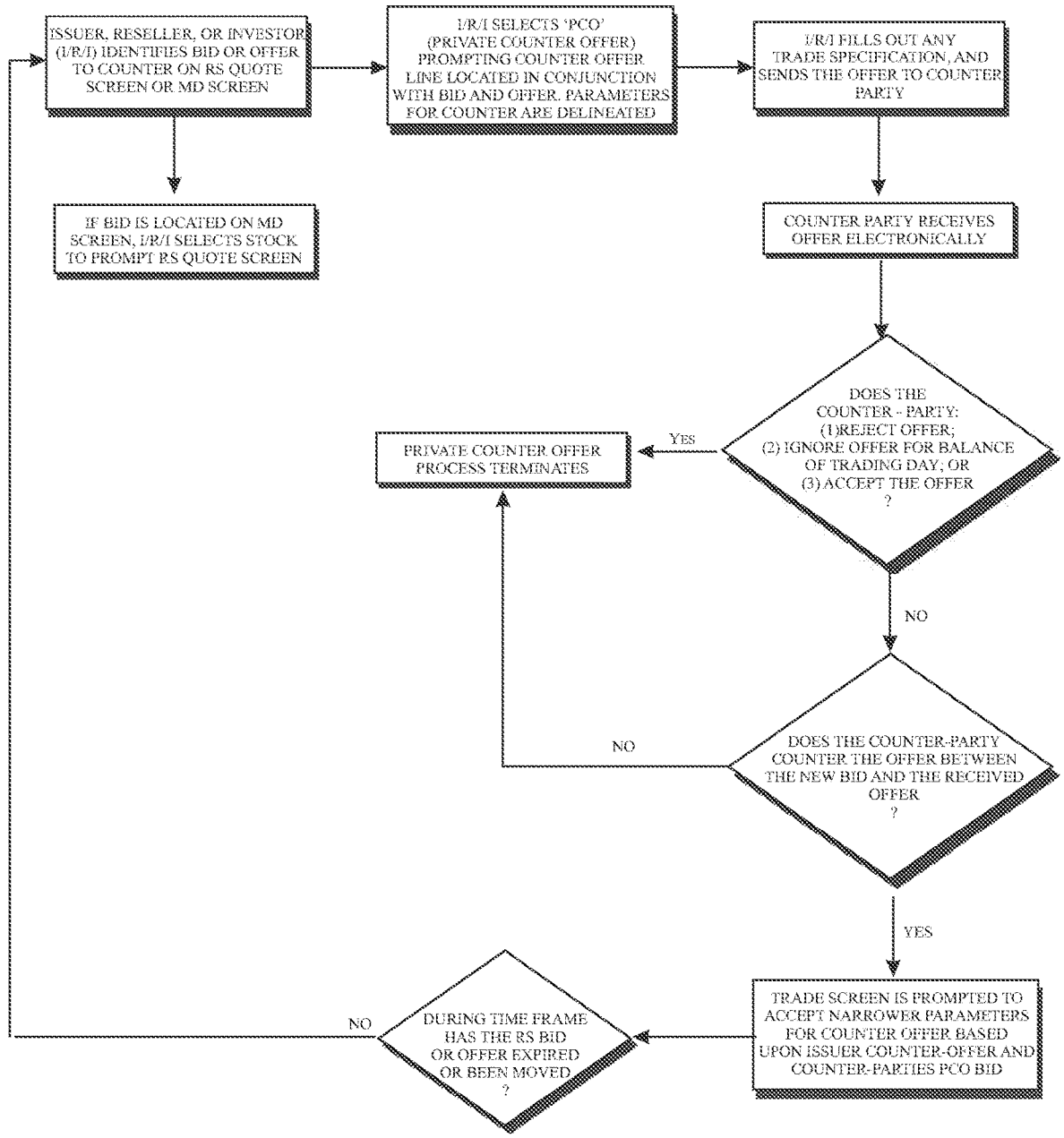
FIG. 33 presents a schematic flow diagram for an exemplary Private Counter Offer (PCO) process using the system of the present invention, wherein the process is configured, or designed, to negotiate and settle upon a price and share quantity for a particular trade. Counterparties negotiate price and quantity within the parameters of their bid and offer. Counterparties may choose to reject, accept, or ignore a counter offer. The process of counter bidding and offering within the newly-narrowed parameters continues until the bid (or the offer) is accepted or rejected. A counter bid or counter offer denotes a rejection of the previous bid or offer. If either party moves their market, the PCO process terminates. In a preferred implementation, the PCO process comprises a "day order." Alternatively, it can be good until cancelled. This is a process designed to negotiate and settle on a price and/or a share quantity for a particular trade.
Figure 34:
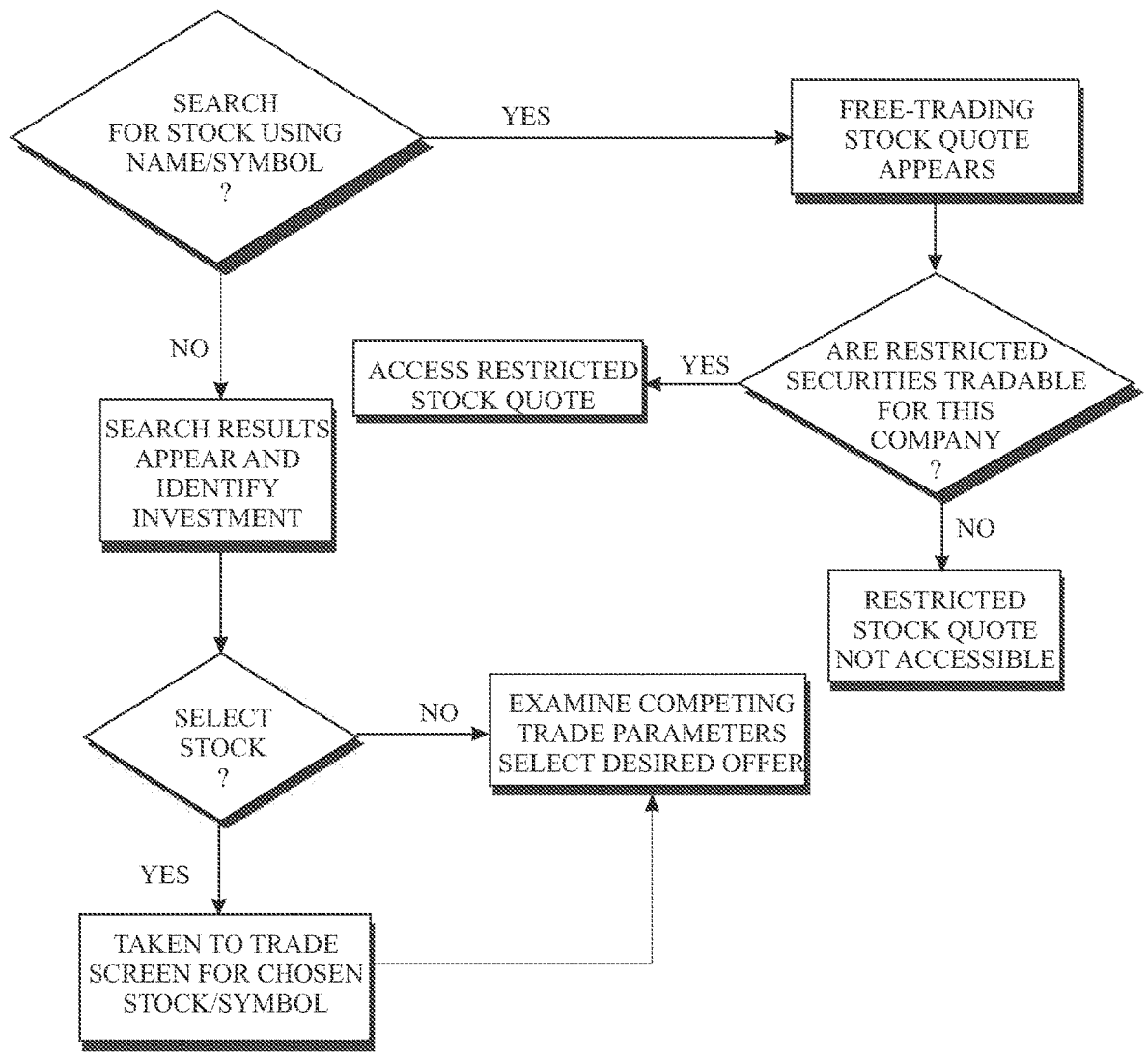
FIG. 34 presents schematic flow diagram for an exemplary process for searching for restricted share (RS) investments in accordance with the present system and method. Prospective RS investments are either accessed by means of lists of RS with designated parameters, or individually, by means of keyword. If Stock Quote is accessed by means of keyword, a quote for the free trading shares in the designated public company will appear onscreen. The investor will have a means to determine if RS are available for this public company. If the screen contains a prompt for the investor to access an RS quote, RS are available for bid or purchase in the present security and a prospective bidder is a qualified counter party. If there is not a prompt, or if the prompt is opaque, this means that RS are unavailable for bid or purchase in the present security, or there are shares available for bid or purchase within the system, but the prospective bidder is not a qualified counter party. Restrictive Shares (RS) are displayed as available for bid if the prospective bidder is a qualified counter party and either of the following is true: (1) Restricted Shares (RS) are presently offered by the issuer, a reseller, or an insider/control party; or (2) Restricted Shares (RS) in the present company are held in a shareholder's account within the system.

According to one embodiment, the entire transaction cost is debited from the proceeds of the sale. According to another embodiment, the entire transaction cost is added to the fee or commission of the purchase. According to an alternative embodiment, seller or investor may counter bid or counter offer privately (PCO). This process can be initiated within the system upon prompting. According to this example, the private offer will be delivered electronically as a message, alert, email, text or combination thereof. According to one embodiment, the terms of the counter offer will fall between and within the parameters of the existing 'inside' market, or high bid and low offer. According to another embodiment, the terms of the counter offer will fall between and within the two negotiating counterparties' bid and offer. According to one embodiment recipient of private counter offer may elect to accept the counter offer. According to another embodiment, recipient of counter offer may elect to reject counter offer. According to still another embodiment, recipient of counter offer may elect to counter the counter offer within the narrowed parameters of the revised bid and offer. According to one embodiment, this process may be repeated until buyer or seller accepts an offer. According to another embodiment, the PCO process is terminated upon either party adjusting their market on the trading system. According to another embodiment, the PCO process is terminated upon either the bidder or seller on the 'inside market' adjusting their market on the trading system. According to another embodiment, the PCO process is terminated upon either offer expiring. This enhanced auction method improves market liquidity. (FIG. 33)

Commissions and Fees: According to one embodiment, the purchaser pays any transaction fees associated with the exchange, under party-specified conditions. According to another embodiment, the seller pays any transaction and fees associated with the exchange, under party-specified conditions.

According to another embodiment, shares are bid or offered as a discount to free trading shares, fee may be charged as a percentage discount to free trading shares. According to one example, shares are offered at a 20% discount relative to free trading shares, and the fee is 10% of the discount, the fee on the trade is 2.0%. According to another embodiment, commissions or fees for placement of restricted shares within the System is on a sliding scale formula, based on trade size and frequency of offerings. According to an alternative embodiment, minimum and maximum fees or commissions for placing restricted securities within the System are set. According to one embodiment, the commission is determined in terms of percentage of the total value of the restricted share placement.

Figure 76:
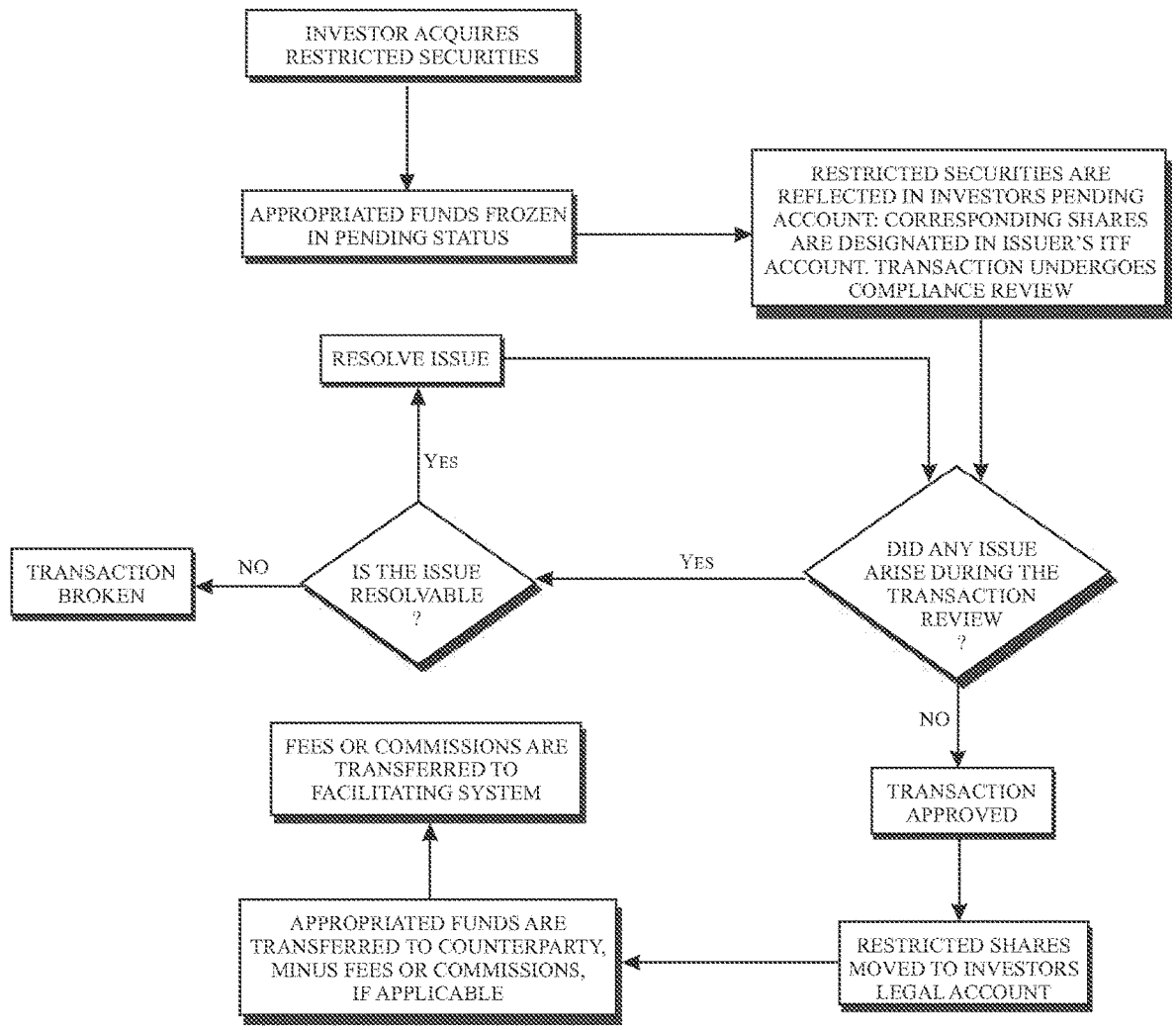
FIG. 76 presents an exemplary schematic flow diagram of a process of the investor purchasing restricted securities (RS) on the System.

According to still another embodiment, the fees or commissions i& are paid by the seller, whose offer is "taken." According to still another embodiment, the fee is paid by the purchaser, whose bid is "taken." According to this example, the party that "takes the offer" or "hits the bid" trades free of fees or commissions Transaction Method and Process: illustrates an overview of the process by which shares are traded, approved, and designated to the appropriate account. (FIG. 76)

Pre-Approval: According to another example, an approved investor prefunds a special-purpose account for the purchase of restricted shares. (FIG. 77) In one embodiment, the account in which the funds are held is a nominee account, held in trust for the investor ("ITF account"). In another embodiment, funds are held in an escrow account. According to one embodiment of this example, the trustee is an exchange, BD, or clearing entity. The trustee of the special-purpose account is preapproved by the issuer for suitability. Rather than the existing method of the issuer of approving the investor to purchase restricted securities via private placement, the investor may be approved by the trustee, BD, exchange, or clearing entity according to regulations. The issuer may pre-approve the trustee for the beneficial shareholder for suitability. All requisite approvals are in place prior to investor bidding for, or purchasing shares.

Issuing Shares: According to one embodiment, prior to listing shares for sale, the issuer issues a sufficient number of shares for the entire offer. The shares are reserved by the transfer agent and held in book entry form. Alternatively, shares are sent electronically and held the issuer's account within the System. The number of shares eligible for listing are posted and recorded electronically on issuer's portal. (FIG. 78); (FIG. 79); (FIG. 80); (FIG. 81) Each issuance of shares by the issuer is assigned an identification number. This is matched with purchase. According to one embodiment of this example, upon prompting the identification number, the screen displays purchaser, number of shares purchased, time and date of transaction, status of transaction, number of days remaining in holding period, current shareholder, and history of transactions in offering. Confirmation is sent electronically to the exchange the required shares have been issued and reserved. According to alternative embodiment, when shares are purchased the funds in the special purpose account are electronically transferred to the transfer agent and the shares are automatically transferred electronically using DTCC's Deposit/Withdrawal At Custodian (DWAC) or similar system.

Holding Shares: According to another embodiment, restricted shares are held in special-purpose nominee account or street name with investor indicated as beneficial owner. Alternatively, shares are held directly in the investor's name. The shares are posted in investor's account immediately upon purchase. According to one embodiment share positions are listed as "pending" or other tenuous designation until post-trade compliance review is successfully completed. (FIG. 82) When compliance review is successfully completed and trade is approved, the restricted shares are designated in an account awaiting maturity or resale and funds are transferred to the seller. (FIG. 83); (FIG. 87) Other information is listed, in addition to the number of shares. Additional information includes share status (i.e. restricted or free-trading); number of days remaining in holding period; shares eligibility for processing to remove restriction; company reporting compliance status, or other pertinent information relevant to the investment.

Each transaction has a designated identification code, such as a serial number, which is available on the investor's Internet portal, which is used to can be prompted to access relevant information about the transaction and parties. According to one embodiment, such information includes the name of security with stock symbol, date and time of purchase; whether shares are restricted or free trading, purchase price, current price, cost of transaction, transaction fee, date account was funded, electronic copy of check or fund transfer information, and any other information related to the transaction.

Figure 85:
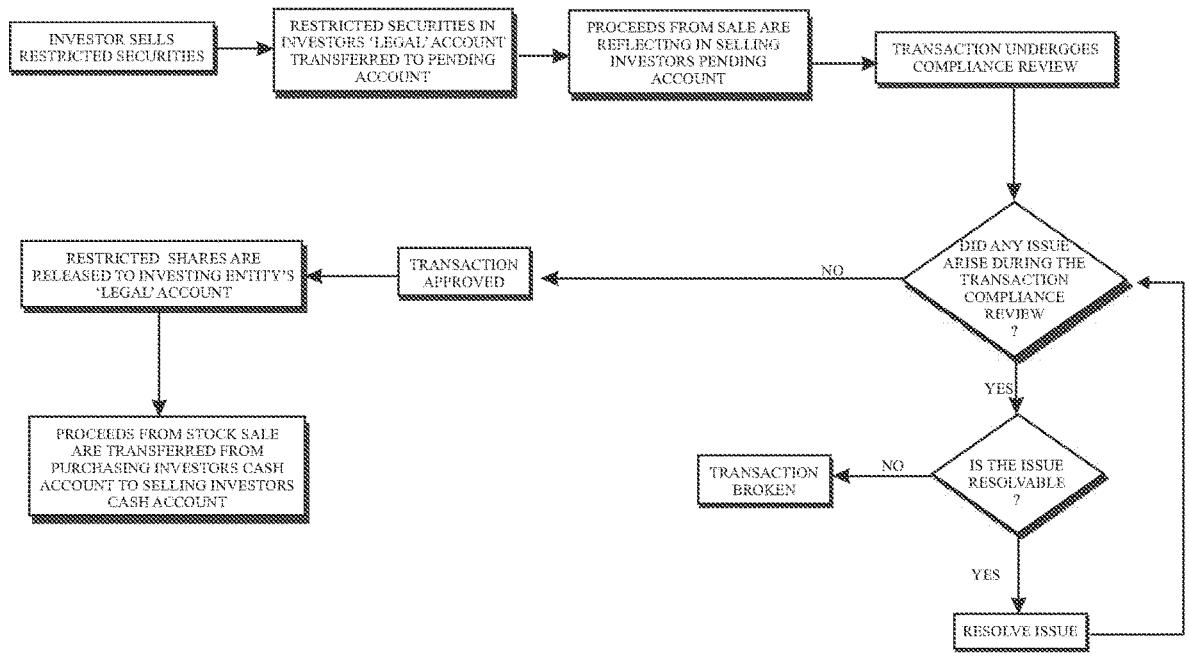
FIG. 85 presents a schematic flow diagram of an exemplary transaction process for reselling restricted securities (RS) purchased on the System. The transaction process is similar to that of an issuer's sale pursuant to Regulation D, but with important distinctions. As per rules and regulations, different designations of selling parties have different eligible counterparties. For this reason, the System contemplates notating designation of the "inside market" (i.e., high bid and low offer) participants. Resellers' offers are more limited as to eligible counterparties than primary issuers' offers. Accordingly, counter party designation is contemplated to be the main focus of resale compliance review. Additionally, counter party designation determines whether "tacking" is permitted or whether it is permitted to credit the time the selling party has held the restricted securities (RS) to determine registration eligibility date. Provisions relating to "tacking" and Rule 144 are well known in the art. If tacking is permitted, the new shareholder may be notified, and this will be considered/reflected in the "days to maturity" column in the Investor's Account. Affiliates and Control Parties (ACP) are limited from selling shares by a separate set of rules and regulations. Through the System's access to streaming information, the System is contemplated to automatically adjust the maximum quantity of restricted shares in their affiliated company that can be offered by the ACP during a specified period. This information can be prompted on the ACP party's trade screen. If shares are sold, an automatically-populated Form 144 is contemplated to be sent to the Securities and Exchange Commission (SEC) by the System pursuant to approval by the shareholder.
Figure 86:
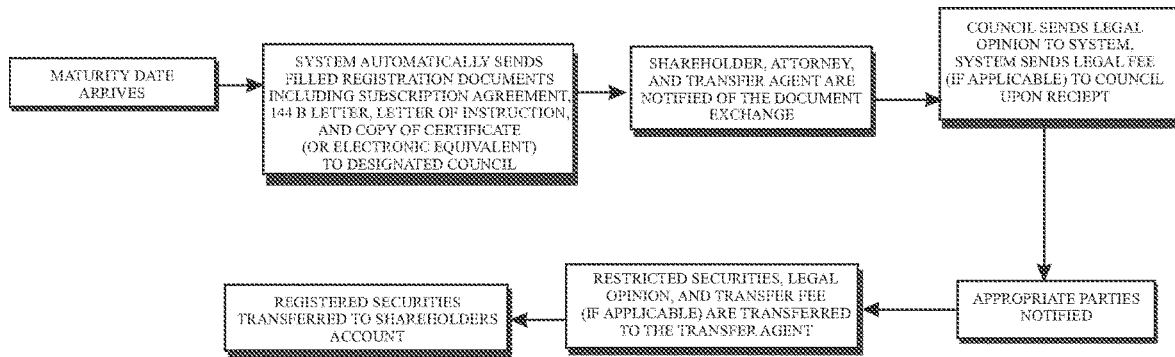
FIG. 86 presents a schematic flow diagram of an exemplary process for registering shares upon maturity. Presently, this is one of the most arduous and tedious aspects of investing in private placements. In the present art, the shareholder or agent must gather a host of documents including stock purchase agreement, proof of funding, subscription agreement, Rule 144 B letter, and copy of the certificate, along with a payment of a fee for services, and subsequently send the same to issuer's counsel in order to obtain an opinion confirming that the shares are legally permitted to be registered. To make this determination, counsel focuses on two considerations: (1) whether the shares have been held for the required period of time for the shares to be eligible to register; and (2) whether the issuer is current in their reporting status so as to allow the shareholder to register the restricted securities after a six-month holding period. As shares mature, counsel is alerted that a legal opinion is required. Through counsel's password-protected portal, details of the transaction are available by prompting the transaction number. Automatically signed and populated documents, such as subscription agreements, stock purchase agreement and Rule 144 B letters, are available to view, download, and print. An editable, automatically-populated legal opinion is available for approval using an electronic signature. If approved, the legal opinion is uploaded to the System and all parties are automatically notified. Fee for services is transferred either from the System or shareholder's account. The System automatically forwards the legal opinion to a transfer agent, together with the restricted securities and transfer fee. During this process, the shareholder's account reflects free trading shares in the "pending" account. In the final step of the process, the transfer agent electronically transfers free trading shares into the shareholder's "stock" account. Presently, with regard to the current state of the art, the process of registering shares generally takes several weeks. Considering the ready availability of all necessary information and documents throughout the process, the System's "in-house" registration process reduces the processing time to approximately 1 to 4 days, making an investment in restricted securities in accordance with the present system and method, as significantly faster and more efficient. As stated hereinabove, currently, it is very difficult to find a financial institution willing to accept shares purchased through a private placement, even if the shares are already registered and electronically transferred by the transfer agent. Being aware of this, some financial institutions that currently accept these shares charge egregious "review fees" for accepting certificates, sometimes as high as fifteen percent (15%) of the value of the shares, on top of high commissions. Taking this into consideration, it is important to note that at the end of the registration process of the present invention, the free trading shares are already held in an account at a broker-dealer, eliminating the need for the shareholder to find a financial institution to accept the shares.

(D) Reselling Restricted Shares: According to another embodiment, during the holding period, the investor resells the previously purchased restricted shares through the exchange of the present invention. (FIG. 85) According to this example, the investor effectuates the resale exclusively through the closed loop system of the present invention, wherein the restricted shares are sequestered in the investor's account; the investor cannot sell restricted shares acquired or transferred through other means. This exclusivity ensures the integrity of the closed loop system, and eliminates compromised or suspect shares from entering the system. According to an alternative embodiment, a shareholder converts shares to certificate form for holding or transferring to a different account. However, such shares cannot reenter the System of the present invention.

According to another example, an investor electing to resell shares is automatically prompted by pop-up electronic questionnaire upon submitted shares for sale. Using the prompts, the investor is required to declare whether they own or beneficially own a percentage of the company whose shares they are offering that requires additional reporting; whether they are an officer or director of underlying company whose shares the investor is offering, or other circumstances that may restrict the shareholder from freely or legally selling shares. If a trade has additional reporting requirements, appropriate documents are available on the website electronically and are capable of being electronically submitted to the appropriate governing bodies. According to one embodiment, the investor is charged a fee for this service. Alternatively reseller waives the electronic submission option. Completed forms and documentation is electronically archived and accessible by investor at a later time.

(E) Maturity of Restricted Shares: According to another example, if the holder of restricted securities holds, at maturity, elects to lift restriction using the streamlined process of the present invention. (FIG. 84); (FIG. 87) The process is initiated electronically during or after required holding period for restricted securities has expired. According to one embodiment, the investor, using the internet portal, electronically provides designated legal counsel the required information to obtain a legal opinion that restricted securities may be converted to free trading shares. All required electronic forms are accessible on the website. Forms include subscription agreement, stock purchase agreement, letter of instruction, 144B letter, details and documentation of funding and purchase, and any other forms required by applicable policies, rules and regulations. According to another embodiment, upon legal approval, the legal opinion is electronically transmitted to a transfer agent with or without utilizing the system the present invention as an intermediary. Other necessary documentation, including letter of instruction, details of purchase and funding, is electronically submitted by the investor manually, or automatically generated via the system of the present invention. Upon approval, transfer agent exchanges restricted book entry shares for free trading shares via DWAC or similar system or issues shares in certificate form as preselected by investor.

Other embodiments of the present invention also include software, or program product stored on a tangible computer memory media as a set of instructions, operable on a computer to cause the instructions to be executed by the computer, and used to manage and operate the system as provided in the present invention.

Many modifications and variations of the present invention are possible in light of the above teachings. It is therefore to be understood that within the scope of the appended claims, the invention may be practiced otherwise than as specifically described. The preferred embodiments described herein detail for illustrative purposes are subject to many variations in structure and design. It should be emphasized, however, that the present invention is not limited to the particular embodiments shown and described. Rather, the principles of the present invention can be used with a variety of configurations and structural arrangements. It is understood that various omissions, substitutions of equivalents are contemplated as circumstance may suggest or render expedient, but is intended to cover the application or implementation without departing from the spirit or scope of the claims of the present invention.

Indeed, this invention may be embodied in other forms or carried out in other ways without departing from the spirit or essential characteristics thereof. The present disclosure is therefore to be considered as in all respects illustrative and not restrictive, the scope of the invention being indicated by the appended Claims, and all changes which come within the meaning and range of equivalency are intended to be embraced therein.

What is claimed is:

1. A system, comprising:
   a central computer having memory storage and connected, via an electronic network, to a plurality of remote user-accessible devices, configured for generation of interactive data displays on the plurality of remote user-accessible devices, the central computer further in real-time communication with one or more sources of real-time price quotations of one or more unrestricted publicly-traded securities;
   wherein the memory storage stores restricted securities transaction qualification criteria and regulatory compliance standards;
   the central computer being configured to:
      maintain, for one or more restricted securities, each of the restricted securities corresponding to one of the one or more unrestricted publicly-traded securities, data as to offeror, quantity and bid and ask prices;
      receive, from the one or more sources, real-time updates of price quotations of the one or more unrestricted publicly-traded securities;
      display, on the remote user-accessible devices, one or more of the bid and ask prices of the one or more restricted securities, the bid and ask prices being dynamically updated based at least on input from the remote user-accessible devices;
      determine eligibility of counterparties, based on offeror data and potential counterparty data, for offers to sell or purchase the one or more restricted securities;
      receive, via one of the remote user-accessible devices, an instruction to buy or sell at least one of the restricted securities; and
      responsive to receipt of an instruction to buy or sell involving a counterparty determined to be eligible based on the offeror data and potential counterparty data, electronically transmit instructions for the purchase or sale transaction of the one or more restricted securities;
   wherein the electronically transmitting instructions for the purchase or sale transaction comprises electronically transmitting the instructions to a transfer agent system electronically linked to the central computer system; and
   wherein the electronically linked transfer agent system, responsive to receipt of the instructions, performs one of: electronically transferring the restricted securities in accordance with the transaction; updating shareholder account data for the restricted securities in accordance with the transaction; or generating a share certificate for the restricted securities in accordance with the transaction.

2. The system of claim 1, wherein the central computer is further configured to dynamically determine at least some of the bid and ask prices of the one or more restricted securities, based on a discount to the price, updated in real-time, of the corresponding unrestricted securities.

3. The system of claim 2, wherein the central computer is further configured to provide an option of pricing based on a discount to a streaming price of the corresponding unrestricted security.

4. The system of claim 3, wherein the central computer is further configured to determine, based on at least market capitalization and volume, a liquidity coefficient for a plurality of securities; and responsive to user input of selection of a restricted security for purchase or sale, display an indication of illiquid status, and a recommendation to base a price of the restricted security on a discount to a trailing moving average of the price of the corresponding free trading security, responsive to the determined value of the liquidity coefficient being below a threshold.

5. The system of claim 1, wherein the central computer is further configured to generate for display a market depth screen showing one or more current bids or offers for one or more restricted securities.

6. The system of claim 5, wherein the central computer is further configured to display, for each of the bids and offers, cross eligibility of respective parties.

7. The system of claim 2, wherein the central computer is further configured to display a market depth screen showing one or more current bids or offers for one or more restricted securities, wherein the market depth screen displays bids and offers arranged in order of amount of discount from the price of corresponding unrestricted securities.

8. The system of claim 1, wherein the central computer is further configured to determine a system transaction commission based on a discount of the price of the restricted securities, the commission being charged to at least one of the parties to the transaction.

9. The system of claim 1, wherein the transaction is one of a placement of restricted securities by an issuer, a resale of restricted securities by an investor, or a placement of restricted securities by an insider or a control party.

10. The system of claim 2, wherein the one or more restricted securities are offered at a price based on a streaming discount to trailing moving average of the corresponding unrestricted securities, and the central computer is configured to compare the offer price of the one or more restricted securities to the real-time updates of the price of the corresponding unrestricted securities and, responsive to the offer price of the restricted securities being equal to or greater than the price of the corresponding unrestricted securities, automatically cancel the offer of the restricted securities, and notify the offeror of the cancellation.

11. The system of claim 1, wherein the central computer is further configured to automatically qualify at least one bidder based upon predefined bidder qualification criteria.

12. The system of claim 11, wherein the central computer is further configured to cause the system to:
receive a bid from said at least one qualified bidder; and
accept and store said received bid within said system.

13. The system of claim 12, wherein the central computer is further configured to cause the system to:
receive a sell offer from at least one of a primary and a reseller of restricted securities; and
accept and store said received sell offer.

14. The system of claim 13, wherein the central computer is further configured to:
automatically evaluate said received bid from said at least one qualified bidder, said evaluation including evaluating said received bid against a stored bid criteria; and
automatically evaluate said received sell offer from said seller.

15. The system of claim 14, wherein the central computer is further configured to:
evaluate said at least one submitted bid and said at least one submitted offer against a stored set of compliance criteria.

16. The system of claim 15, wherein the central computer is further configured to:
dynamically evaluate said at least one evaluated bid and offer pursuant to pricing parameters set by parties.

17. The system of claim 16, wherein the central computer is further configured to:
communicate an automatically-generated feedback to at least one of a qualified bidder, a primary seller and a reseller of restricted securities, wherein said feedback functions to alert at least one of a status of a bid to a bidder and a status of an offer to seller.

18. The system of claim 17, wherein the central computer is further configured to:
communicate an automatically-generated feedback to at least one of a qualified investor, a primary seller and a reseller of restricted securities, wherein said feedback functions provide an alert to the presence and status of at least one of a counter-bid and a counter-offer pursuant to a set of stored criteria.

19. The system of claim 18, wherein the central computer is further configured to:
receive an acceptance of at least one of a bid, an offer and a counter-offer; and
transmit instructions for the corresponding transaction upon receiving said acceptance.

20. The system of claim 1, wherein the central computer is further configured to:
identify an area of a display on a user-accessible device, for selectable interaction with a user, and display a user-defined criteria for subsequently creating a corresponding list of a subset of publicly-traded companies and respective information pertaining to restricted securities in said companies;
receive a user-defined criteria for creating said user-defined list;
determine said user-defined list based upon said received user-defined criteria; and
transmit said user-defined list for display upon said display of said user-accessible device.

21. The system of claim 20, wherein said central computer is further configured to:
display at least one of company-based attributes and restricted securities-based attributes selectable by said user for enabling said user to select criteria for subsequent use creating said user-defined list.

22. The system of claim 21, wherein said central computer is further configured to:
provide user-selectable option to generate a filtered list of companies based on at least one of:
all companies that are registered with the system and have restricted securities with crossed markets;
all companies that are registered with the system and have restricted securities with locked markets;
all companies that are registered with the system and have restricted securities without any current bids or offers; or
all companies that are registered with the system that have offerings available to non-accredited investors who are not eligible for Rule 506(c) offerings.

23. The system of claim 1, wherein the central computer is further configured to:
provide a user-selectable option for creating a sorted list based upon attributes of underlying restricted securities of said publically-traded companies registered with said system, said attributes comprising one or more of:
restricted share discount compared to current price of corresponding publically-traded free-trading shares;
restricted share discount compared to a share trailing moving average; or company streaming percentage discount of free trading shares.

24. The system of claim 1, wherein the central computer is further configured to:
dynamically determine for each bid and offer whether user-selected parameters associated with the bid or offer, including at least maximum and minimum price, are mutually consistent; and
responsive to determining that parameters associated with the bid or offer are not mutually consistent, automatically cancel the bid or offer.

25. The system of claim 1, wherein the determining eligibility by the central computer comprises:
determining for each bid and offer compliance with eligibility parameters associated with one or more associated parties.

26. The system of claim 2, wherein the discount to price of the corresponding unrestricted securities is a streaming discount to a price of the corresponding unrestricted securities.

27. The system of claim 2, wherein the discount to price of the corresponding unrestricted securities is a streaming discount to a trailing moving average.

28. The system of claim 27, wherein the central computer is further configured to:
compare the price of the restricted securities to the price of the corresponding unrestricted securities, and, responsive to the price of the restricted securities being equal to or greater than the price of the corresponding unrestricted securities, cancel the bid or offer for the restricted securities.

29. The system of claim 1, wherein the central computer is further configured to:
provide a plurality of user-selectable parameters associated with bids and offers, the user-selectable parameters comprising at least one of: a discount to a streaming price of corresponding unrestricted securities; a discount to a streaming trailing moving average of corresponding unrestricted securities; or a fixed price.

30. The system of claim 1, wherein the central computer is further configured to determine, for restricted shares offered for resale, whether, in determining a time period until resales of restricted securities are permitted, tacking of time periods of ownership by two or more owners is permitted, and to calculate and display the time period until resales of restricted securities are permitted.

31. The system of claim 1, wherein the central computer is further configured to dynamically determine at least some of the bid and ask prices of the one or more restricted securities based on a discount to a trailing moving average price of the corresponding unrestricted security.

32. The system of claim 1, wherein the central computer is further configured to receive and display fixed bid and ask prices of the one or more restricted securities.

33. The system of claim 32, wherein the central computer is further configured to compare the fixed bid and ask prices of the one or more restricted securities to the price of the corresponding unrestricted securities and, responsive to the fixed bid or ask prices of the restricted securities being equal to or greater than the price of the corresponding unrestricted securities, the bid or offer is automatically canceled, and the bidder is automatically notified of the cancellation.

34. The system of claim 21, wherein said central computer is further configured to:
provide a user-selectable option to generate a filtered list of companies based on at least one of:
tradeable restricted securities with both bids and offers;
tradeable restricted securities with bids only; and
tradeable restricted securities with offers only.

35. The system of claim 21, wherein said central computer is further configured to:
provide a user-selectable option to generate a list of companies ordered by at least one of:
liquidity;
increase, compared to a prior time period, of price in discount from corresponding unrestricted shares;
decrease, compared to a prior time period, of price in discount from corresponding unrestricted shares;
price expressed as a discount from a price of corresponding unrestricted shares;
price expressed as a discount from a trailing moving average price of corresponding unrestricted shares; and
market depth expressed as a sum of current bids and offers.

36. The system of claim 1, wherein the determining eligibility of counterparties is performed prior to display of bids and offers on a display, and only those bids and offers having a positive determination of counterparty eligibility are displayed on the user's display.

37. The system of claim 1, wherein the determining eligibility of counterparties is performed prior to display of bids and offers on a display, and only those bids and offers with respect to which the determination of counterparty eligibility is positive are displayed with a prompt to initiate a transaction.

38. The system of claim 1, wherein the determining eligibility of counterparties is performed responsive to receipt of an instruction to execute a transaction, and only transmitting instructions as to those transactions with respect to which the determination of eligibility of a counterparty is positive.

39. The system of claim 29, wherein the central computer is further configured to:
responsive to user selection of one of the discount to a streaming price of corresponding unrestricted securities or the discount to a streaming trailing moving average of corresponding unrestricted securities, provide as a user-selectable parameter at least one of a maximum price or a minimum price.

40. A computer-implemented method, comprising:
by a central computer having memory storage and connected, via an electronic network, to a plurality of remote user-accessible devices, generating interactive data displays on the plurality of remote user-accessible devices, and communicating in real-time with one or more sources of real-time price quotations of one or more unrestricted publicly-traded securities;
storing by the memory storage restricted securities transaction qualification criteria and regulatory compliance standards;
maintaining, by the central computer, for one or more restricted securities, each of the restricted securities corresponding to one of the one or more unrestricted publicly-traded securities, data as to offeror, quantity and bid and ask prices;
receiving, by the central computer, from the one or more sources, real-time updates of price quotations of the one or more unrestricted publicly-traded securities;
displaying, by the central computer, on the remote user-accessible devices, one or more of the bid and ask prices of the restricted securities, the bid and ask prices being dynamically updated based at least on input from the user-accessible devices;

determining, by the central computer, based on offeror data and potential counterparty data, eligibility of counterparties for offers to sell or purchase the one or more restricted securities;

receiving, by the central computer, via one of the remote user-accessible devices, an instruction to buy or sell at least one of the restricted securities; and responsive to receipt of the instruction to buy or sell with a counterparty determined to be eligible based on the offeror data and potential counterparty data, electronically transmitting, by the central computer, instructions for the purchase or sale transaction of the one or more restricted securities;

wherein the electronically transmitting instructions for the purchase or sale transaction comprises electronically transmitting the instructions to a transfer agent system electronically linked to the central computer system; and wherein the electronically linked transfer agent system, responsive to receipt of the instructions, performs one of: electronically transferring the restricted securities in accordance with the transaction; updating shareholder account data for the restricted securities in accordance with the transaction; or generating a share certificate for the restricted securities in accordance with the transaction.

41. The computer-implemented method of claim 40, further comprising, dynamically determining by the central computer at least some of the bid and ask prices of the one or more restricted securities, based on a discount to the price, updated in real-time, of the corresponding unrestricted securities.

42. The computer-implemented method of claim 41, further comprising providing an option of pricing based on a discount to a streaming price of the corresponding unrestricted security.

43. The computer-implemented method of claim 42, further comprising determining, based on at least market capitalization and volume, a liquidity coefficient for a plurality of securities; and responsive to user input of selection of a restricted security for purchase or sale, displaying an indication of illiquid status, and a recommendation to base a price of the restricted security on a discount to a trailing moving average of the price of the corresponding free trading security, responsive to the determined value of the liquidity coefficient being below a threshold.

44. The computer-implemented method of claim 40, further comprising displaying a market depth screen showing one or more current bids or offers for one or more restricted securities.

45. The computer-implemented method of claim 44, further comprising displaying, for each of the bids and offers, cross eligibility of respective parties.

46. The computer-implemented method of claim 41, further comprising displaying a market depth screen showing one or more current bids or offers for one or more restricted securities, wherein the market depth screen further displays bids and offers arranged in order of amount of discount from the price of corresponding unrestricted securities.

47. The computer-implemented method of claim 40, further comprising determining a system transaction commission based on a discount of the price of the restricted securities, the commission being charged to at least one of the parties to the transaction.

48. The computer-implemented method of claim 40, wherein the transaction is one of a placement of restricted securities by an issuer, a resale of restricted securities by an investor, or a placement of restricted securities by an insider or a control party.

49. The computer-implemented method of claim 41, wherein the one or more restricted securities are offered at a price based on a streaming discount to trailing moving average of the corresponding unrestricted securities, and further comprising comparing the offer price of the one or more restricted securities to the real-time updates of the price of the corresponding unrestricted securities and, responsive to the offer price of the restricted securities being equal to or greater than the price of the corresponding unrestricted securities, automatically canceling the offer of the unrestricted securities, and notifying the offeror of the cancellation.

50. The computer-implemented method of claim 40, further comprising automatically qualifying at least one bidder based upon predefined bidder qualification criteria.

51. The computer-implemented method of claim 50, further comprising:

receiving a bid from said at least one qualified bidder; and accepting and storing said received bid within said system.

52. The computer-implemented method of claim 51, further comprising:

receiving a sell offer from at least one of a primary and a reseller of restricted securities; and accepting and storing said received sell offer.

53. The computer-implemented method of claim 52, further comprising:

automatically evaluating said received bid from said at least one qualified bidder, said evaluation including evaluating said received bid against a stored bid criteria; and automatically evaluating said received sell offer from said seller.

54. The computer-implemented method of claim 53, further comprising:

evaluating said at least one submitted bid and said at least one submitted offer against a stored set of compliance criteria.

55. The computer-implemented method of claim 54, further comprising:

dynamically evaluating said at least one evaluated bid and offer pursuant to pricing parameters set by parties.

56. The computer-implemented method of claim 55, further comprising:

communicating an automatically-generated feedback to at least one of a qualified bidder, a primary seller and a reseller of restricted securities, wherein said feedback functions to alert at least one of a status of a bid to a bidder and a status of an offer to seller.

57. The computer-implemented method of claim 56, further comprising:

communicating an automatically-generated feedback to at least one of a qualified investor, a primary seller and a reseller of restricted securities, wherein said feedback functions to provide an alert to the presence and status of at least one of a counter-bid and a counter-offer pursuant to a set of stored criteria.

58. The computer-implemented method of claim 57, further comprising:

receiving an acceptance of at least one of a bid, an offer and a counter-offer; and transmitting instructions for the corresponding transaction upon receiving said acceptance.

59. The computer-implemented method of claim 40, further comprising:
identifying an area of a display on a user-accessible device, for selectable interaction with a user, and displaying a user-defined criteria for subsequently creating a corresponding list of a subset of publicly-traded companies and respective information pertaining to restricted securities in said companies;
receiving a user-defined criteria for creating said user-defined list;
determining said user-defined list based upon said received user-defined criteria; and
transmitting said user-defined list for display upon said display of said user-accessible device.

60. The computer-implemented method of claim 59, further comprising:
displaying at least one of company-based attributes and restricted securities-based attributes selectable by said user for enabling said user to select criteria for subsequent use creating said user-defined list.

61. The computer-implemented method of claim 60, further comprising:
providing a user-selectable option to generate a filtered list of companies based on at least one of:
all companies that are registered with the system and have restricted securities with crossed markets;
all companies that are registered with the system and have restricted securities with locked markets;
all companies that are registered with the system and have restricted securities without any current bids or offers; or
all companies that are registered with the system that have offerings available to non-accredited investors who are not eligible for Rule 506(c) offerings.

62. The computer-implemented method of claim 40, further comprising:
providing a user-selectable option for creating a sorted list based upon attributes of underlying restricted securities of said publically-traded companies registered with said system, said attributes comprising one or more of:
restricted share discount compared to current price of corresponding publically-traded free-trading shares;
restricted share discount compared to a share trailing moving average; or
company streaming percentage discount of free trading shares.

63. The computer-implemented method of claim 40, further comprising:
dynamically determining for each bid and offer whether user-selected parameters associated with the bid or offer, including at least maximum and minimum price, are mutually consistent; and
responsive to determining that parameters associated with the bid or offer are not mutually consistent, automatically canceling the bid or offer.

64. The computer-implemented method of claim 40, wherein the determining eligibility comprises:
determining for each bid and offer compliance with eligibility parameters associated with one or more associated parties.

65. The computer-implemented method of claim 41, wherein the discount to price of the corresponding unrestricted securities is a streaming discount to a price of the corresponding unrestricted securities.

66. The computer-implemented method of claim 41, wherein the discount to price of the corresponding unrestricted securities is a streaming discount to a trailing moving average.

67. The computer-implemented method of claim 66, further comprising:
comparing the price of the restricted securities to the price of the corresponding unrestricted securities, and, responsive to the price of the restricted securities being equal to or greater than the price of the corresponding unrestricted securities, canceling trading of the restricted securities.

68. The computer-implemented method of claim 40, further comprising:
providing a plurality of user-selectable parameters associated with bids and offers, the user-selectable parameters comprising at least one of: a discount to a streaming price of corresponding unrestricted securities; a discount to a streaming trailing moving average of corresponding unrestricted securities; or a fixed price.

69. The computer-implemented method of claim 40, further comprising determining, by the central computer, for restricted shares offered for resale, whether, in determining a time period until resales of restricted securities are permitted, tacking of time periods of ownership by two or more owners is permitted, and calculating and displaying the time period until resales of restricted securities are permitted.

70. The computer-implemented method of claim 40, further comprising, by the central computer, receiving and displaying fixed bid and ask prices of the one or more restricted securities.

71. The computer-implemented method of claim 70, further comprising, by the central computer, comparing the fixed bid and ask prices of the one or more restricted securities to the price of the corresponding unrestricted securities and, responsive to the fixed bid or ask prices of the restricted securities being equal to or greater than the price of the corresponding unrestricted securities, the bid or offer is automatically canceled, and the bidder is automatically notified of the cancellation.

72. The computer-implemented method of claim 59, further comprising:
providing a user-selectable option to generate a filtered list of companies based on at least one of:
tradeable restricted securities with both bids and offers;
tradeable restricted securities with bids only; and
tradeable restricted securities with offers only.

73. The computer-implemented method of claim 59, further comprising:
providing a user-selectable option to generate a list of companies ordered by at least one of:
liquidity;
increase, compared to a prior time period, of price in discount from corresponding unrestricted shares;
decrease, compared to a prior time period, of price in discount from corresponding unrestricted shares;
price expressed as a discount from a price of corresponding unrestricted shares;
price expressed as a discount from a trailing moving average price of corresponding unrestricted shares; and
market depth expressed as a sum of current bids and offers.

74. The computer-implemented method of claim 40, wherein the determining eligibility of counterparties is performed prior to display of bids and offers on a display, and only those bids and offers having a positive determination of counterparty eligibility are displayed on the user's display.

75. The computer-implemented method of claim 40, wherein the determining eligibility of counterparties is performed prior to display of bids and offers on a display, and only those bids and offers with respect to which the determination of counterparty eligibility is positive are displayed with a prompt to initiate a transaction.

76. The computer-implemented method of claim 40, wherein the determining eligibility of counterparties is performed responsive to receipt of an instruction to execute a transaction, and only transmitting instructions as to those transactions with respect to which the determination of eligibility of a counterparty is positive.

77. The computer-implemented method of claim 68, further comprising:
  responsive to user selection of one of the discount to a streaming price of corresponding unrestricted securities or the discount to a streaming trailing moving average of corresponding unrestricted securities, providing as a user-selectable parameter at least one of a maximum price or a minimum price.

78. The computer-implemented method of claim 40, further comprising dynamically determining at least some of the bid and ask prices of the one or more restricted securities based on a discount to a trailing moving average price of the corresponding unrestricted security.

\* \* \* \* \*